US011956485B2

(12) United States Patent
Tsukagoshi

(10) Patent No.: US 11,956,485 B2
(45) Date of Patent: *Apr. 9, 2024

(54) TRANSMISSION DEVICE, TRANSMISSION METHOD, MEDIA PROCESSING DEVICE, MEDIA PROCESSING METHOD, AND RECEPTION DEVICE

(71) Applicant: SONY GROUP CORPORATION, Tokyo (JP)

(72) Inventor: Ikuo Tsukagoshi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,218

(22) Filed: Dec. 28, 2021

(65) Prior Publication Data
US 2022/0124384 A1 Apr. 21, 2022

Related U.S. Application Data

(63) Continuation of application No. 15/567,650, filed as application No. PCT/JP2016/063932 on May 10, 2016, now Pat. No. 11,223,857.

(30) Foreign Application Priority Data

Jun. 2, 2015 (JP) ................................. 2015-112709
Nov. 4, 2015 (JP) ................................. 2015-217148

(51) Int. Cl.
*H04N 7/16* (2011.01)
*G10L 19/00* (2013.01)
(Continued)

(52) U.S. Cl.
CPC ........... *H04N 21/235* (2013.01); *G10L 19/00* (2013.01); *H04H 20/28* (2013.01); *H04H 20/93* (2013.01);
(Continued)

(58) Field of Classification Search
CPC ............... H04N 21/235; H04N 21/233; H04N 21/2343; H04N 21/236; H04N 21/2541;
(Continued)

(56) References Cited

U.S. PATENT DOCUMENTS 6,741,667 B1 5/2004 Suda
7,698,006 B2 4/2010 Seo et al.
(Continued)

FOREIGN PATENT DOCUMENTS

CA 2828945 A1 10/2012
CN 1757059 A 4/2006
(Continued)

OTHER PUBLICATIONS

International Search Report dated Aug. 16, 2016 in PCT/JP20161063932 filed May 10, 2016.
(Continued)

*Primary Examiner* — Annan Q Shang
(74) *Attorney, Agent, or Firm* — Oblon, McClelland, Maier & Neustadt, L.L.P.

(57) ABSTRACT

To enable a set of media access control to be favorably performed on the reception side. A container having a predetermined format is transmitted, the container including a media stream. A predetermined number of pieces of media access information associated for the set of media access control, are sequentially inserted into a layer of the media stream or a layer of the container. For example, the media access information includes identification information for making a distinction from different media access information and identification information for making an association with the different media access information.

19 Claims, 43 Drawing Sheets

(51) Int. Cl.
*H04H 20/28* (2008.01)
*H04H 20/93* (2008.01)
*H04H 60/37* (2008.01)
*H04H 60/58* (2008.01)
*H04N 21/233* (2011.01)
*H04N 21/2343* (2011.01)
*H04N 21/235* (2011.01)
*H04N 21/236* (2011.01)
*H04N 21/254* (2011.01)
*H04N 21/435* (2011.01)
*H04N 21/482* (2011.01)
*H04N 21/488* (2011.01)

(52) U.S. Cl.
CPC ............ *H04H 60/37* (2013.01); *H04H 60/58* (2013.01); *H04N 21/233* (2013.01); *H04N 21/2343* (2013.01); *H04N 21/236* (2013.01); *H04N 21/2541* (2013.01); *H04N 21/435* (2013.01); *H04N 21/482* (2013.01); *H04N 21/4882* (2013.01)

(58) Field of Classification Search
CPC ............... H04N 21/435; H04N 21/482; H04N 21/4882; H04N 21/2368; G10L 19/00; G10L 19/167; H04H 20/28; H04H 20/93; H04H 60/37; H04H 60/58
See application file for complete search history.

(56) References Cited

U.S. PATENT DOCUMENTS

| | | | |
|---|---|---|---|
| 7,770,200 | B2 | 8/2010 | Brooks et al. |
| 8,614,969 | B2 | 12/2013 | Youn et al. |
| 8,824,327 | B1 | 9/2014 | Basart et al. |
| 8,990,418 | B1 | 3/2015 | Bragg et al. |
| 9,426,524 | B2 | 8/2016 | Zalewski |
| 9,536,531 | B2 | 1/2017 | Morrell |
| 9,681,111 | B1 | 6/2017 | Newman |
| 9,788,133 | B2 * | 10/2017 | Sen .................. G10L 19/18 |
| 10,142,666 | B2 | 11/2018 | Brondijk et al. |
| 10,453,467 | B2 * | 10/2019 | Koppens ............. G10L 19/167 |
| 10,681,114 | B2 | 6/2020 | Kitazato |
| 2006/0080094 | A1 | 4/2006 | Katayama et al. |
| 2007/0192676 | A1 | 8/2007 | Bodin et al. |
| 2007/0192787 | A1 | 8/2007 | Hong |
| 2008/0189546 | A1 | 8/2008 | Yoon |
| 2008/0309830 | A1 | 12/2008 | Motomura |
| 2010/0159973 | A1 | 6/2010 | Thomas et al. |
| 2010/0266111 | A1 | 10/2010 | Crausaz et al. |
| 2010/0280641 | A1 | 11/2010 | Harkness et al. |
| 2011/0292173 | A1 | 12/2011 | Tsukagoshi |
| 2012/0030253 | A1 | 2/2012 | Katsumata |
| 2013/0024897 | A1 | 1/2013 | Eyer |
| 2013/0094594 | A1 | 4/2013 | Bae |
| 2013/0111530 | A1 | 5/2013 | Kitazato |
| 2013/0239159 | A1 | 9/2013 | Mamidwar et al. |
| 2013/0340007 | A1 | 12/2013 | Eyer |
| 2014/0192230 | A1 | 7/2014 | Chang |
| 2014/0297291 | A1 | 10/2014 | Baumgarte |
| 2014/0358558 | A1 * | 12/2014 | Sen .................. G10L 19/002 704/500 |
| 2015/0085735 | A1 | 3/2015 | Shelby et al. |
| 2015/0100996 | A1 | 4/2015 | Freemen et al. |
| 2015/0142453 | A1 | 5/2015 | Oomen et al. |
| 2015/0271621 | A1 | 9/2015 | Sen et al. |
| 2015/0288996 | A1 | 10/2015 | Van Der Schaar et al. |
| 2015/0289012 | A1 | 10/2015 | Simpson et al. |
| 2016/0125887 | A1 | 5/2016 | Purnhagen et al. |
| 2016/0140974 | A1 | 5/2016 | Valero et al. |
| 2016/0198218 | A1 | 7/2016 | Kwon et al. |
| 2016/0314816 | A1 | 10/2016 | Van Stam et al. |
| 2016/0381399 | A1 | 12/2016 | Brondijk et al. |
| 2017/0011751 | A1 | 1/2017 | Fueg et al. |
| 2017/0063960 | A1 | 3/2017 | Stockhammer et al. |
| 2017/0171576 | A1 * | 6/2017 | Oh .................. H04N 21/236 |
| 2017/0223429 | A1 | 8/2017 | Schreiner et al. |
| 2017/0243596 | A1 | 8/2017 | Eggerding et al. |
| 2017/0251323 | A1 | 8/2017 | Jo et al. |
| 2018/0006749 | A1 | 1/2018 | Oh et al. |
| 2018/0007398 | A1 | 1/2018 | Bleidt et al. |
| 2018/0027278 | A1 | 1/2018 | Yang et al. |

FOREIGN PATENT DOCUMENTS

| | | | |
|---|---|---|---|
| CN | 1767539 | A | 5/2006 |
| CN | 101242270 | A | 8/2008 |
| CN | 102263989 | A | 11/2011 |
| CN | 102347046 | A | 2/2012 |
| CN | 103907344 | A | 7/2014 |
| EP | 3 171 605 | A1 | 5/2017 |
| JP | 2003-101535 | A | 4/2003 |
| JP | 2008-192135 | A | 8/2008 |
| JP | 2010118949 | A | 5/2010 |
| JP | 2012-10311 | A | 1/2012 |
| JP | 2012-033243 | A | 2/2012 |
| JP | 2013-98863 | A | 5/2013 |
| WO | 2004/077406 | A1 | 9/2004 |
| WO | WO 2013/065566 | A1 | 5/2013 |

OTHER PUBLICATIONS

Extended European Search Report dated Dec. 21, 2018 in corresponding European Patent Application No. 168030005, 13 pages.
Combined Chinese Office Action and Search Report dated Nov. 11, 2019 in Patent Application No. 2016800299186 (with English translation), 22 pages.
Japanese Office Action dated Jun. 30, 2020 in Japanese Patent Appiication No. 2017-521763, 9 pages.

* cited by examiner

FIG. 5

| usacExtElementType | Value |
|---|---|
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| /* reserved for ISO use */ | 8-127 |
| /* reserved for use outside of ISO scope */ | 128 and higher |
| ID_EXT_ELE_universal_metadata | 128 |

FIG. 6

| Syntax | No. of Bits | Format |
|---|---|---|
| universal_metadata_frame syntax | | |
| universal_metadata_frame(){ | | |
|   organization_id | 32 | bslbf |
|   metadata_type | 8 | uimsbf |
|   packet_length | 8 | uimsbf |
|   data_id | 8 | uimsbf |
|   start_flag | 1 | bslbf |
|   fcounter | 7 | uimsbf |
|   if( start_flag ) | | |
|     total_data_size | 16 | uimsbf |
|     packet_length -= 4 | | |
|   } | | |
|   else { | | |
|     packet_length -= 2 | | |
|   } | | |
|   while ( packet_length-- ) { | | |
|     bytes_to_carry_access_information_data | 8 | bslbf |
|   } | | |
| } | | |

FIG. 7

| Syntax | No. of Bits | Format |
|---|---|---|
| access_information_data syntax | | |
| Access_information_data(){ | | |
|   num_of_access_information; N | 8 | uimsbf |
|   information_id | 8 | uimsbf |
|   segment_id | 8 | uimsbf |
|   for( i = 0; i < N; i++ ) { | | |
|     information_type | 8 | uimsbf |
|     length | 8 | uimsbf |
|     switch (information_type) { | | |
|       case " 0x00" : /* ID_tables */ | | |
|         application_id | 16 | uimsbf |
|         network_id | 16 | uimsbf |
|         transport_id | 16 | uimsbf |
|         service_id | 16 | uimsbf |
|       break; | | |
|       case " 0x01" : /* access information */ | | |
|         url_length | 8 | uimsbf |
|         while ( url_length-- ) | | |
|           bytes | 8 | bslbf |
|       break; | | |
| // continued | | |

FIG. 8

| Syntax | No. of Bits | Format |
|---|---|---|
| access_information_data_syntax | | |
| case " 0x02 ": /*action command */ | | |
| command_type | 8 | uimsbf |
| break; | | |
| case " 0x03 ": /*notification */ | | |
| message_type | 8 | uimsbf |
| break; | | |
| case " 0x04 ": /* period */ | | |
| period_id | 8 | uimsbf |
| break; | | |
| case " 0x05 ": /*reference time code */ | | |
| time_code1 | 64 | uimsbf |
| break; | | |
| case " 0x06 ": /*offset_time */ | | |
| time_code2 | 64 | uimsbf |
| target_segment_id | 8 | uimsbf |
| break; | | |
| case " 0x07 ": /*UTC */ | | |
| UTC | 64 | uimsbf |
| break; | | |
| // continued | | |

FIG. 9 access_information_data syntax

| Syntax | No. of Bits | Format |
|---|---|---|
| case " 0x08" : /* UI selection process */ | | |
| html_length | 8 | uimsbf |
| while ( html_length-- ) | | |
| data | 8 | bslbf |
| break; | | |
| default | | |
| } | | |
| } | | |
| } | | |

FIG. 10

| | |
|---|---|
| organization_id (32bits) | IDENTIFICATION VALUE UNIQUELY ALLOCATED TO INDIVIDUAL SERVICE TRANSMITTED IN USER DATA REGION OR PROVIDER OR STANDARD ORGANIZATION OF SERVICE, IS INDICATED. |
| metadata_type (16bits) | TYPE OF CONTAINER CURRENT DATA IS INDICATED.<br>'0x10' UNIVERSAL METADATA IN MPEG-H FORMAT IS INDICATED.<br>'0x02' ATSC APPLICATION METADATA IS INDICATED. |
| data_id (8bits) | ID OF CONTAINER CURRENT DATA IS INDICATED. |
| start_flag (1bit) | START OF CONTAINER CURRENT DATA IS INDICATED. |
| fcounter (7bits) | DIVIDED POSITION OF CONTAINER CURRENT DATA THAT HAS BEEN DIVIDED, IS INDICATED WITH NUMBER OF COUNTS IN DESCENDING ORDER.<br>"0" INDICATES LAST DIVIDED PORTION OR THAT NO DIVISION HAS BEEN PERFORMED. |
| total_data_size (16bits) | SIZE OF CONTAINER CURRENT DATA IS INDICATED. |
| num_of_access_information N (8bits) | NUMBER OF PIECES OF INFORMATION IN MEDIA ACCESS INFORMATION, IS INDICATED. |
| information_id (8bits) | ID OF MEDIA ACCESS INFORMATION IS INDICATED.<br>EACH CAN BE ASSOCIATED WITH OTHERS WITH information_id IN APPLICATION. |
| Segment_id (8bits) | information_id IS SHARED TO INDICATE ID OF EACH PIECE OF MEDIA ACCESS INFORMATION THAT HAS BEEN SEGMENTED. |
| target_segment_id (8bits) | segment_id OF DESTINATION TO WHICH OFFSET TIME IS SPECIFIED, IS INDICATED. |

FIG. 11

```
information_type  (8bits)            TYPE OF INFORMATION IS INDICATED.
        0x00    ID_tables
        0x01    access information (URL)
                url_length (8bits)      NUMBER OF CHARACTERS OF URL IS INDICATED.
        0x02    action -> command_type (8bits)
                                         1  autostart,
                                         2  manual_start
                                         3  resume
                                         4  pause
                                         5  stop
                                         6  user selected
                                         7  discard download_data
        0x03    notification -> message_type (8bits)
                                         1  preparing
                                         2  access ready
                                         3  expired
                                         4  selection
        0x04    period_id (8bits)
        0x05    timecode   time_code1  64bits
        0x06    offset_time  time_code2  64bits
        0x07    UTC         64bits
        0x08    UI selection process  BROWSER BOOT INFORMATION
                html_length (8bits)
                ENTIRE BYTE LENGTH OF EXPRESSING INFORMATION NECESSARY FOR BROWSER BOOT, IN html, IS INDICATED
                (DESCRIPTION INCLUDES THUMBNAIL INFORMATION FOR USER TO MAKE SELECTION AND ID "select_ID" INDICATING
                SELECTED RESULT).
                "select_ID" IS DELIVERED TOGETHER WITH URL INFORMATION SUPPLIED BY access information, TO SERVER SO AS
                TO CONTRIBUTE TO BOOT SELECTION OF DESIRED REPRODUCED MEDIUM.
```

FIG. 12

Audio_streaming_descriptor syntax (a)

| Syntax | No. of Bits | Format |
|---|---|---|
| Audio_streaming_descriptor( ) { | | |
| descriptor_tag | 8 | bslbf |
| descriptor_length | 8 | uimsbf |
| audio_streaming_flag | 1 | bslbf |
| reserved | 7 | 0x7f |
| } | | |
| } | | |

(b)

| audio_streaming_flag | FORMAT OF ENCODED STREAM IS INDICATED TO BE PRIORITIZED AS TRANSMISSION FORMAT |
|---|---|
| '1' | FORMAT OF ENCODED STREAM IS PRIORITIZED |
| '0' | FORMAT OF ENCODED STREAM IS NOT NECESSARILY PRIORITIZED. |

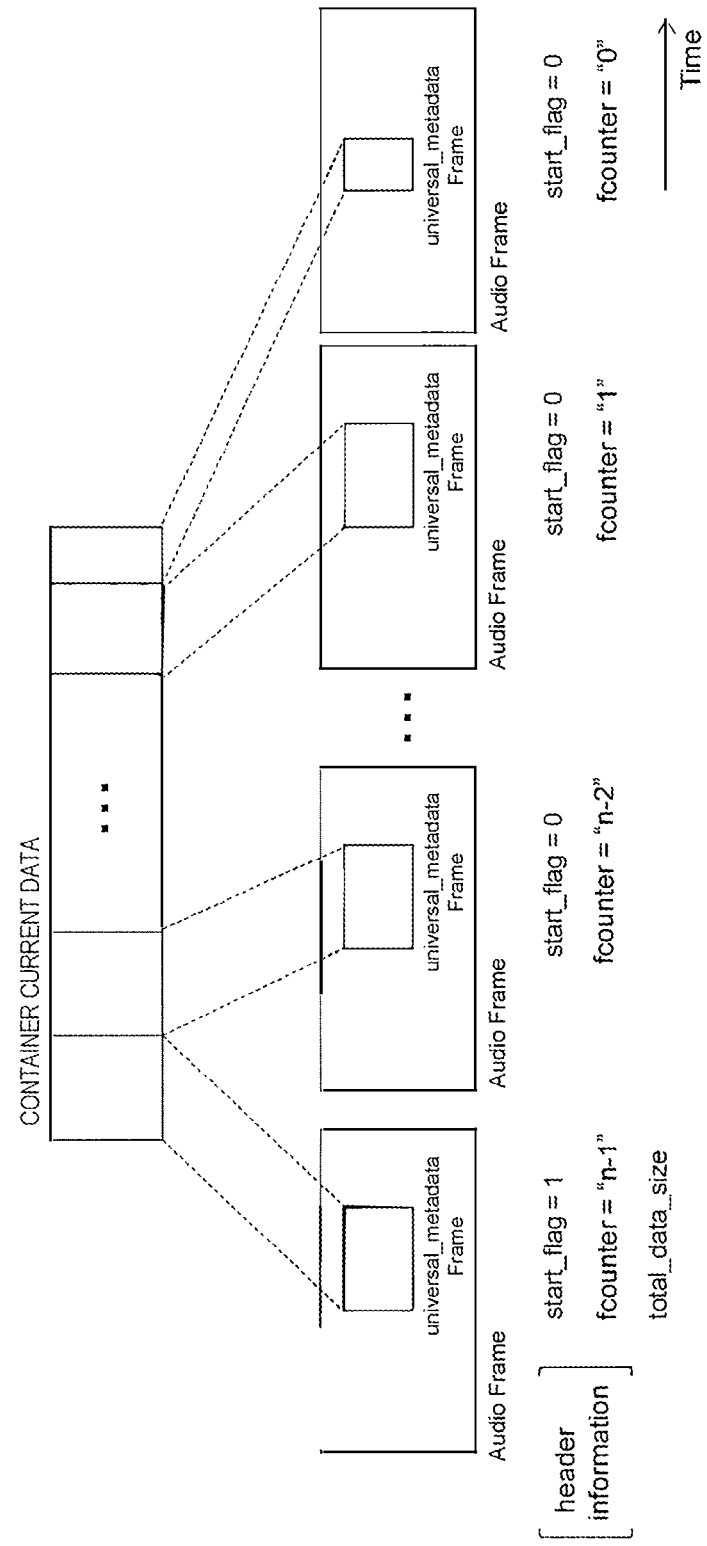

FIG. 23

(a) Access information data:
- ID tables
- URL
- period1
- notification 'preparing'
- information_id1
- reference TC= TC1
- UTC1

(b) Access information data:
- URL
- period2
- notification 'preparing'
- information_id2
- reference TC= TC2
- UTC1

(c) Access information data:
- action command 'autostart'
- notification 'access ready'
- information_id1
- offset time = oft1
(if current time > UTC1
then expired → access denied)

(d) Access information data:
- action command 'autostart'
- notification 'access ready'
- information_id2
- offset time = oft2
(if current time > UTC1
then expired → access denied)

FIG. 24

(a) Access information data:
- ID tables
- URL
- period1
- notification 'preparing'
- information_id1
- segment#1
- reference TC= TC1
- offset time = oft1
- target_segment_id = segment#3
- UTC1

(b) Access information data:
- URL
- period2
- notification 'preparing'
- information_id2
- segment#2
- reference TC= TC2
- offset time = oft2
- target_segment_id = segment#4
- UTC1

(c) Access information data:
- action command 'auto_start'
- notification 'access ready'
- information_id1
- segment#3
  (if current time > UTC1
   then expired → access denied)

(d) Access information data:
- action Command 'auto_start'
- notification 'access ready'
- information_id2
- segment#4
(if current time > UTC1
   then expired → access denied)

FIG. 26

(a) Access information data:
- ID tables
- UI selection process
- notification 'preparing'
- information_id1
- reference TC= TC1
- UTC1

(b) Access information data:
- action 'user selected'
- notification 'user selected'
- information_id1
- offset time = oft1
(if current time > UTC1
  then expired U access denied)

(c) Access information data:
- URL
- notification 'preparing'
- information_id1
- reference TC= TC2
- UTC1

(d) Access information data:
- action 'autostart'
- notification 'access ready'
- information_id1
- offset time = oft2
(if current time > UTC1
  then expired → access denied)

FIG. 29 descriptor 'Application descriptor' Syntax

| Syntax | No. of Bits | Format |
|---|---|---|
| Application_descriptor( ) { | | |
| descriptor_tag | 8 | bslbf |
| descriptor_length | 8 | uimsbf |
| data_id | 8 | uimsbf |
| Access_information_data() | | |
| } | | |
| } | | |

FIG. 36 universal_data() syntax

| Syntax | No. of Bits | Format |
|---|---|---|
| Universal_data(){ | | |
|   start_flag | 1 | bslbf |
|   fcounter | 15 | uimsbf |
|   if (start_flag == 1 ) { | | |
|     organization_id | 32 | uimsbf |
|     target_data_size | 16 | uimsbf |
|     umd_payload_size −= 6 | | |
|   } | | |
|   for (i= 0; i< umd_payload_size − 1; i++) { | | |
|     data_payload_byte | 8 | bslbf |
|   } | | |
| } | | |

*FIG. 37* start_flag (1bit)
    START OF CONTAINER CURRENT DATA IS INDICATED.
    "1"    START IS INDICATED TO BE MADE FROM PRESENT PACKET.
    "0"    NO START IS INDICATED TO BE MADE FROM PRESENT PACKET.

fcounter (7bits)
    DIVIDED POSITION OF CONTAINER CURRENT DATA THAT HAS BEEN DIVIDED,
    IS INDICATED WITH NUMBER OF COUNTS IN DESCENDING ORDER.
    "0" INDICATES LAST DIVIDED PORTION OR THAT NO DIVISION HAS BEEN PERFORMED.

organization_id (32bits)
    IDENTIFICATION VALUE UNIQUELY ALLOCATED TO INDIVIDUAL SERVICE TRANSMITTED
    IN USER DATA REGION OR PROVIDER OR STANDARD ORGANIZATION OF SERVICE, IS INDICATED.

target_data_size (16 bits)
    DATA SIZE OF CONTAINER CURRENT DATA BEFORE DIVISION, IS INDICATED IN BYTE LENGTH.

FIG. 38

AC4_datacontainer_descriptor( ) syntax

| Syntax | No. of Bits | Format |
|---|---|---|
| AC4_datacontainer_descriptor( ) { | | |
| descriptor_tag | 8 | bslbf |
| descriptor_length | 8 | uimsbf |
| umd_payload_embedded | 1 | bslbf |
| reserved | 7 | 0x7f |
| if( umd_payload_embedded ) { | | |
| umd_payload_id | 5 | uimsbf |
| audio_stream_rate | 11 | uimsbf |
| } | | |
| } | | |

FIG. 39

| | |
|---|---|
| umd_payload_embedded (1bit) | UMD PAYLOAD IS INDICATED TO BE INSERTED. |
| | 1  UMD PAYLOAD HAS BEEN INSERTED |
| | 0  NO UMD PAYLOAD HAS BEEN INSERTED |
| umd_payload_id (5bits) | IDENTIFICATION VALUE OF UMD PAYLOAD IS INDICATED. SPECIFIC VALUE IS DEFINED (E.G., "7" REPRESENTS FORMAT OF UNIVERSAL DATA CONTAINER). |
| audio_stream_rate (11bits) | DISTRIBUTION BIT RATE OF audio stream IS INDICATED. |

FIG. 43

EXEMPLARY MPD FILE DESCRIPTION

```
<MPD>
  <Period>
    <AdaptationSet mimeType="audio/mp4" group="1">
      <SupplementaryDescriptor schemeIdUri="urn:brdcst:codecType" value="AC4"/>
      <SupplementaryDescriptor schemeIdUri="urn:brdcst:coordinatedControl" value="false"/>
      <SupplementaryDescriptor schemeIdUri="urn:brdcst:UMDContained" value="true"/>
      <SupplementaryDescriptor schemeIdUri="urn:brdcst:netlink:metaInsertionFrequency" value="1"/>
      <SupplementaryDescriptor schemeIdUri="urn:brdcst:type" value="netlink"/>
      <Representation id="11" bandwidth="128000">
        <baseURL>audio/jp/128.mp4</BaseURL>
      </Representation>
    </AdaptationSet>
  </Period>
</MPD>
```

FIG. 44

```
schemeIdUri IS DEFINED BY SupplementaryDescriptor AS FOLLOWS.

schemeIdUri="urn:brdcst:codecType" INDICATES TYPE OF CODEC.
    value: "mpegh", "AAC", "AC3", OR "AC4" IS DESCRIBED schemeIdUri="urn:brdcst:coordinatedControl" INDICATES THAT INFORMATION NECESSARY FOR NET CONNECTION IS SUPPLIED
                                            IN COOPERATION BETWEEN PLURALITY OF MEDIA STREAMS.
    value: "true"      NET CONNECTION INFORMATION IS SUPPLIED IN COOPERATION WITH STREAM OF DIFFERENT
                       Adaptation Set (E.G., NET CONNECTION INFORMATION IS SUPPLIED EVEN WITH audio stream OR
                       EVEN WITH video stream).
    value: "false"     NET CONNECTION INFORMATION IS SUPPLIED WITH ONLY STREAM OF PRESENT Adaptation Set.

schemeIdUri="urn:brdcst:UMDContained" INDICATES THAT AUDIO META INFORMATION IS INCLUDED.
    value: "true"      AUDIO META INFORMATION IS INCLUDED.
    value: "false"     NO AUDIO META INFORMATION IS INCLUDED.

schemeIdUri="urn:brdcst:metaInsertionFrequency" INDICATES FREQUENCY OF SUPPLYING META INFORMATION PER ACCESS UNIT.
    value: "1"         ONE USER DATA entry OCCURS IN ONE ACCESS UNIT.
    value: "2"         PLURALITY OF USER DATA entries OCCURS IN ONE ACCESS UNIT.
    value: "3"         AT LEAST ONE USER DATA entry OCCURS DURING PERIOD SECTIONED BY RANDOM ACCESS POINTS.

schemeIdUri="urn:brdcst:type" INDICATES TYPE OF SERVICE WITH META.
    value: "netlink"   TYPE OF SERVICE WITH META IS NET CONNECTION.
```

TRANSMISSION DEVICE, TRANSMISSION METHOD, MEDIA PROCESSING DEVICE, MEDIA PROCESSING METHOD, AND RECEPTION DEVICE

CROSS-REFERENCE TO RELATED APPLICATIONS

This application is a continuation of U.S. patent application Ser. No. 15/567,650 filed Oct. 19, 2017, which is incorporated by reference in its entirety. U.S. patent application Ser. No. 15/567,650 is a National Stage of PCT/JP2016/063932 filed May 10, 2016 and claims priority to Japanese patent application nos. 2015-112709 filed Jun. 2, 2015 and 2015-217148 filed Nov. 4, 2015.

TECHNICAL FIELD

The present technology relates to a transmission device, a transmission method, a media processing device, a media processing method, and a reception device, and particularly relates to, for example, a transmission device that transmits media access information together with a media stream, such as video or audio.

BACKGROUND ART

For example, Patent Document 1 has proposed that predetermined information from, for example, a broadcasting station or a distribution server, is inserted into an audio compressed data stream so as to be transmitted, and a set top box on the reception side transmits the audio compressed data stream remaining intact to a television receiver through a digital interface of HDMI, and then the television receiver performs information processing with the predetermined information.

CITATION LIST

Patent Document

Patent Document 1: Japanese Patent Application Laid-Open No. 2012-010311

SUMMARY OF THE INVENTION

Problems to be Solved by the Invention

An object of the present technology is to enable a set of media access control to be favorably performed on the reception side.

Solutions to Problems

According to a concept of the present technology, a transmission device includes: a stream transmission unit configured to transmit a container having a predetermined format, the container including a media stream; and an information insertion unit configured to sequentially insert a predetermined number of pieces of media access information associated for a set of media access control, into a layer of the media stream or a layer of the container.

According to the present technology, the transmission unit transmits the container having the predetermined format, the container including the media stream. The information insertion unit sequentially inserts the predetermined number of pieces of media access information associated for the set of media access control, into the layer of the media stream or the layer of the container.

For example, the media access information may include identification information for making a distinction from different media access information. With the identification information, each piece of media access information is easily distinguished on the reception side.

In addition, for example, the media access information may include identification information for making an association with different media access information. With the identification information, the media access information that has been associated is easily confirmed on the reception side.

In addition, for example, the media access information may include period information indicating a corresponding scene in the media stream. With the period information, media data associated with the corresponding scene in the media stream, is easily acquired on the reception side.

In addition, for example, user interface information for a user to select a reproduced medium, may be included. With the user interface information, the user can select a desired reproduced medium on the reception side.

In addition, for example, the media access information may include time information for managing a boot of an action command. With the time information, boot timing of the action command can be flexibly managed.

In addition, for example, the media access information may include absolute time information indicating a deadline of media reproduction. With the absolute time information, the deadline of the media reproduction on the reception side can be provided.

In addition, for example, the media access information may include notification information for notifying a user of a state. With the notification information, the user can be appropriately notified of the state on the reception side.

In addition, for example, the information insertion unit may allow each piece of divided information acquired by dividing the media access portion, to be individually inserted into a predetermined number of unit portions in the media stream. In this case, for example, the media stream may include an audio compressed data stream, and the information insertion unit may insert the divided information into a user data region of an audio frame as each of the unit portions. Allowing the divided insertion in this manner, can restrain an information size to be inserted into an individual media frame even if the entire size of the media access information is large, so that no influence is exerted on the transmission of the media data and the media access information can be favorably transmitted.

According to the present technology, as described above, the predetermined number of pieces of media access information associated for the set of media access control are sequentially inserted into the layer of the media stream or the layer of the container so as to be transmitted. Therefore, the set of media access control can be favorably performed on the reception side.

In addition, according to a different concept of the present technology, a media processing device includes: a first acquisition unit configured to acquire first media data, and configured to sequentially acquire a predetermined number of pieces of media access information for a set of media access control; a second acquisition unit configured to acquire second media data associated with the first media data on the basis of the media access information; and a presentation processing unit configured to perform media presentation processing based on the first media data and the second media data.

According to the present technology, the first acquisition unit acquires the first media data, and additionally sequentially acquires the predetermined number of pieces of media access information for the set of media access control.

For example, the first acquisition unit may include: a reception unit configured to receive a container having a predetermined format, the container including a media stream, the media access information being inserted into a layer of the media stream or a layer of the container; a decode processing unit configured to perform decode processing to the media stream to acquire the first media data; and an information extraction unit configured to extract the media access information from the layer of the media stream or the layer of the container.

In addition, for example, the first acquisition unit may include: a reception unit configured to receive video data as the first media data and an audio compressed data stream into which the media access information has been inserted, from an external device through a digital interface; a decode processing unit configured to perform decode processing to the audio compressed data stream to acquire audio data as the first media data; and an information extraction unit configured to extract the media access information from the audio compressed data stream.

The second acquisition unit acquires the second media data associated with the first media data on the basis of the media access information. Then, the presentation processing unit performs the media presentation processing based on the first media data and the second media data.

According to the present technology, as described above, the predetermined number of pieces of media access information for the set of media access control are sequentially acquired together with the first media data, and the second media data is acquired on the basis of the media access information. Therefore, the presentation based on the second media data can be performed in response to the media presentation based on the first media data.

In addition, according to a different concept of the present technology, a reception device includes: a reception unit configured to receive a container having a predetermined format, the container including a media stream, a predetermined number of pieces of media access information associated for a set of media access control being sequentially inserted into a layer of the media stream or a layer of the container; and a control unit configured to control decode processing of decoding the media stream to acquire first media data, media data acquisition processing of acquiring second media data on the basis of the media access information, and media presentation processing of performing media presentation based on the first media data and the second media data.

According to the present technology, the reception unit receives the container having the predetermined format, the container including the media stream. The layer of the media stream or the layer of the container includes the predetermined number of pieces of media access information associated for the set of media access control, sequentially inserted. The control unit controls the decode processing, the media data acquisition processing, and the media presentation processing.

In the decode processing, the media stream is decoded to acquire the first media data. In the media data acquisition processing, the second media data is acquired on the basis of the media access information. Then, in the media presentation processing, the media presentation based on the first media data and the second media data is performed.

According to the present technology, as described above, the predetermined number of pieces of media access information for the set of media access control are sequentially acquired together with the first media data, and the second media data is acquired on the basis of the media access information. Therefore, the presentation based on the second media data can be performed in response to the media presentation based on the first media data.

In addition, according to a different concept of the present technology, a reception device includes: a reception unit configured to receive video data as first media data and an audio compressed data stream into which a predetermined number of pieces of media access information for a set of media access control have been sequentially inserted, from an external device through a digital interface; and a control unit configured to control decode processing of decoding the audio compressed data stream to acquire audio data as the first media data, media data acquisition processing of acquiring second media data on the basis of the media access information, and media presentation processing of performing media presentation based on the first media data and the second media data.

According to the present technology, the reception unit receives the video data as the first media data and the audio compressed data stream into which the predetermined number of pieces of media access information for the set of media access control have been sequentially inserted, from the external device through the digital interface. The control unit controls the decode processing, the media data acquisition processing, and the media presentation processing.

In the decode processing, the audio compressed data stream is decoded to acquire the audio data as the first media data. In the media data acquisition processing, the second media data is acquired on the basis of the media access information. Then, in the media presentation processing, the media presentation based on the first media data and the second media data is performed.

According to the present technology, as described above, the predetermined number of pieces of media access information for the set of media access control are sequentially acquired together with the first media data, and the second media data is acquired on the basis of the media access information. Therefore, the presentation based on the second media data can be performed in response to the media presentation based on the first media data.

In addition, according to a different concept of the present technology, a transmission device includes: a transmission unit configured to transmit a container having a predetermined format, the container including an audio encoded stream into which predetermined information has been inserted; and an information insertion unit configured to insert, into a layer of the container, information indicating that a format of an encoded stream is prioritized as a transmission format of audio data.

According to the present technology, the transmission unit transmits the container having the predetermined format, the container including the audio encoded stream into which the predetermined information has been inserted. For example, the predetermined information, the predetermined information, may include a predetermined number of pieces of media access information associated for a set of media access control. The information insertion unit inserts, into the layer of the container, the information indicating that the format of the encoded stream is prioritized as the transmission format of the audio data.

According to the present technology, as described above, the information indicating that the format of the encoded stream is prioritized as the transmission format of the audio data, is inserted into the layer of the container. Therefore, the format of the encoded stream can be prioritized as the transmission format of the audio data on the reception side so that the predetermined information inserted into the encoded stream can be securely supplied from a reception device to an external device (a destination device).

In addition, according to a different concept of the present technology, a transmission device includes: a transmission unit configured to transmit a container having a predetermined format, the container including a media stream; and an information insertion unit configured to add, to media access information, checking information for checking a provider of media data acquired with the media access information, to insert the media access information into a layer of the media stream or a layer of the container.

According to the present technology, the transmission unit transmits the container having the predetermined format, the container including the media stream. The information insertion unit inserts the media access information into the layer of the media stream or the layer of the container. The media access information has been added with the checking information for checking the provider of the media data acquired with the media access information. For example, the checking information may include an identification value uniquely allocated to an individual service based on the media access information or a provider or standard organization of the service.

According to the present technology, as described above, the media access information to be inserted into the layer of the media stream or the layer of the container, is added with the checking information for checking the provider of the media data acquired with the media access information. Therefore, the provider of the media data acquired with the media access information, can be easily checked on the reception side.

In addition, according to a different concept of the present technology, a media processing device includes: a media access information acquisition unit configured to acquire media access information, the media access information being added with checking information for checking a provider of media data acquired with the media access information; a media data acquisition unit configured to acquire the media data on the basis of the media access information; and a provider checking unit configured to check the provider of the media data that has been acquired, on the basis of the checking information.

According to the present technology, the media access information acquisition unit acquires the media access information. The media access information has been added with the checking information for checking the provider of the media data acquired with the media access information. The media data acquisition unit acquires the media data on the basis of the media access information. Then, the provider checking unit checks the provider of the media data that has been acquired, on the basis of the checking information.

According to the present technology, as described above, the provider of the media data acquired with the media access information, is checked on the basis of the checking information added to the media access information. Therefore, the provider of the media data acquired with the media access information, can be simply and easily checked.

Effects of the Invention

According to the present technology, the set of media access control can be favorably performed on the reception side. Note that the effects described in the present specification are, but are not limited to, just exemplifications, and thus additional effects may be provided.

BRIEF DESCRIPTION OF DRAWINGS

FIG. 5 is a table of the correspondence relationship between a type of extension element and a value thereof.

FIG. 6 is a table of an exemplary configuration of a universal metadata frame including universal metadata as the extension element.

FIG. 7 is a table (1/3) of an exemplary configuration of access information data having the media access information.

FIG. 8 is a table (2/3) of the exemplary configuration of the access information data having the media access information.

FIG. 9 is a table (3/3) of the exemplary configuration of the access information data having the media access information.

FIG. 10 is a table (1/2) of the content of main information in the universal metadata frame and the access information data.

FIG. 11 is a table (2/2) of the content of the main information in the universal metadata frame and the access information data.

FIG. 12 is a table of an exemplary structure of an audio streaming descriptor and the content of main information in the exemplary structure.

FIG. 13 is a diagram of an exemplary case where container current data is transmitted in a plurality of universal metadata frames.

FIG. 23 is a table of exemplary information included in each piece of media access information.

FIG. 24 is a table of different exemplary information included in each piece of media access information.

FIG. 26 is a table of exemplary information included in each piece of media access information.

FIG. 29 is a table of an exemplary structure of an application descriptor.

FIG. 36 is a table of an exemplary structure of universal data.

FIG. 37 is a table of the content of main information in the exemplary structure of the universal data.

FIG. 38 is a table of an exemplary structure of an AC4 data container descriptor.

FIG. 39 is a table of the content of main information in the exemplary structure of the AC4 data container descriptor.

FIG. 43 is a table of an exemplary MPD file description.

FIG. 44 is a table of the content of main information in the exemplary MPD file description.

MODE FOR CARRYING OUT THE INVENTION

A mode for carrying out the invention (hereinafter, referred to as an "embodiment") will be described below. Note that the descriptions will be given in the following order.

1. Embodiment
2. Modification

1. Embodiment

[Exemplary Configuration of Transmission and Reception System]

Figure 1:
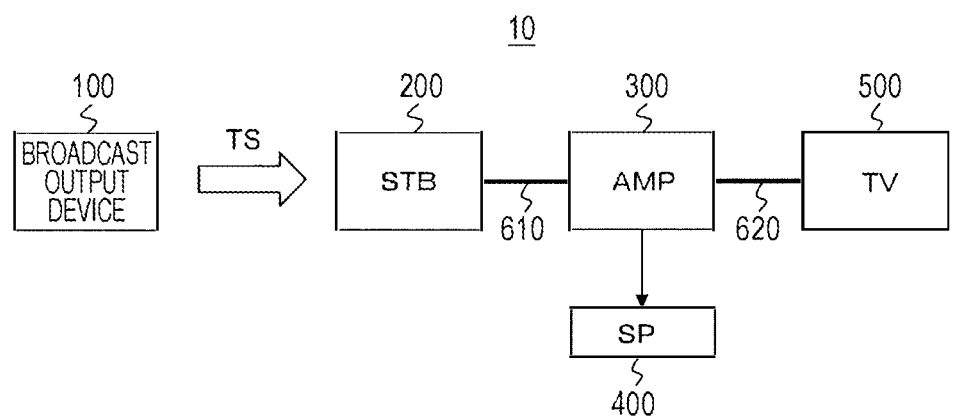
FIG. 1 is a block diagram of an exemplary configuration of a transmission and reception system according to an embodiment.

FIG. 1 illustrates an exemplary configuration of a transmission and reception system 10 according to the embodiment. The transmission and reception system 10 includes a broadcast output device 100, a set top box (STB) 200, an audio amplifier (AMP) 300, and a television receiver (TV) 500. A multi-channel speaker system 400 is connected to the audio amplifier 300.

The set top box 200 and the audio amplifier 300 are connected through an HDMI cable 610. In this case, the set top box 200 is a source and the audio amplifier 300 is a destination. In addition, the audio amplifier 300 and the television receiver 500 are connected through an HDMI cable 620. In this case, the audio amplifier 300 is the source and the television receiver 500 is the destination. Note that "HDMI" is a registered trademark.

The broadcast output device 100 transmits a transport stream TS through a broadcast wave. The transport stream TS includes a video stream and an audio stream (an audio compressed data stream and an audio encoded stream). The broadcast output device 100 sequentially inserts, as container current data, a predetermined number of pieces of media access information associated for a set of media access control, into the audio stream.

Each piece of media access information includes identification information "data id" for making a distinction from different media access information and identification information "information id" for making an association with the different media access information.

In addition, each piece of media access information selectively includes information, such as an ID table (ID_tables), access information (access information), an action command (action command), a notification (notification), a period (period), a reference time code (reference time process), an offset time (offset_time), a universal time code (UTC: universal time code), a UI selection process (UI selection code).

The ID table (ID_tables) includes, for example, an application ID (applicatio_id), a network ID (network_id), a transport ID (transport_id), and a service ID (service_id). The application ID indicates, for example, a hybrid service (hybrid service). The network ID is an original network ID. The transport ID is a transport ID for an object to be associated. The service ID is a service information ID to be associated. Each ID in the ID table and an organization ID (organization_id) indicating, for example, ATSC or DVB are included in identification information on a service to be supplied through the broadcast wave.

The access information (access information) indicates the URL of an access destination. The action command (action command) is a command for booting an action, such as an auto start (autostart) or a manual start (manual_start). The notification (notification) indicates notification information (a message) for notifying a user of a state. The period (period) is period information indicating the corresponding scene in the audio stream.

The reference time code (reference time code) and the offset time (offset_time) are each time information for managing the boot of the action command. The UTC (universal time process) is absolute time information indicating the deadline of media reproduction. The UI selection process (UI selection code) is user interface information for the user to select a reproduced medium.

The broadcast output device 100 individually divides and inserts the predetermined number of pieces of media access information, into a predetermined number of audio frames in the audio stream. With the division in this manner, even if the entire size of the media access information is large, the information size to be inserted into each of the audio frames can be restrained so that no influence is exerted on transmission of audio compressed data and the predetermined information can be transmitted.

At this time, the broadcast output device 100 adds information indicating the entire size of the predetermined information, to a first piece of divided information, and adds information indicating whether each is the first piece of divided information and information indicating a divided position, to each piece of divided information. Note that the predetermined number includes one. When the predetermined number is one, the media access information is not divided in practice, and the entirety is inserted into one audio frame.

Figure 2:
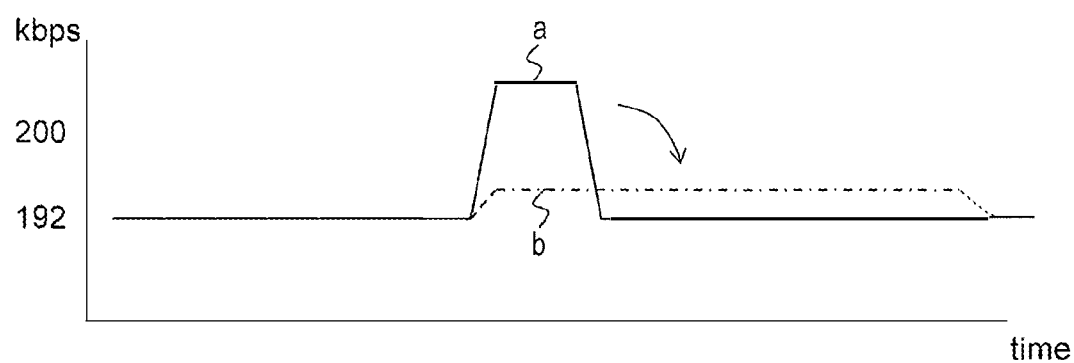
FIG. 2 is a graphical representation for describing the effect of dividing and transmitting media access information.

A solid line a of FIG. 2 schematically indicates a variation in bit rate in a case where the predetermined information having the entire size large is transmitted in one audio frame. The variation rapidly increases in the audio frame into which the media access information is inserted. In this case, when, for example, the bit rate of the audio compressed data is 192 kbps and the predetermined information is 40 bytes, the bit rate increases by 15 kbps so as to be 207 kbps. In a case where the bit rate rapidly increases in a spike shape in this manner, the influence is exerted on the transmission of the audio compressed data.

Meanwhile, a broken line b of FIG. 2 schematically indicates a variation in bit rate in a case where the media access information having the entire size large is divided into a plurality of audio frames so as to be transmitted. In this case, the bit rate does not rapidly increase. Therefore, no influence is exerted on the transmission of the audio compressed data so that the media access information having the entire size large can be favorably transmitted.

In addition, the broadcast output device 100 inserts information indicating that the format of an encoded stream is prioritized as the transmission format of audio data (transmission format priority information), into a layer of the transport stream TS as a container. For example, the broadcast output device 100 inserts, as a descriptor, the information into an audio elementary stream loop present under a program map table (PMT).

The set top box 200 receives the transport stream TS transmitted through the broadcast wave from the broadcast output device 100. The transport stream TS includes, as described above, the video stream and the audio stream, and the predetermined number of pieces of media access information associated for the set of media access control, are sequentially inserted into the audio stream.

The set top box 200 transmits the audio stream that has been received, remaining intact, together with uncompressed video data acquired by performing decode processing to the video stream, to the audio amplifier 300 through the HDMI cable 610. In this case, the set top box 200 performs no decode processing to the audio stream, and transmits the audio stream remaining intact to the audio amplifier 300, on the basis of the transmission format priority information described above that has been inserted into the layer of the transport stream TS. With this arrangement, the media access information that has been inserted into the audio stream, remaining intact, is also transmitted to the audio amplifier 300.

The audio amplifier 300 receives the audio stream into which the media access information has been inserted, together with the uncompressed video data, from the set top box 200 through the HDMI cable 610. The audio amplifier 300 performs decode processing to the audio stream so as to acquire multi-channel audio data, and then supplies the audio data to the speaker system 400.

In addition, the audio amplifier 300 transmits the uncompressed video data and the audio stream that have been received, to the television receiver 500 through the HDMI cable 620. With this arrangement, the media access information inserted into the audio stream, remaining intact, is also transmitted to the television receiver 500. In this case, the set top box 200 instructs the audio amplifier 300 to prioritize the format of the encoded stream as the transmission format of the audio data, through communication with, for example, a CEC line.

The television receiver 500 receives the audio stream into which the predetermined number of pieces of media access information associated for the set of media access control have been sequentially inserted, together with the uncompressed video data, from the audio amplifier 300 through the HDMI cable 620. The television receiver 500 displays an image based on the uncompressed video data. In addition, the television receiver 500 performs decode processing to the audio stream so as to acquire the media access information.

The media access information has been divided and inserted into the predetermined number of audio frames in the audio stream. The information indicating the entire size of the media access information, is added to the first piece of divided information, and the information indicating whether each is the first piece of divided information and the information indicating the divided position, are added to each piece of divided information. On the basis of these pieces of information, the television receiver 500 acquires, from the predetermined number of audio frames, each piece of divided information included in the media access information.

In this case, the television receiver 500 recognizes the information indicating the entire size of the media access information, at the point in time when the first piece of divided information is acquired. Then, the television receiver 500 can secure a space for accumulating the predetermined information into a storage medium so that acquisition processing of the media access information can be easily and appropriately performed.

The television receiver 500 acquires media data on the basis of the predetermined number of pieces of media access information associated for the set of media access control. Then, the television receiver 500 performs an image display and an audio output based on the media data acquired on the basis of the media access information, in response to, for example, an image display and an audio output based on the data in video and audio transmitted from the set top box 200.

[Stream Generation Unit of Broadcast Output Device]

Figure 3:
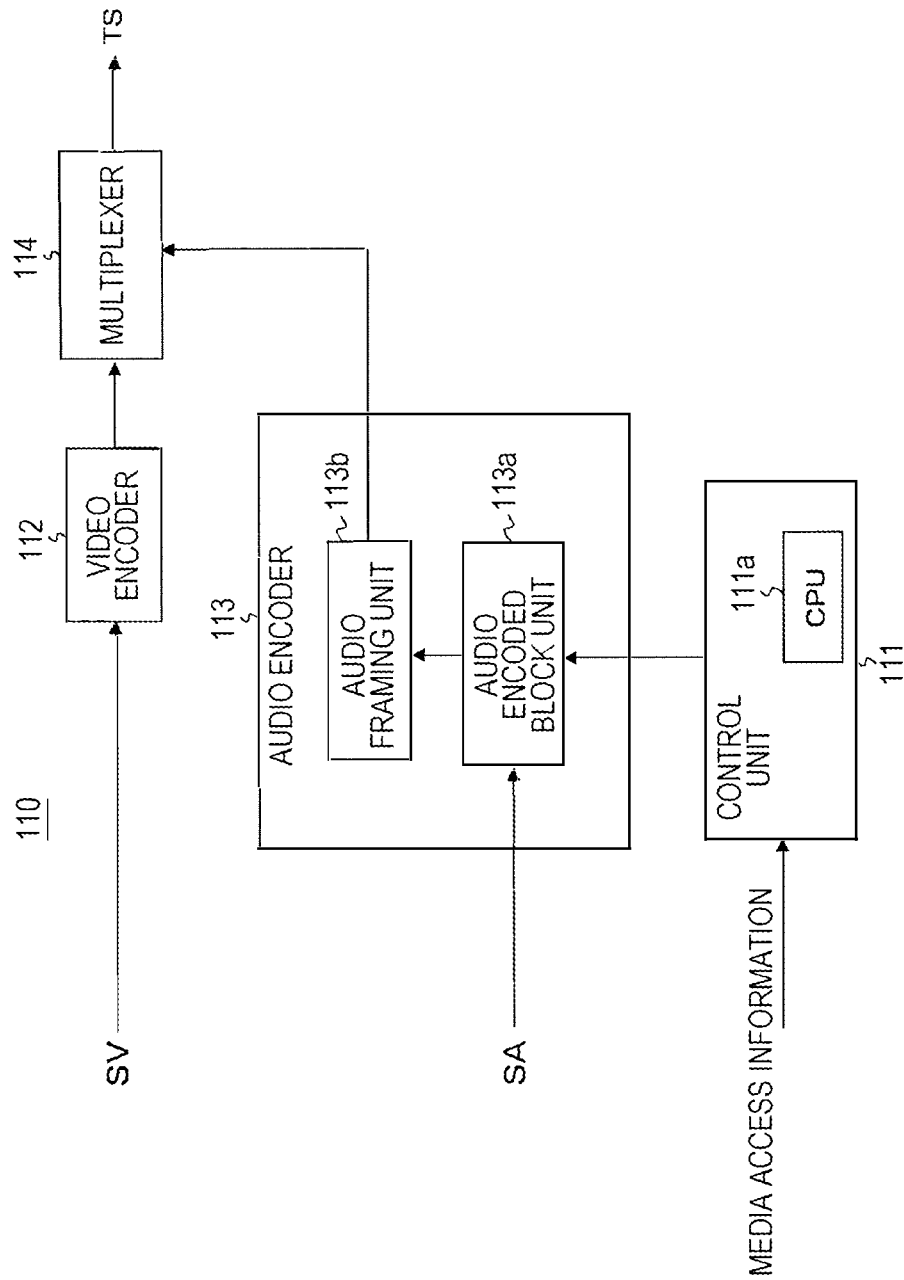
FIG. 3 is a block diagram of an exemplary configuration of a stream generation unit included in a broadcast output device.

FIG. 3 illustrates an exemplary configuration of a stream generation unit 110 included in the broadcast output device 100. The stream generation unit 110 includes a control unit 111, a video encoder 112, an audio encoder 113, and a multiplexer 114.

The control unit 111 includes a CPU 111a to control each unit of the stream generation unit 110. The video encoder 112 performs encoding, such as MPEG2, H.264/AVC, or H.265/HEVC, to video data (image data) SV so as to generate the video stream (a video elementary stream). For example, the video data SV includes video data reproduced from a recording medium, such as a hard disk drive (HDD), or live video data acquired by a video camera.

The audio encoder 113 performs encoding in the compressed format of MPEG-H 3D Audio, to audio data (audio data) SA so as to generate the audio stream (an audio elementary stream). The audio data SA corresponds to the video data SV described above, and includes audio data reproduced from the recording medium, such as the HDD, or live audio data acquired by a microphone.

The audio encoder 113 includes an audio encoded block unit 113a and an audio framing unit 113b. The audio encoded block unit 113a generates an encoded block, and the audio framing unit 113b performs framing.

Under the control of the control unit 111, the audio encoder 113 sequentially inserts, as the container current data, the predetermined number of pieces of media access information associated for the set of media access control, into the audio stream. The audio encoder 113 individually divides and inserts the predetermined number of pieces of media access information into the predetermined number (including one) of audio frames in the audio stream. At this time, the audio encoder 113 adds the information indicating the entire size of the predetermined information, to the first piece of divided information. In addition, the audio encoder 113 adds, to each piece of divided information, the information indicating whether each is the first piece of divided information and the number of counts in descending order as the information indicating the divided position.

Figure 4:
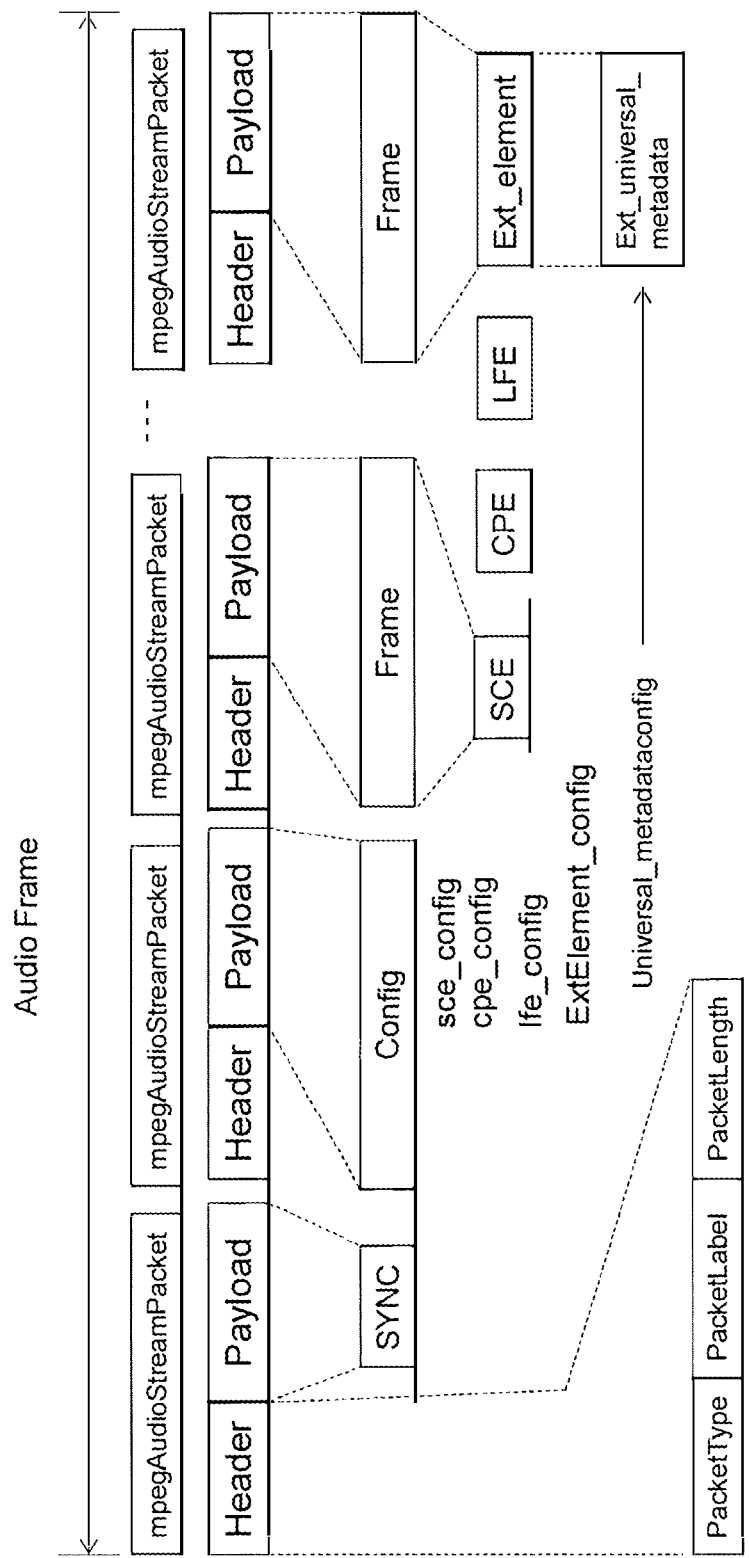
FIG. 4 is a diagram of an exemplary structure of an audio frame in transmission data of MPEG-H 3D Audio.

FIG. 4 illustrates an exemplary structure of an audio frame in transmission data of MPEG-H 3D Audio. The audio frame includes a plurality of MPEG audio stream packets (mpeg Audio Stream Packet). Each MPEG audio stream packet includes a header (Header) and a payload (Payload).

The header has information, such as a packet type (Packet Type), a packet label (Packet Label), and a packet length (Packet Length). The payload includes information defined with the packet type of the header, arranged. The payload information includes "SYNC" corresponding to a synchronous start code, "Frame" being actual data of the transmission data of the 3D audio, or "Config" indicating the configuration of the "Frame", present.

The "Frame" includes channel encoded data or object encoded data included in the transmission data of the 3D audio. Here, the channel encoded data includes encoded sample data, such as a single channel element (SCE), a channel pair element (CPE), or a low frequency element (LFE). In addition, the object encoded data includes metadata for mapping the encoded sample data of the single channel element (SCE) to a speaker present at an arbitrary position to perform rendering. The metadata is included as an extension element (Ext_element).

According to the present embodiment, an element (Ext_universal_metadata) having the media access information as universal metadata (universal_metadata), is newly defined as the extension element (Ext_element). With this arrangement, configuration information (universal_metadataConfig) of the element is newly defined to the "Config".

FIG. 5 illustrates the corresponding relationship between a type (ExElementType) of the extension element (Ext_element) and a value (Value) thereof. The current state has 0 to 7 determined. Except MPEG, extension can be made by 128 or more, and thus, for example, 128 is newly defined as the value of the type of "ID_EXT_ELE_universal_metadata". Note that definition can be made with 8 to 127 for a standard, such as MPEG.

FIG. 6 illustrates an exemplary structure (syntax) of a universal metadata frame (universal metadata frame( )) including the universal metadata as the extension element. FIGS. 7, 8, and 9 each illustrate an exemplary structure (syntax) of access information data (Access_information_data( )) inserted into "bytes to carry access information data" in a predetermined number (including one) of the universal metadata frames. FIGS. 10 and 11 each illustrate the content (semantics) of main information in each exemplary structure.

In the universal metadata frame (universal_metadata_frame( )), the 32-bit field of "organization_id" indicates an identification value uniquely allocated to an individual service transmitted in a user data region or the provider or standard organization of the service (e.g., "ATSC" or "DVB"). The 8-bit field of "metadata_type" indicates the type of the container current data. For example, "0x10" indicates the universal metadata in an MPEG-H format and "0x02" indicates application metadata of ATSC. The 8-bit field of "data id" indicates the ID of the container current data (the media access information). The same ID is added to each piece of divided information acquired by dividing the same container current data.

The 1-bit field of "start_flag" indicates whether the container current data starts. "1" indicates the start, and "0" indicates no start. The 7-bit field of "fcounter" indicates the divided position of the container current data that has been divided, with the number of counts in descending order. "0" indicates the last divided portion. A case where the "start flag" is "1" and the"fcounter" is "0", indicates that no division has been performed.

When the "start flag" is "1", the 16-bit field of "total_data_size" is present. The field indicates the size of the container current data. The entirety of the access information data (Access_information_data( )) or part thereof (the divided information) is inserted into the field of the "bytes_to_carry_access_information_data".

In the access information data (Access_information_data( ), the 8-bit field of "num_of_access_information; N" indicates the number of pieces of information N in the media access information. The 8-bit field of "information_id" indicates the ID of the media access information. The same ID is added to the predetermined number of pieces of media access information in association. That is, each piece of media access information can be associated, with the "information_id" in an application. The 8-bit field of "segment_id" shares the "information_id" so as to indicate the ID of each piece of media access information that has been segmented.

The access information data (Access_information_data( )) includes N number of the pieces of information indicated with the "num_of_access_information; N". The 8-bit field of "information_type" indicates the type of the information. "0x00" indicates an ID table (ID_tables). When the type of the information is the ID table, the respective 16-bit fields indicating an application ID (applicatio_id), a network ID (network_id), a transport ID (transport_id), and a service ID (service_id), are present.

"0x01" indicates access information (access information). When the type of the information is the access information, the code of each character of a URL is arranged in the field of "bytes". Note that the 8-bit field of "url_length" indicates the number of the characters of the URL.

"0x02" indicates an action command (action command). When the type of the information is the action command, the 8-bit field of "command_type" is present. For example, "1" indicates an auto start (autostart), "2" indicates a manual start (manual_start), "3" indicates a resume (resume), "4" indicates a pause (pause), "5" indicates a stop (stop), "6"

indicates a user selected (user selected), and "7" indicates discard download data (discard download_data).

"0x03" indicates a notification (notification). When the type of the information is the notification, the 8-bit field of "message type" is present. For example, "1" indicates preparing (preparing), "2" indicates an access ready (access ready), "3" indicates an expired (expired), and "4" indicates a selection (selection).

"0x04" indicates a period (period). When the type of the information is the period, the 8-bit field of "period id" is present. "0x05" indicates a reference time code (reference time code). When the type of the information is the reference time code, the 64-bit field of "time_code1" is present.

"0x06" indicates an offset time (offset_time). When the type of the information is the offset time, the 64-bit field of "time_code2" and the 8-bit field of "target_segment_id" are present. The fields indicate the "segment_id" of the media access information at a destination to which the offset time is specified. Note that, in a case where its own offset time is specified, the "target_segment_id" may not be present.

"0x07" indicates a UTC (universal time code). When the type of the information is the UTC, the 64-bit field of "UTC" is present.

"0x08" indicates a UI selection process (UI selection code). When the type of the information is the UI selection process, the user interface information for the user to select a reproduced medium, is arranged in the field of "data". The user interface information is, for example, HTML data including information necessary for a browser boot, described. The description includes, for example, thumbnail information for the user to make a selection and an ID "select ID" indicating a selected result. Note that the 8-bit field of "html length" is information for achieving a browser function, and indicates the byte length of the associated HTML data.

Referring back to FIG. 3, the multiplexer 114 performs PES packetization and further performs transport packetization to the video stream output from the video encoder 112 and the audio stream output from the audio encoder 113 so as to perform multiplexing, so that the transport stream TS is acquired as a multiplexed stream.

In addition, the multiplexer 114 inserts, under the program map table (PMT), the information indicating that the format of the encoded stream (the audio compressed data stream) is prioritized as the transmission format of the audio data (the transmission format priority information). Specifically, an audio streaming descriptor (Audio_streaming_descriptor( )) is inserted into the audio elementary stream loop.

FIG. 12(a) illustrates an exemplary structure (Syntax) of the audio streaming descriptor. In addition, FIG. 12(b) illustrates the content (Semantics) of main information in the exemplary structure.

The 8-bit field of "descriptor tag" indicates a descriptor type. Here, the audio streaming descriptor is represented. The 8-bit field of "descriptor length" indicates the length (size) of the descriptor, and indicates the byte length of the subsequent as the length of the descriptor.

The 1-bit field of "audio streaming flag" indicates that the format of the coded stream is prioritized as the transmission format of the audio data. "1" indicates that the format of the encoded stream is prioritized, and "0" indicates that the format of the encoded stream is not necessarily prioritized. According to the embodiment, the "audio streaming flag" is set to "1".

The operation of the stream generation unit 110 illustrated in FIG. 3 will be simply described. The video data SV is supplied to the video encoder 112. The video encoder 112 performs the encoding, such as H.264/AVC or H.265/HEVC, to the video data SV so as to generate the video stream including encoded video data.

In addition, the audio data SA is supplied to the audio encoder 113. The audio encoder 113 performs the encoding in the compressed format of MPEG-H 3D Audio to the audio data SA so as to generate the audio stream (the audio compressed data stream).

On this occasion, the control unit 111 supplies, as the container current data, the media access information to be inserted into the audio stream, to the audio encoder 113. The audio encoder 113 divides and inserts the container current data (the media access information) into the predetermined number (including one) of audio frames in the audio stream.

At this time, the audio encoder 113 adds the information indicating the entire size of the container current data (the media access information), to the first piece of divided information. In addition, the audio encoder 113 adds the information indicating whether each is the first piece of divided information and the number of counts in descending order as the information indicating the divided position, to each piece of divided information.

The video stream generated by the video encoder 112 is supplied to the multiplexer 114. In addition, the audio stream generated by the audio encoder 113 is supplied to the multiplexer 114. Then, the multiplexer 114 packetizes and multiplexes the respective streams supplied from the encoders so as to acquire the transport stream TS as transmission data.

In addition, the multiplexer 114 inserts the audio streaming descriptor (refer to FIG. 12(a)) into the audio elementary stream loop under the program map table (PMT). The descriptor includes the information indicating that the format of the encoded stream (the audio compressed data stream) is prioritized as the transmission format of the audio data (the transmission format priority information).

[Insertion of Container Current Data (Predetermined Information)]

The insertion of the container current data into the audio stream, will be further described. FIG. 13 illustrates an exemplary case where the container current data (the media access information) is transmitted in a plurality of the universal metadata frames.

In this case, the container current data is divided into at least two, and then a plurality of pieces of divided information is individually distributed to the plurality of the universal metadata frames so as to be inserted into the field of the "bytes_to_carry_access_information_data" (refer to FIG. 6). Here, the "start flag" corresponding to the first piece of divided information, is set to "1" so as to represent the first piece of divided information. In addition, the "fcounter" corresponding to the first piece of divided information, is set to "n−1", and adding 1 to the value indicates the number of divisions "n". In addition, the field of the "total_data_size" is present in response to the first piece of divided information so that the entire size of the container current data (the media access information) is indicated.

The "start_flag" corresponding to each of the second and subsequent pieces of divided information, is set to "0" so as to represent no first piece of divided information. In addition, the "fcounter" corresponding to each of the second and subsequent pieces of divided information, is set to the number of counts decremented sequentially from the "n−1", so that the divided position is indicated and additionally the number of the remaining pieces of divided information is indicated. In addition, the "fcounter" corresponding to the last piece of divided information, is set to "0" so as to represent the last piece of divided information.

Note that it is considered that the "fcounter" corresponding to the first piece of divided information is set to "n", the "fcounter" corresponding to each of the second and subsequent pieces of divided information is set to the number of count decremented sequentially from the "n", and the "fcounter" corresponding to the last piece of divided information is set to "1". The "n" of the "fcounter" corresponding to the first piece of divided information indicates the number of divisions, and the "1" of the "fcounter" represents the last piece of divided information.

Figure 14:
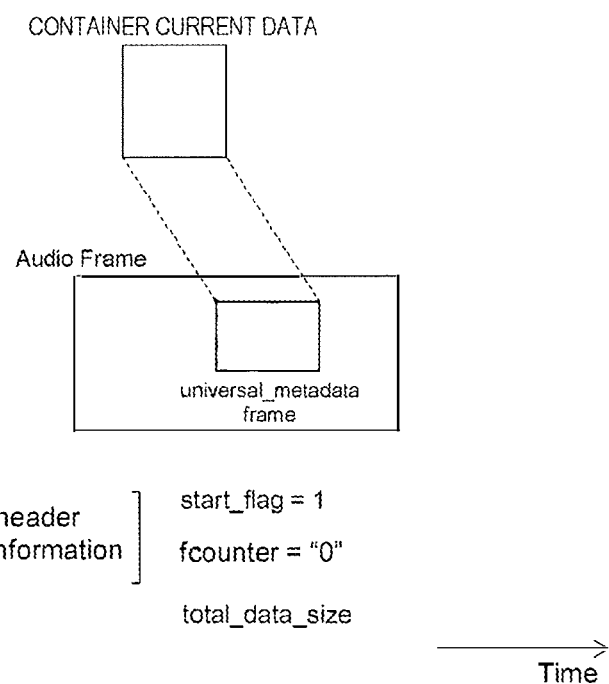
FIG. 14 is a diagram of an exemplary case where the container current data is transmitted in one universal metadata frame.

FIG. 14 illustrates an exemplary case where the container current data (the media access information) is transmitted in one universal_metadata_frame. In this case where the container current data is not divided but is inserted into the field of the "bytes_to_carry_access_information_data" of the universal metadata frame (refer to FIG. 6). Here, the "start flag" is set to "1" so as to represent the first piece of divided information. In addition, the "fcounter" is set to "0" so as to represent the last piece of divided information. Therefore, these pieces of information indicate that no division has been performed. In addition, the field of the "total_data_size" is present in response to the first piece of divided information so that the entire size of the container current data (the media access information) is indicated.

Figure 15:
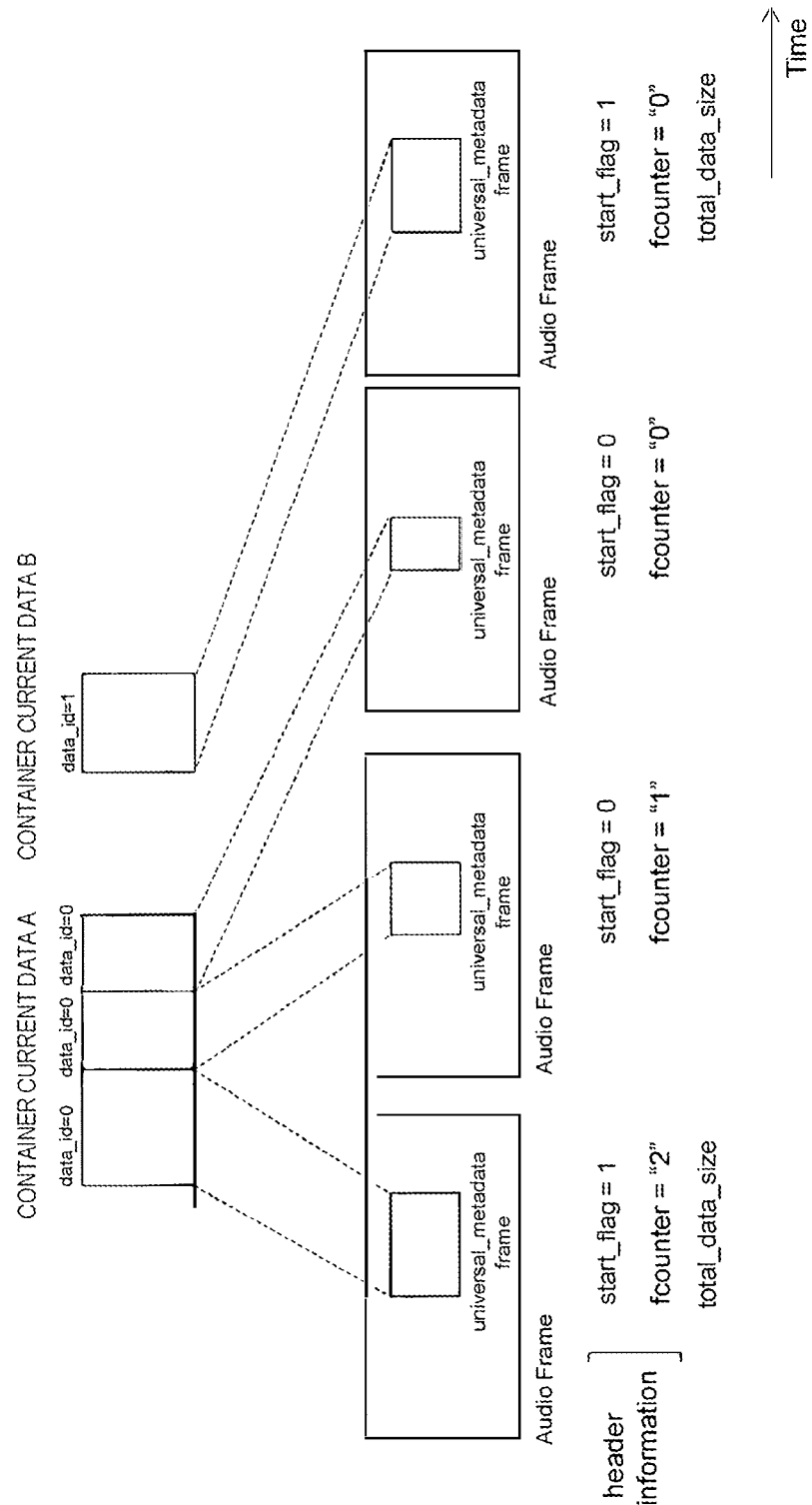
FIG. 15 is a diagram of an exemplary case where a plurality of pieces of the container current data is transmitted in a plurality of universal metadata frames.

FIG. 15 illustrates an exemplary case where a plurality of pieces of the container current data (the media access information) is transmitted in a plurality of the universal metadata frames. The illustrated example is for a case where two pieces of the container current data including container current data A having the "data id" indicated with "0" and container current data B having the "data id" indicated with "1", are transmitted.

In this case where the container current data A is divided into three, and three pieces of divided information are individually distributed to a trio of the universal metadata frames so as to be inserted into the field of the bytes_to_carry_access_information_data" (refer to FIG. 6). Here, the "start flag" corresponding to the first piece of divided information, is set to "1" so as to represent the first piece of divided information. In addition, the "fcounter" corresponding to the first piece of divided information, is set to "2", and adding 1 to the value indicates that the number of divisions is "3". In addition, the field of the "total_data_size" is present in response to the first piece of divided information so that the entire size of the container current data (the media access information) is indicated.

The "start_flag" corresponding to the second piece of divided information, is set to "0" so as to represent no first piece of divided information. In addition, the "fcounter" corresponding to the second piece of divided information, is set to "1" so as to indicate the divided position and additionally to indicate that the number of the remaining pieces of divided information is "1". In addition, the "start_flag" corresponding to the last piece of divided information, is set to "0" so as to represent no last piece of divided information. Then, the "fcounter" corresponding to the last piece of divided information, is set to "0" so as to represent the last piece of divided information.

In addition, the container current data B is not divided but is inserted into the field of the "bytes_to_carry_access_information_data" in the universal metadata frame (refer to FIG. 6). Here, the "start_flag" is set to "1" so as to represent the first piece of divided information. In addition, the "fcounter" is set to "0" so as to represent the last piece of divided information. Therefore, these pieces of information indicate that no division has been performed. In addition, the field of the "total_data_size" is present in response to the first piece of divided information so that the entire size of the container current data (the media access information) is indicated.

[Exemplary Structure of Transport Stream TS]

Figure 16:
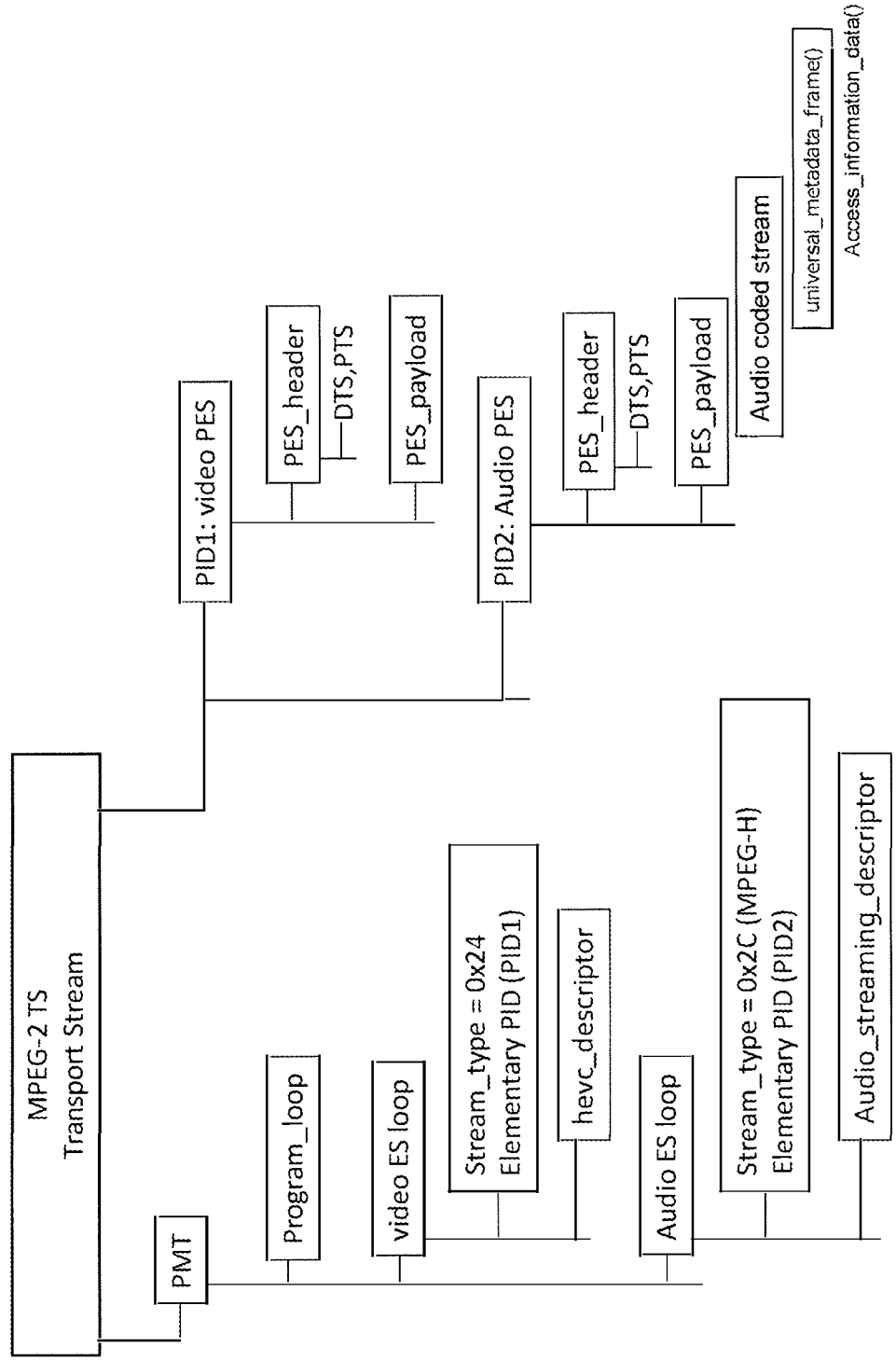
FIG. 16 is a diagram of an exemplary structure of a transport stream TS in a case where the media access information (the container current data) is inserted into an audio stream so as to be sent.

FIG. 16 illustrates an exemplary structure of the transport stream TS. The exemplary structure includes a PES packet of the video stream "video PES" identified with a PID1 present and additionally includes a PES packet of the audio stream "audio PES" identified with a PID2 present. The PES packets each include a PES header (PES header) and a PES payload (PES payload). The time stamps of a DTS and a PTS are inserted into the PES header.

The audio stream (Audio coded stream) is inserted into the PES payload of the PES packet of the audio stream. The access information data (Access_information_data( )) including the media access information (the container current data) (refer to FIGS. 7 to 9) is inserted into the universal metadata frame (universal_metadata_frame( )) in the predetermined number (including one) of audio frames in the audio stream.

In addition, the transport stream TS includes the program map table (PMT) as program specific information (PSI). The PSI is information describing to which program each elementary stream included in the transport stream belongs. The PMT includes a program loop (Program loop) describing information relating to the entire programs, present.

In addition, the PMT includes an elementary stream loop having information associated with each elementary stream, present. The exemplary configuration includes a video elementary stream loop (video ES loop) corresponding to the video stream, present and additionally includes an audio elementary stream loop (audio ES loop) corresponding to the audio stream, present.

The video elementary stream loop (video ES loop) includes information, such as a stream type and a PID (a packet identifier), arranged in response to the video stream, and additionally includes a descriptor describing information associated with the video stream, arranged. The value of "Stream_type" of the video stream is set to "0x24" and the PID information indicates the PID1 added to the PES packet of the video stream "video PES", as described above. As one exemplary descriptor, an HEVC descriptor is arranged.

In addition, the audio elementary stream loop (audio ES loop) includes information, such as a stream type and a PID (the packet identifier), arranged in response to the audio stream, and additionally includes a descriptor describing information relating to the audio stream, arranged. The value of "Stream_type" of the audio stream is set to "0x2C" and the PID information indicates the PID2 added to the PES packet of the audio stream "audio PES", as described above. As one exemplary descriptor, the audio streaming descriptor described above is arranged.

[Exemplary Configuration of Set Top Box]

Figure 17:
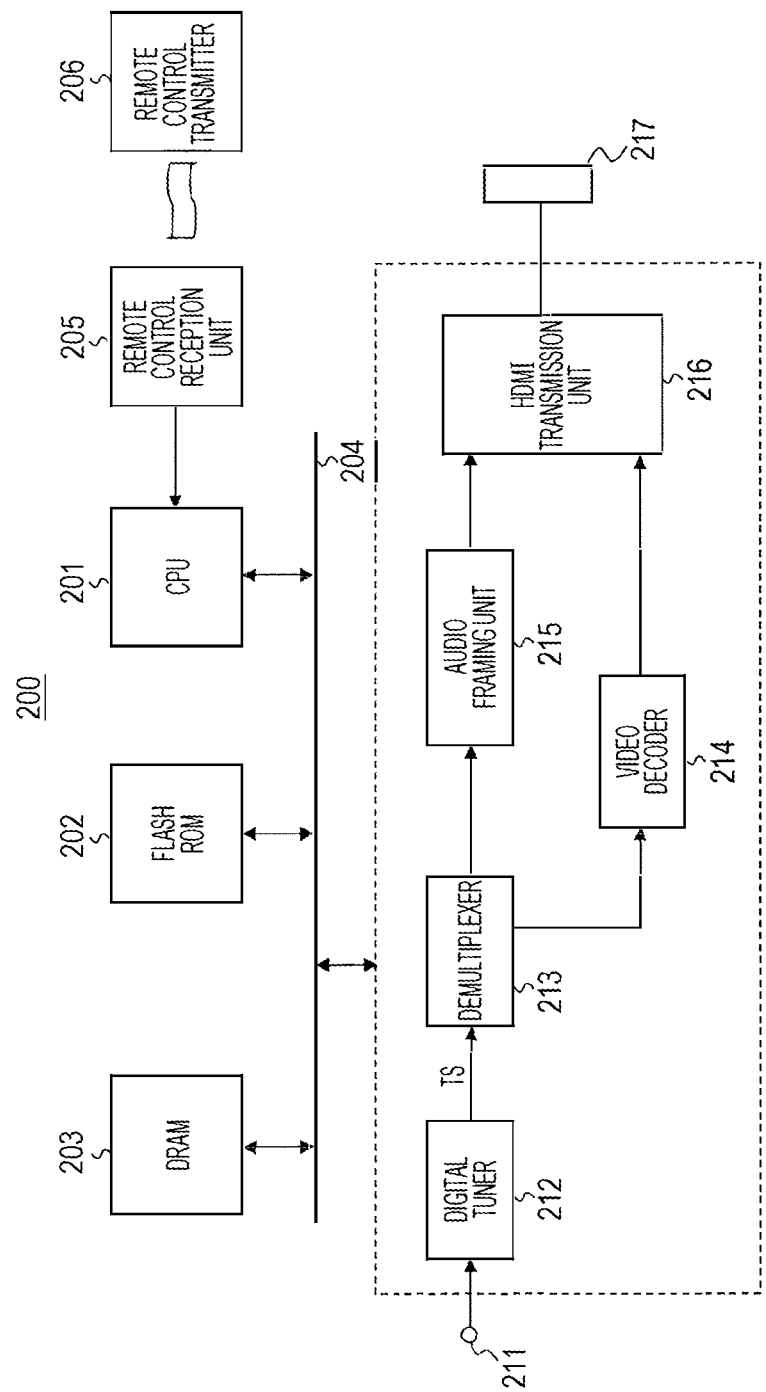
FIG. 17 is a block diagram of an exemplary configuration of a set top box.

FIG. 17 illustrates an exemplary configuration of the set top box 200. The set top box 200 includes a CPU 201, a flash ROM 202, a DRAM 203, an internal bus 204, a remote control reception unit 205, and a remote control transmitter 206. In addition, the set top box 200 includes an antenna terminal 211, a digital tuner 212, a demultiplexer 213, a video decoder 214, an audio framing unit 215, an HDMI transmission unit 216, and an HDMI terminal 217.

The CPU 201 controls the operation of each unit of the set top box 200. The flash ROM 202 stores control software and retains data. The DRAM 203 forms a work area for the CPU 201. The CPU 201 develops the software and the data read from the flash ROM 202, onto the DRAM 203 and boots the software so as to control each unit of the set top box 200.

The remote control reception unit 205 receives a remote control signal (a remote control code) transmitted from the remote control transmitter 206 so as to supply the remote control signal to the CPU 201. The CPU 201 controls each unit of the set top box 200 on the basis of the remote control code. The CPU 201, the flash ROM 202, and the DRAM 203 are connected to the internal bus 204.

The antenna terminal 211 is a terminal that inputs a television broadcast signal received through a reception antenna (not illustrated). The digital tuner 212 performs processing to the television broadcast signal input to the antenna terminal 211 and outputs the transport stream TS corresponding to a selected channel of the user.

The demultiplexer 213 extracts a packet of the video stream from the transport stream TS so as to send the packet to the video decoder 214. The video decoder 214 reconfigures the video stream with the packet of the video extracted by the demultiplexer 213 and performs the decode processing so as to acquire the uncompressed video data (image data).

In addition, the demultiplexer 213 extracts a packet of the audio stream from the transport stream TS so as to reconfigure the audio stream. The audio framing unit 215 performs framing to the audio stream that has been reconfigured in this manner. The audio stream includes the media access information (the container current data) inserted, as described in the stream generation unit 110 described above (refer to FIG. 3).

In addition, the demultiplexer 213 extracts various types of information, such as descriptor information, from the transport stream TS so as to send the various types of information to the CPU 201. The various types of information also include the information on the audio streaming descriptor (Audio_streaming_descriptor ( )) described above (refer to FIG. 12 (a)).

The CPU 201 recognizes that the format of the encoded stream (the audio compressed data stream) is prioritized as the transmission format of the audio data, on the basis of the information on the field of the "audio streaming flag" inserted into the descriptor, namely, the transmission format priority information. With this arrangement, the CPU 201 controls each unit of the set top box 200 to perform no decode processing to the audio stream and to transmit the audio stream remaining intact to the audio amplifier 300. Note that, as not illustrated, the set top box 200 includes, for example, an audio decoder so as to perform the decode processing to the audio stream so that the audio data can be acquired.

In addition, the CPU 201 performs the communication with, for example, the CEC line with the audio amplifier 300 so as to instruct the audio amplifier 300 to prioritize the format of the encoded stream as the transmission format of the audio data. With this arrangement, as described later, the audio amplifier 300 operates to transmit the audio stream remaining intact to the television receiver 500.

Note that, for a transmission and reception system 10A, to be described later, having a configuration of FIG. 33, the audio amplifier 300 may decode or may not decode the audio stream. In any of the cases, prioritizing the encoded stream on the basis of the priority information, enables the audio encoded stream to reach an end objective reception device.

The HDMI transmission unit 216 outputs the uncompressed video data acquired by the video decoder 214 and the audio stream to which the audio framing unit 215 has performed the framing, from the HDMI terminal 217 with the communication compliant with HDMI. Since performing the transmission through the TMDS channels of HDMI, the HDMI transmission unit 216 packs the video data and the audio stream so as to make an output to the HDMI terminal 217. The details of the HDMI transmission unit 216 will be described later.

The operation of the set top box 200 will be simply described. The television broadcast signal input to the antenna terminal 211 is supplied to the digital tuner 212. The digital tuner 212 performs processing to the television broadcast signal so as to output the transport stream TS corresponding to the selected channel of the user.

The transport stream TS output from the digital tuner 212, is supplied to the demultiplexer 213. The demultiplexer 213 extracts the packet of the video elementary stream from the transport stream TS so as to send the packet of the video elementary stream to the video decoder 214.

The video decoder 214 reconfigures the video stream with the packet of the video extracted by the demultiplexer 213, and then performs the decode processing to the video stream so as to acquire the uncompressed video data. The uncompressed video data is supplied to the HDMI transmission unit 216.

In addition, the demultiplexer 213 extracts the packet of the audio stream from the transport stream TS so as to reconfigure the audio stream into which the media access information (the container current data) has been inserted. The audio stream is subjected to the framing by the audio framing unit 215, and then is supplied to the HDMI transmission unit 216. Then, the uncompressed video data and the audio stream are packed by the HDMI transmission unit 216 so as to be transmitted to the audio amplifier 300 from the HDMI terminal 217 through the HDMI cable 610.

[Exemplary Configuration of Audio Amplifier]

Figure 18:
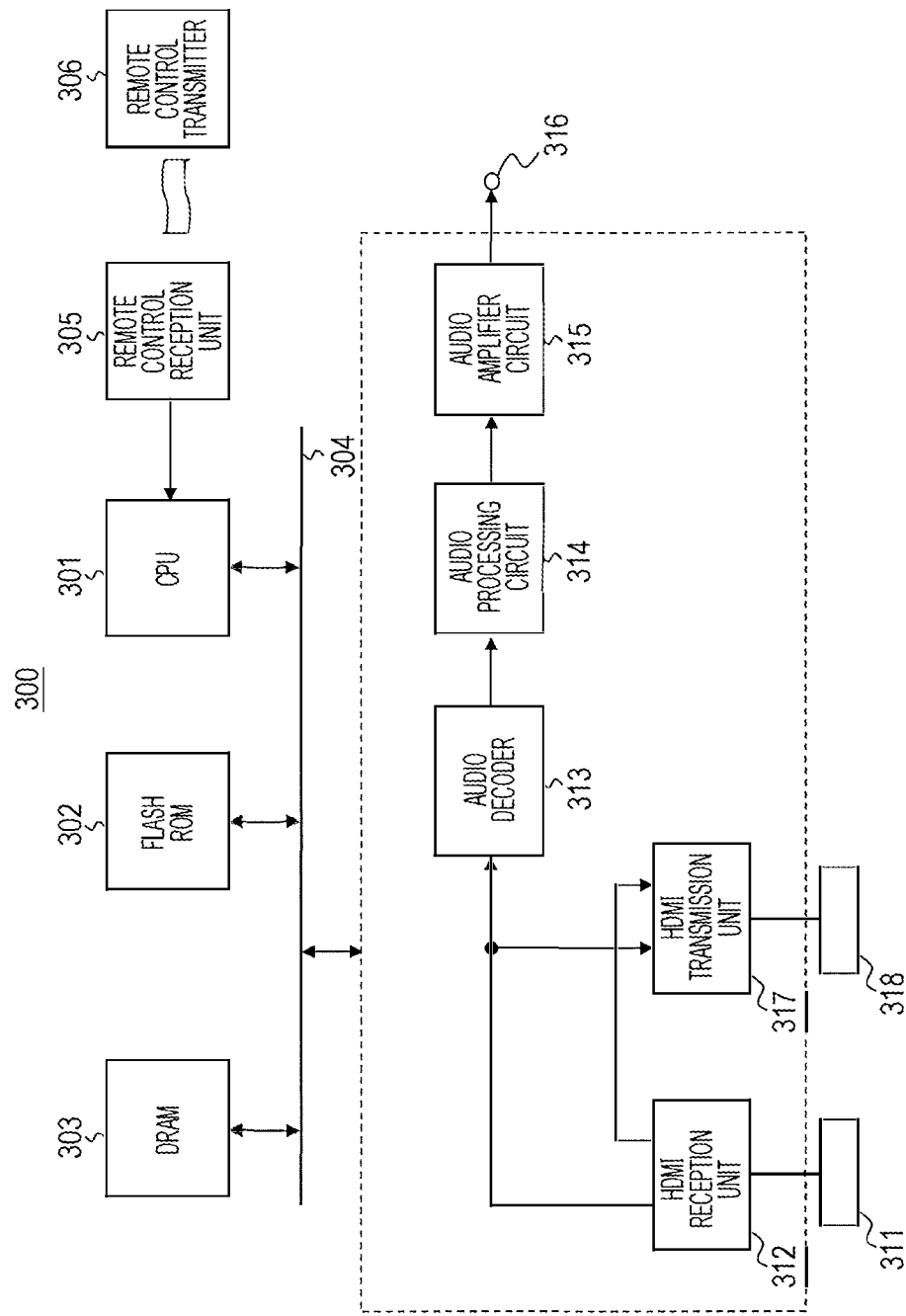
FIG. 18 is a block diagram of an exemplary configuration of an audio amplifier.

FIG. 18 illustrates an exemplary configuration of the audio amplifier 300. The audio amplifier 300 includes a CPU 301, a flash ROM 302, a DRAM 303, an internal bus 304, a remote control reception unit 305, and a remote control transmitter 306. In addition, the audio amplifier 300 includes an HDMI terminal 311, an HDMI reception unit 312, an audio decoder 313, an audio processing circuit 314, an audio amplifier circuit 315, an audio output terminal 316, an HDMI transmission unit 317, and an HDMI terminal 318.

The CPU 301 controls the operation of each unit of the audio amplifier 300. The flash ROM 302 stores control software and retains data. The DRAM 303 forms a work area for the CPU 301. The CPU 301 develops the software and the data read from the flash ROM 302, onto the DRAM 303 and boots the software so as to control each unit of the audio amplifier 300.

The remote control reception unit 305 receives a remote control signal (a remote control code) transmitted from the remote control transmitter 306 so as to supply the remote control signal to the CPU 301. The CPU 301 controls each unit of the audio amplifier 300 on the basis of the remote control code. The CPU 301, the flash ROM 302, and the DRAM 303 are connected to the internal bus 304.

The HDMI reception unit 312 receives the uncompressed video data and the audio stream supplied to the HDMI terminal 311 through the HDMI cable 610 with the communication compliant with HDMI. The audio stream includes the media access information (the container current data) inserted as described in the set top box 200 described above (refer to FIG. 17). The details of the HDMI reception unit 312 will be described later.

The audio decoder 313 performs decode processing to the audio stream received by the HDMI reception unit 212 so as to acquire uncompressed audio data (audio data) having a predetermined channel number. The audio processing circuit 314 performs necessary up/down mix processing to the uncompressed audio data having the predetermined channel number in accordance with the configuration of the speaker system 400 (refer to FIG. 1) so as to acquire the audio data having a necessary channel number, and additionally performs necessary processing, such as D/A conversion.

The audio amplifier circuit 315 amplifies an audio signal of each channel acquired by the audio processing circuit 314 so as to output the audio signal to the audio output terminal 316. Note that the speaker system 400 is connected to the audio output terminal 316.

The HDMI transmission unit 317 outputs the uncompressed video data and the audio stream received by the HDMI reception unit 212, from the HDMI terminal 318 with the communication compliant with HDMI. Since performing the transmission through the TMDS channels of HDMI, the HDMI transmission unit 317 packs the uncompressed video data and the audio stream so as to make an output to the HDMI terminal 318. The details of the HDMI transmission unit 317 will be described later.

The operation of the audio amplifier 300 illustrated in FIG. 18, will be simply described. The HDMI reception unit 312 receives the uncompressed video data and the audio stream transmitted from the set top box 200 to the HDMI terminal 311 through the HDMI cable 610.

The audio stream received by the HDMI reception unit 312 is supplied to the audio decoder 313. The audio decoder 313 performs the decode processing to the audio stream so as to acquire the uncompressed audio data having the predetermined channel number. The audio data is supplied to the audio processing circuit 314.

The audio processing circuit 314 performs the necessary up/down mix processing to the uncompressed audio data having the predetermined channel number, in accordance with the configuration of the speaker system 400 (refer to FIG. 1) so as to acquire the audio data having the necessary channel number, and additionally performs the necessary processing, such as the D/A conversion. The audio data on each channel output from the audio processing circuit 314, is amplified by the audio amplifier circuit 315 so as to be output to the audio output terminal 316. Therefore, the audio output having the predetermined channel number can be acquired from the speaker system 400 connected to the audio output terminal 316.

In addition, the uncompressed video data and the audio stream received by the HDMI reception unit 312, are supplied to the HDMI transmission unit 317. Note that, instead of the uncompressed video data, remaining intact, received by the HDMI reception unit 312, the video data including the uncompressed video data to which processing, such as superimposition of graphic data, has been performed, may be supplied to the HDMI transmission unit 317. The uncompressed video data and the audio stream are packed by the HDMI transmission unit 317 so as to be transmitted from the HDMI terminal 318 to the television receiver 500 through the HDMI cable 620.

[Exemplary Configuration of Television Receiver]

Figure 19:
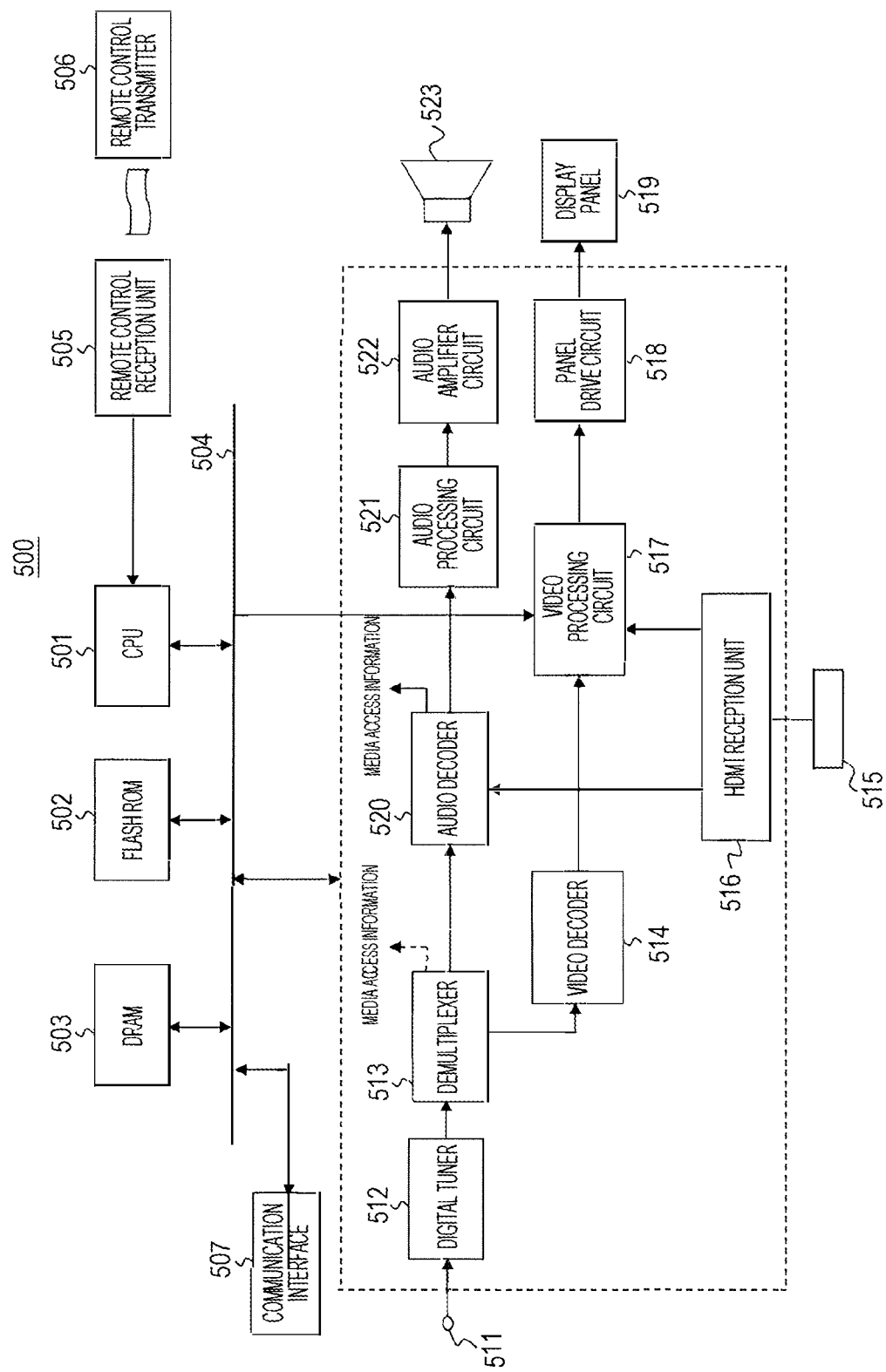
FIG. 19 is a block diagram of an exemplary configuration of a television receiver.

FIG. 19 illustrates an exemplary configuration of the television receiver 500. The television receiver 500 includes a CPU 501, a flash ROM 502, a DRAM 503, an internal bus 504, a remote control reception unit 505, a remote control transmitter 506, and a communication interface 507.

In addition, the television receiver 500 includes an antenna terminal 511, a digital tuner 512, a demultiplexer 513, a video decoder 514, an HDMI terminal 515, and an HDMI reception unit 516. In addition, the television receiver 500 includes a video processing circuit 517, a panel drive circuit 518, a display panel 519, an audio decoder 520, an audio processing circuit 521, an audio amplifier circuit 522, and a speaker 523.

The CPU 501 controls the operation of each unit of the television receiver 500. The flash ROM 502 stores control software and retains data. The DRAM 503 forms a work area for the CPU 501. The CPU 501 develops the software and the data read from the flash ROM 502, onto the DRAM 503 and boots the software so as to control each unit of the television receiver 500.

The remote control reception unit 505 receives a remote control signal (a remote control code) transmitted from the remote control transmitter 506 so as to supply the remote control signal to the CPU 501. The CPU 501 controls each unit of the television receiver 500 on the basis of the remote control code. The CPU 501, the flash ROM 502, and the DRAM 503 are connected to the internal bus 504.

Under the control of the CPU 501, the communication interface 507 performs communication with a server present on a network, such as the Internet. The communication interface 507 is connected to the internal bus 504.

The antenna terminal 511 is a terminal that inputs the television broadcast signal received by a reception antenna (not illustrated). The digital tuner 512 performs processing to the television broadcast signal input into the antenna terminal 511 so as to output the transport stream TS corresponding to the selected channel of the user.

The demultiplexer 513 extracts the packet of the video stream from the transport stream TS so as to send the packet of the video stream to the video decoder 514. The video decoder 514 reconfigures the video stream with the packet of the video extracted by the demultiplexer 513 and performs decode processing so as to acquire the uncompressed video data (the image data).

In addition, the demultiplexer 513 extracts the packet of the audio stream from the transport stream TS so as to reconfigure the audio stream. The audio stream includes the media access information (the container current data) inserted, as described in the stream generation unit 110 described above (refer to FIG. 3).

The HDMI reception unit 516 receives the uncompressed video data and the audio stream supplied to the HDMI terminal 515 through the HDMI cable 620 with the communication compliant with HDMI. The audio stream includes the media access information (the container current data) inserted, as described in the audio amplifier 300 described above (refer to FIG. 18). The details of the HDMI reception unit 516 will be described later.

The video processing circuit 517 performs, for example, scaling processing and synthetic processing to, for example, the video data acquired by the video decoder 514 or acquired by the HDMI reception unit 516, furthermore, the video data received by the communication interface 507 from the server on the net, so as to acquire the video data for display.

The panel drive circuit 518 drives the display panel 519 on the basis of the image data for display acquired by the video processing circuit 517. The display panel 519 includes, for example, a liquid crystal display (LCD) or an organic electroluminescence (EL) display.

The audio decoder 520 performs decode processing to the audio stream acquired by the demultiplexer 513 or acquired by the HDMI reception unit 516 so as to acquire the uncompressed audio data (the audio data). In addition, the audio decoder 520 extracts and sends the predetermined number of pieces of media access information associated for the set of media access control (the container current data) sequentially inserted into the audio stream, to the CPU 501. The CPU 501 appropriately makes each unit of the television receiver 500 perform processing with the media access information.

Here, the media access information has been divided and inserted into the predetermined number (including one) of audio frames in the audio stream. The information indicating the entire size of the media access information (the container current data) has been added to the first piece of divided information. The information indicating whether each is the first piece of divided information and the number of counts in descending order as the information indicating the divided position, have been added to each piece of divided information. The audio decoder 520 acquires the media access information from the predetermined number of audio frames on the basis of these pieces of information.

In this case, the audio decoder 520 can recognize the first piece of divided information from the information indicating whether each is the first piece of divided information, and can recognize the number of divisions from the number of counts in descending order corresponding to the first piece of divided information, and can further recognize the number of the remaining pieces of divided information from the number of counts in descending order. Therefore, the audio decoder 520 can easily and appropriately acquire each piece of divided information included in the media access information, from the predetermined number of audio frames.

In addition, with the number of counts in descending order, (1) in a case where an error has occurred in an intermediate transmission packet, the packet can be detected on the reception side, and additionally (2) approximate time at which the end packet that has been divided, arrives, can be previously known on the reception side.

In addition, since the information indicating the entire size of the media access information has been added to the first piece of divided information, the space in which the predetermined information can be accumulated in the memory (the storage medium), can be secured on the basis of the information indicating the entire size of the media access information, at the point in time when the first piece of divided information is acquired. Thus, the acquisition processing of the media access information can be easily and appropriately performed.

The audio processing circuit 521 performs necessary processing, such as D/A conversion, to the audio data acquired by the audio decoder 520. The audio amplifier circuit 522 amplifies an audio signal output from the audio processing circuit 521 so as to supply the audio signal to the speaker 523.

The CPU 501 controls, for example, the communication interface 507 on the basis of the predetermined number of pieces of media access information associated for the set of media access control, acquired by the audio decoder 520. In this case, the media data is acquired from the server on the net, such as the Internet, so that the image display and the audio output based on the media data are performed. Note that a specific example of the media access control will be described later.

The operation of the television receiver 500 illustrated in FIG. 19, will be simply described. The television broadcast signal input into the antenna terminal 511, is supplied to the digital tuner 512. The digital tuner 512 performs the processing to the television broadcast signal so as to acquire the transport stream TS corresponding to the selected channel of the user.

The transport stream TS acquired by the digital tuner 512, is supplied to the demultiplexer 513. The demultiplexer 513 extracts the packet of the video stream from the transport stream TS so as to supply the packet of the video stream to the video decoder 514. The video decoder 514 reconfigures the video stream with the packet of the video extracted by the demultiplexer 513 and performs the decode processing so as to acquire the uncompressed video data. The uncompressed video data is supplied to the video processing circuit 517.

In addition, the demultiplexer 513 extracts the packet of the audio stream from the transport stream TS so as to reconfigure the audio stream. The audio stream is supplied to the audio decoder 520.

The HDMI reception unit 516 receives the uncompressed video data and the audio stream supplied to the HDMI terminal 515 through the HDMI cable 620 with the communication compliant with HDMI. The uncompressed video data is supplied to the video processing circuit 517. In addition, the audio stream is supplied to the audio decoder 520.

The image processing circuit 517 performs, for example, the scaling processing and the synthetic processing to, for example, the video data acquired by the video decoder 514 or acquired by the HDMI reception unit 516, furthermore, the video data received by the communication interface 507 from the server on the net, so as to acquire the video data for display.

The video data for display acquired by the image processing circuit 517, is supplied to the panel drive circuit 518. The panel drive circuit 518 drives the display panel 519 on the basis of the video data for display. With this arrangement, the display panel 519 displays an image corresponding to the video data for display.

The audio decoder 520 performs the decode processing to the audio stream acquired by the demultiplexer 513 or acquired by the HDMI reception unit 516 so as to acquire the uncompressed audio data. The audio data acquired by the audio decoder 520, is supplied to the audio processing circuit 521. The audio processing circuit 521 performs the necessary processing, such as the D/A conversion, to the audio data. The audio data is amplified by the audio amplifier circuit 522, and then is supplied to the speaker 523. Therefore, the speaker 523 outputs audio corresponding to the displayed image of the display panel 519.

In addition, the audio decoder 520 extracts the predetermined number of pieces of media access information associated for the set of media access control (the container current data) sequentially inserted into the audio stream. The media access information extracted by the audio decoder 520 in this manner, is sent to the CPU 501. The CPU 501 controls, for example, the communication interface 507 on the basis of the media access information. With this arrangement, the media data is acquired from the server on the net, such as the Internet, so that the image display and the audio output based on the media data are performed.

[Exemplary Configurations of HDMI Transmission Unit and HDMI Reception Unit]

Figure 20:
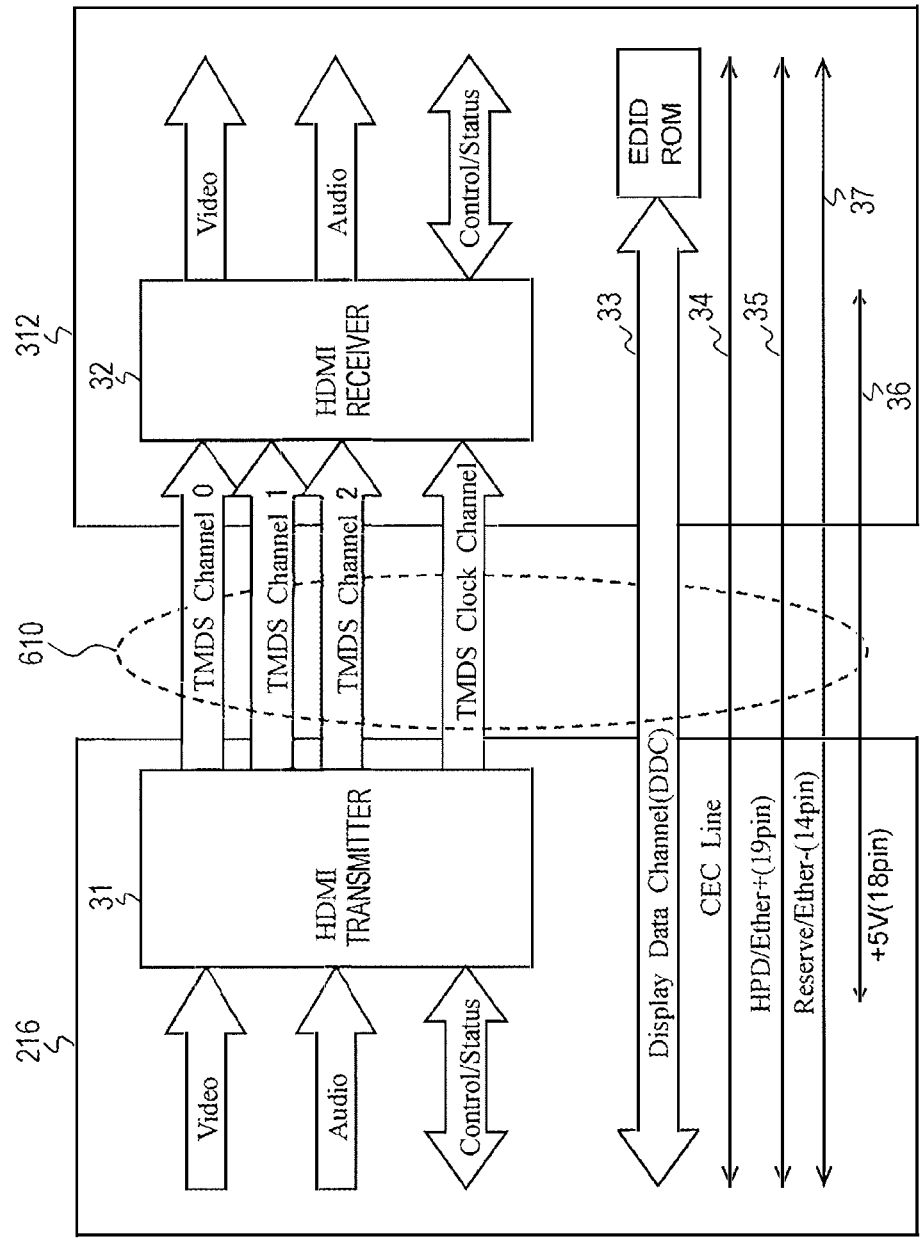
FIG. 20 is a block diagram of exemplary configurations of an HDMI transmission unit and an HDMI reception unit.

FIG. 20 illustrates exemplary configurations of the HDMI transmission unit 216 of the set top box 200 (refer to FIG. 17) and the HDMI reception unit 312 of the audio amplifier 300 (refer to FIG. 18) in the transmission and reception system 10 of FIG. 1. Note that the exemplary configurations of the HDMI transmission unit 317 of the audio amplifier 300 (refer to FIG. 18) and the HDMI reception unit 516 of the television receiver 500 (refer to FIG. 19) have similar configurations and thus the descriptions will be omitted.

The HDMI transmission unit 216 unidirectionally transmits, to the HDMI reception unit 312 with a plurality of channels, a differential signal corresponding to the pixel data of an uncompressed one-screen image in an active image period 21 (hereinafter, also referred to as an "active video period" appropriately) being a period excluding a horizontal blanking period 22 and a vertical blanking period 23 from a period from one vertical synchronizing signal to the next vertical synchronizing signal (refer to FIG. 21). In addition, the HDMI transmission unit 216 unidirectionally transmits, to the HDMI reception unit 312 with the plurality of channels, differential signals corresponding to at least the audio data accompanied with the image, control data, and different auxiliary data in the horizontal blanking period 22 or the vertical blanking period 23.

That is, the HDMI transmission unit 216 includes an HDMI transmitter 31. For example, the transmitter 31 converts the pixel data of the uncompressed image into the corresponding differential signal, and unidirectionally and serially transmits the differential signal to the HDMI reception unit 312 with three transition minimized differential signaling (TMDS) channels #0, #1, and #2 being the plurality of channels.

In addition, the transmitter 31 converts the audio data accompanied with the uncompressed image, furthermore, for example, the necessary control data and the different auxiliary data, into the corresponding differential signals, and unidirectionally and serially transmits the differential signals to the HDMI reception unit 312 with the three TMDS channels #0, #1, and #2.

Figure 21:
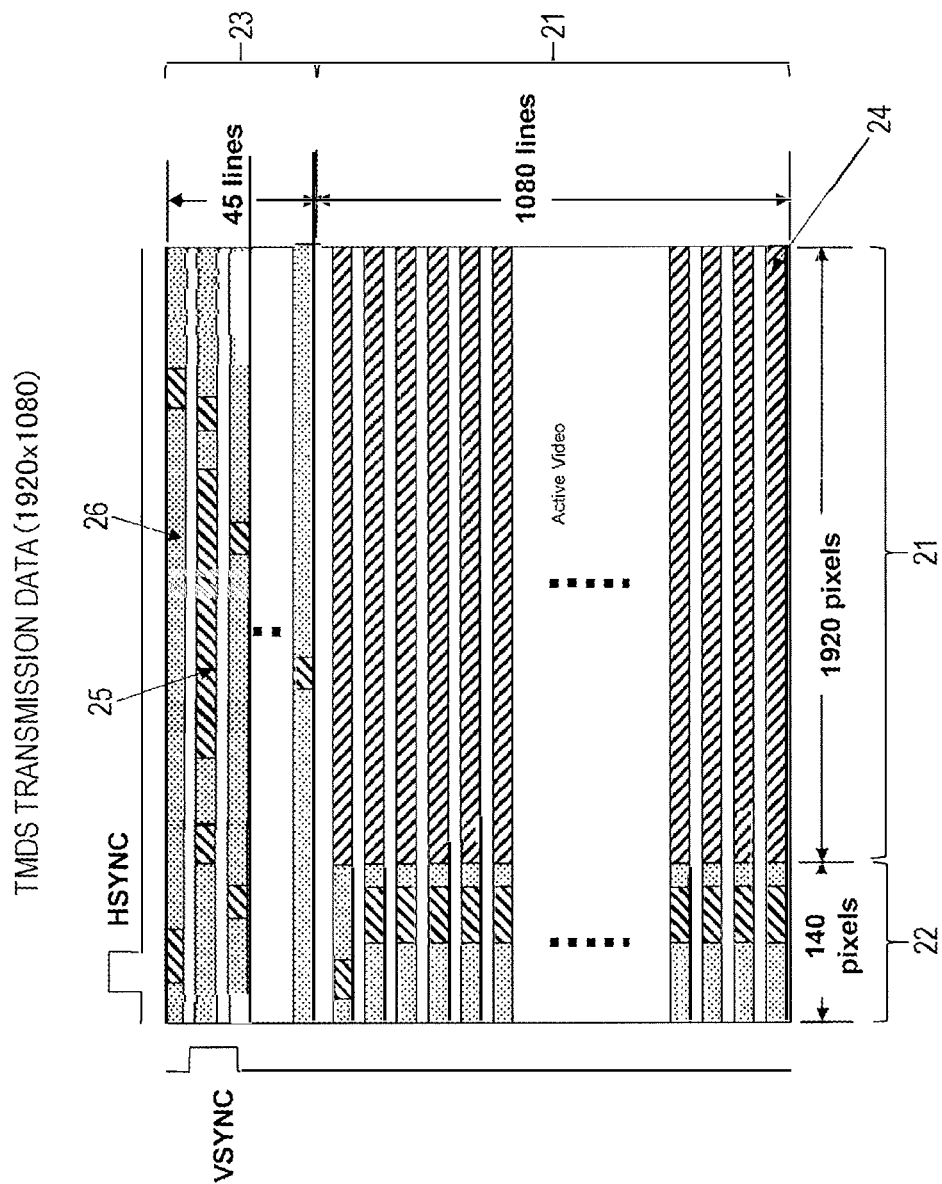
FIG. 21 is a diagram of periods of various types of transmission data in a case where image data is transmitted with TMDS channels.

The HDMI reception unit 312 receives the differential signal corresponding to the pixel data, transmitted unidirectionally from the HDMI transmission unit 216 with the plurality of channels, in the active video period 21 (refer to FIG. 21). In addition, the HDMI reception unit 312 receives the differential signals corresponding to the audio data and the control data, transmitted unidirectionally from the HDMI transmission unit 216 with the plurality of channels, in the horizontal blanking period 22 (refer to FIG. 21) or the vertical blanking period 23 (refer to FIG. 21).

The transmission channels of an HDMI system including the HDMI transmission unit 216 and the HDMI reception unit 312, include the three TMDS channels #0 to #2 as transmission channels for transmitting the pixel data and the audio data, a TMDS clock channel as a transmission channel for transmitting a pixel clock, and additionally transmission channels referred to as a display data channel (DDC) 33 and a consumer electronics control (CEC) line 34.

The DDC 33 includes two signal lines included in the HDMI cable 610, and the HDMI transmission unit 216 uses the DDC 33 to read extended display identification data (EDID) from the HDMI reception unit 312 connected through the HDMI cable 610. That is, the HDMI reception unit 312 includes an EDID read only memory (ROM) storing the EDID being performance information relating to the performance (configuration capability) of the HDMI reception unit 312, in addition to an HDMI receiver 32. The HDMI transmission unit 216 reads the EDID so that decoded capability information on the reception side is sent to the transmission side.

The HDMI transmission unit 216 reads the EDID, through the DDC 33, from the HDMI reception unit 312 connected through the HDMI cable 610. Then, on the basis of the EDID, the CPU 201 of the set top box 200 recognizes the performance of the audio amplifier 300 having the HDMI reception unit 312.

The CEC line 34 includes one signal line included in the HDMI cable 610, and is used to perform interactive communication of data for control between the HDMI transmission unit 216 and the HDMI reception unit 312. In addition, the HDMI cable 610 includes a HPD line 35 connected to a pin referred to as hot plug detect (HPD).

A source device uses the HPD line 35 and can detect connection of a sink device (a destination device) with a direct current bias potential. In this case, when viewed from the source device side, the HPD line 35 has a function of receiving a notification of a connection state from the sink device with the direct current bias potential. Meanwhile, when viewed from the sink device side, the HPD line has a function of notifying the source device of the connection state with the direct current bias potential. In addition, the HDMI cable 610 includes a power source line 36 used to supply power from the source device to the sink device.

Furthermore, the HDMI cable 610 includes a reserve line 37. An HDMI Ethernet channel (HEC) that transmits Ethernet signals, using the HPD line 35 and the reserve line 37, is present. In addition, an audio return channel (ARC) that transmits the audio data from the destination device (the sink device) to the source device, using both of the HPD line 35 and the reserve line 37 or only the HPD line 35, is present. Note that "Ethernet", "Ethernet" is a registered trademark.

FIG. 21 illustrates the periods of various types of transmission data in a case where the image data including 1920 pixels in width by 1080 lines in length is transmitted in the TMDS channels. In accordance with the types of transmission data, three types of periods including a video data period 24, a data island period 25, and a control period 26, are present in a video field in which the transmission data is transmitted with the three TMDS channels of HDMI.

Here, the video field period is a period from the active edge of a vertical synchronizing signal to the active edge of the next vertical synchronizing signal, and is divided into the horizontal blanking period 22, the vertical blanking period 23, and the active pixel period 21 (the active video period) being the period excluding the horizontal blanking period and the vertical blanking period from the video field period.

The video data period 24 is allocated to the active pixel period 21. The data of active pixels including 1920 pixels by 1080 lines included in the data of the uncompressed one-screen image, is transmitted in the video data period 24. The data island period 25 and the control period 26 are allocated to the horizontal blanking period 22 and the vertical blanking period 23. The auxiliary data is transmitted in the data island period 25 and the control period 26.

That is, the data island period 25 is allocated to a portion of each of the horizontal blanking period 22 and the vertical blanking period 23. For example, data irrelevant to the control, such as a packet of the audio data, from the auxiliary data is transmitted in the data island period 25. The control period 26 is allocated to the other portion of each of the horizontal blanking period 22 and the vertical blanking period 23. Data relevant to the control, such as the vertical synchronizing signal, a horizontal synchronizing signal, and a control packet, from the auxiliary data is transmitted in the control period 26.

[Exemplary Media Access Control]

Figure 22:
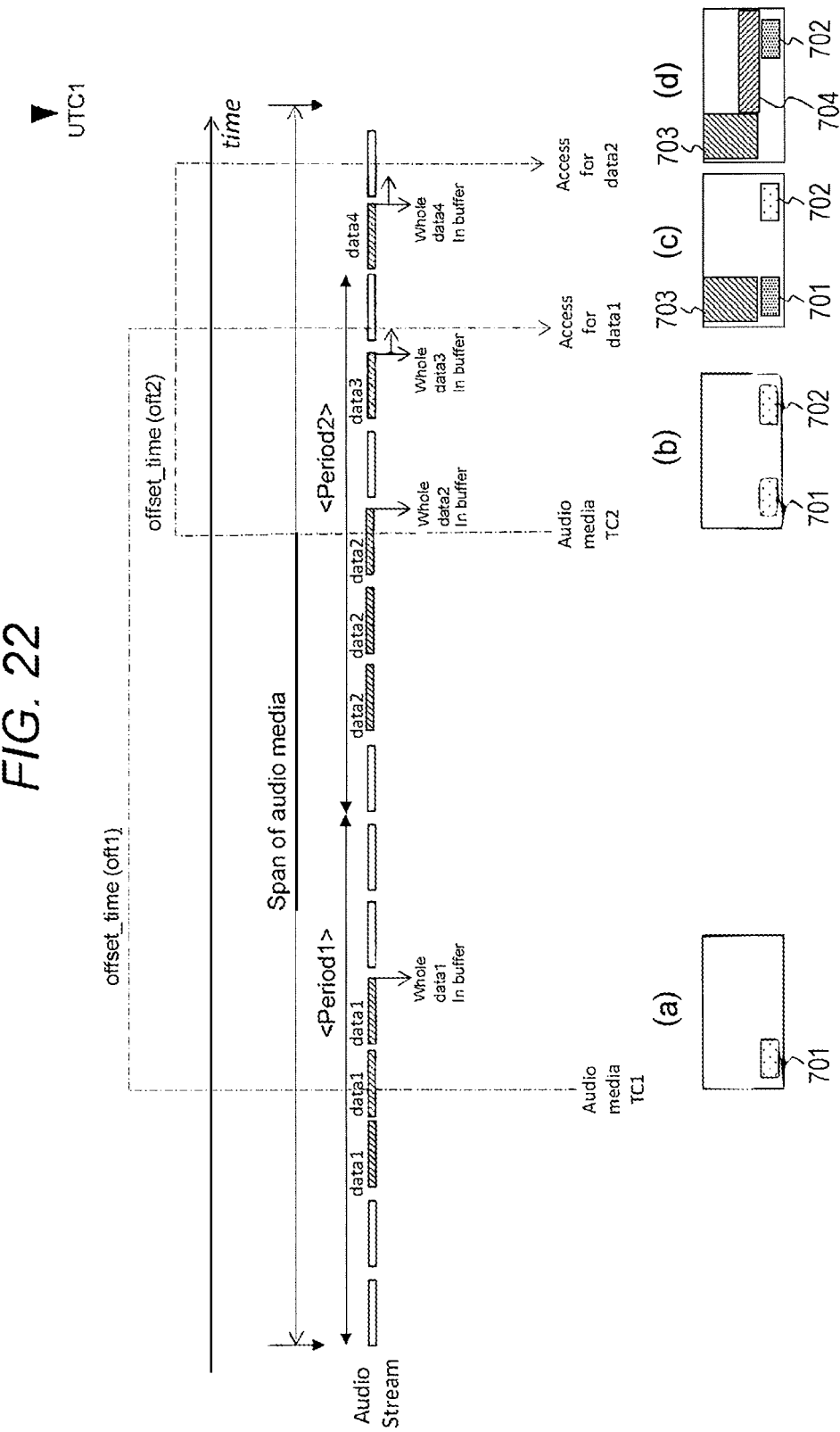
FIG. 22 is a diagram of exemplary media access control.

FIG. 22 illustrates exemplary media access control. Media access information "data1" is divided and inserted into three audio frames in the audio stream so as to be sent. Due to reception of the three audio frames, the entire media access information "data1" is imported into a buffer inside the audio decoder 520 so as to be sent to the CPU 501 after that.

The media access information "data1" includes, as illustrated in FIG. 23(a), "ID tables", "URL", "period1", "notification 'preparing'", "information_id1", "reference TC=TC1", and "UTC1".

At the point in time when the media access information "data1" is received, as illustrated in FIG. 22(a), a rectangular message field 701 is provided onto the screen of the display panel 519. For example, a display of 'preparing' is performed so that the user is notified that media access is being prepared.

After that, media access information "data2" is divided and inserted into three audio frames in the audio stream so as to be sent. Due to reception of the three audio frames, the entire media access information "data2" is imported into the buffer inside the audio decoder 520 so as to be sent to the CPU 501 after that.

The media access information "data2" includes, as illustrated in FIG. 23(b), "URL", "period2", "notification 'preparing'", "information_id2", "reference TC=TC2", and "UTC1". The identification information "information_id" in the media access information "data2" is the "information id2", and is different from the "information_id1" of the media access information "data1". With this arrangement, the CPU 501 grasps that the media access information "data2" is not in association with the media access information "data1".

At the point in time when the media access information "data2" is received, as illustrated in FIG. 22(b), a rectangular message field 702 is further provided onto the screen of the display panel 519. For example, a display of 'preparing' is performed so that the user is notified that media access is being prepared.

After that, media access information "data3" is inserted into one audio frame in the audio stream so as to be sent. Due to reception of the one audio frame, the entire media access information "data3" is imported into the buffer inside the audio decoder 520 so as to be sent to the CPU 501 after that.

The media access information "data3" includes, as illustrated in FIG. 23(c), "action command 'autostart'", "notification 'access ready'", "information_id1", and "offset time=oft1". The identification information "information_id" in the media access information "data3" is the "information_id1", and is the same as the "information_id1" in the media access information "data1". With this arrangement, the CPU 501 grasps that the media access information "data3" is in association with the media access information "data1".

The action command "autostart" indicated with the "action command 'autostart'" boots at the point in time when the offset time indicated with the "offset time=oft1" in the media access information "data3", has passed from reference time indicated with the reference time code of the "reference TC=TC1" in the media access information "data1".

At this time, the server on the net is accessed with the "URL" in the media access information "data1". Then, at this time, the information on each of the "ID tables" and the "period1" in the media access information "data1" is also sent to the server. Note that, the "ID tables" also includes the organization ID (organization_id) (refer to FIG. 6) in addition to the application ID (applicatio_id), the network ID (network_id), the transport ID (transport_id), and the service ID (service_id).

The information on the "ID tables" is sent in this manner so that the access is indicated, as an access that has been authorized, to the server. In addition, the information on the "period1" is sent so that the media data portion corresponding to the scene indicated with the "period1" in the audio stream, is reproduced in the server so as to be sent to the television receiver 500.

At the point in time when the action command "autostart" in the media access information "data3" boots in this manner, as illustrated in FIG. 22(c), for example, a display of 'access ready' is performed onto the rectangular message field 701 on the screen of the display panel 519 so that the user is notified that media access is ready. In addition, a rectangular display field 703 is newly provided onto the screen of the display panel 519, and the media data sent from the server, here, the image based on the video data is displayed on the display field 703. After that, the rectangular message field 702 is deleted with predetermined timing.

Note that, here, in a case where the current time (UTC) corresponding to the point in time when the offset time has passed from the reference time, is after the time indicated with the "UTC1" in the media access information "data1", the action command "autostart" does not boot as expiration.

After that, media access information "data4" is inserted into one audio frame in the audio stream so as to be sent. Due to reception of the one audio frame, the entire media access information "data4" is imported into the buffer inside the audio decoder 520 so as to be sent to the CPU 501 after that.

The media access information "data4" includes, as illustrated in FIG. 23(d), "action command 'autostart'", "notification 'access ready'", "information id2", and "offset time=oft2". The identification information "information_id" in the media access information "data4" is the "information_id2", and is the same as the "information_id2" in the media access information "data2". With this arrangement, the CPU 501 grasps that the media access information "data4" is in association with the media access information "data2".

The action command "autostart" indicated with the "action command 'autostart'" boots at the point in time when the offset time indicated with the "offset time=oft2" in the media access information "data4", has passed from the reference time indicated with the reference time code of the "reference TC=TC2" in the media access information "data2".

At this time, the server on the net is accessed with the "URL" in the media access information "data2". Then, at this time, the information on the "period2" in the media access information "data2" is also sent to the server. In addition, the information on the "period2" is sent in this manner so that the media data portion corresponding to the scene indicated with the "period2" in the audio stream, is reproduced in the server so as to be sent to the television receiver 500.

At the point in time when the action command "autostart" in the media access information "data4" boots in this manner, as illustrated in FIG. 22(d), for example, a display of 'access ready' is performed onto the rectangular message field 702 on the screen of the display panel 519 so that the user is notified that media access is ready. In addition, a rectangular display field 704 is newly provided onto the screen of the display panel 519, and the media data sent from the server, here, the image based on the video data is displayed on the display field 704. After that, the rectangular message field 702 is deleted.

Note that, here, in a case where the current time (UTC) corresponding to the point in time when the offset time has passed from the reference time, is after the time indicated with the "UTC1" in the media access information "data2", the action command "autostart" does not boot as expiration.

In the exemplary media access control of FIGS. 22 and 23 described above, the pieces of media access information "data3" and "data4" each including the action command, include the pieces of offset time information "offset time=oft1" and "offset time=oft2", respectively. However, with the information on the "target segment_id" indicating the "segment_id" of the media access information of the destination to which the offset time is specified, the pieces of media access information "data1" and "data2" can include the pieces of offset time information "offset time=oft1" and "offset time=oft2", respectively.

FIGS. 24(a), (b), (c), and (d) illustrate, in that case, pieces of information included in the pieces of media access information "data1", "data2", "data3", and "data4", respectively. That is, the media access information "data1" includes, as illustrated in FIG. 24 (a), the "ID tables", the "URL", the "period1", the "notification 'preparing'", the "information_id1", "segment#1", the "reference TC=TC1", the "offset time=oft1", "target segment_id=segment#3", and the "UTC1".

In addition, the media access information "data2" includes, as illustrated in FIG. 24(b), the "URL", the "period2", the "notification 'preparing'", the "information_id2", "segment#2", the "reference TC=TC2", the "offset time=oft2", "target segment_id=segment#4", and the "UTC1".

In addition, the media access information "data3" includes, as illustrated in FIG. 24(c), the "action command 'autostart'", the "notification 'access ready'", the "information_id1", and "segment#3". In addition, the media access information "data4" includes, as illustrated in FIG. 24(d), the "action command 'autostart'", the "notification 'access ready'", the "information_id2", and "segment#4".

Figure 25:
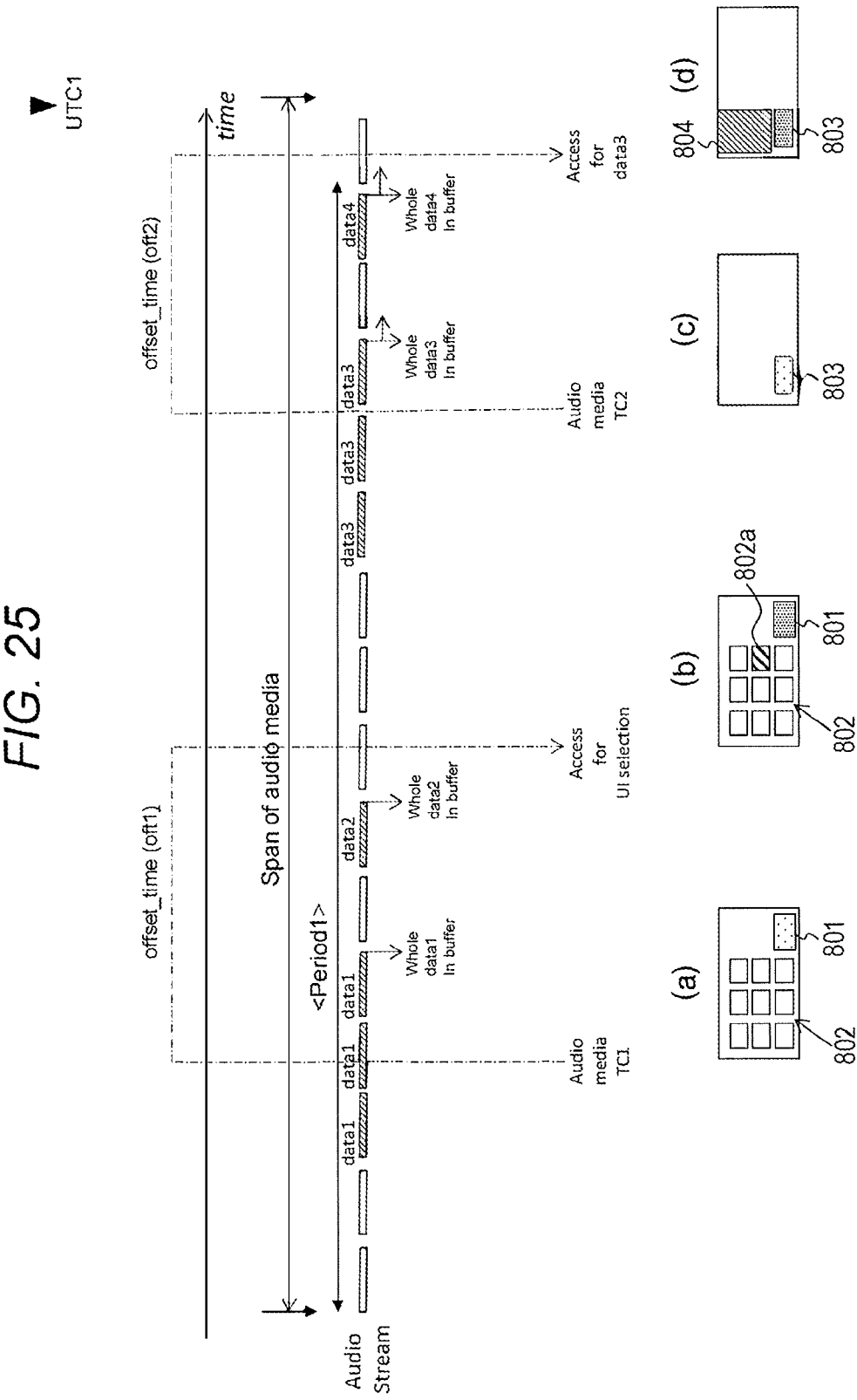
FIG. 25 is a diagram of exemplary media access control.

FIG. 25 illustrates different exemplary media access control. Media access information "data1" is divided and inserted into three audio frames in the audio stream so as to be sent. Due to reception of the three audio frames, the entire media access information "data1" is imported into the buffer inside the audio decoder 520 so as to be sent to the CPU 501 after that.

The media access information "data1" includes, as illustrated in FIG. 26(a), "ID tables", "UI selection process", "notification 'preparing'", "information id1", "reference TC=TC1", and "UTC1".

At the point in time when the media access information "data1" is received, as illustrated in FIG. 25(a), a rectangular message field 801 is provided onto the screen of the display panel 519. For example, a display of 'preparing' is performed so that the user is notified that user selection is being prepared. In addition, on the basis of the information on the "UI selection process", the screen displays a plurality of thumbnail images 802 for the user to select a reproduced medium.

After that, media access information "data2" is inserted into one audio frame in the audio stream so as to be sent. Due to reception of the one audio frame, the entire media access information "data2" is imported into the buffer inside the audio decoder 520 so as to be sent to the CPU 501 after that.

The media access information "data2" includes, as illustrated in FIG. 26 (b), "action command 'user selected'", "notification 'user selected'", "information_id1", and "offset time=oft1". The identification information "information_id" in the media access information "data2" is the "information_id1", and is the same as the "information_id1" in the media access information "data1". With this arrangement, the CPU 501 grasps that the media access information "data2" is in association with the media access information "data1".

The action command "user selected" indicated with the "action command 'user selected'" boots at the point in time when the offset time indicated with the "offset time=oft1" in the media access information "data2", has passed from the reference time indicated with the reference time code of the "reference TC=TC1" in the media access information "data1", so that selecting a predetermined thumbnail can select a reproduced medium.

At this time, as illustrated in FIG. 25 (b), for example, a display of 'user selected' is performed onto the rectangular message field 801 on the screen of the display panel 519 so that the user is notified that a reproduced medium can be selected. Note that, FIG. 25(b) illustrates that the user has selected a thumbnail 802a and the display state thereof has varied. After the selection of the reproduced medium by the user has been completed in this manner, the rectangular message field 801 and the display of the thumbnails are deleted with predetermined timing.

Note that, here, in a case where the current time (UTC) corresponding to the point in time when the offset time has passed from the reference time, is after the time indicated with the "UTC1" in the media access information "data1", the action command "user selected" does not boot as expiration.

After that, media access information "data3" is divided and inserted into three audio frames in the audio stream so as to be sent. Due to reception of the three audio frames, the entire media access information "data3" is imported into the buffer inside the audio decoder 520 so as to be sent to the CPU 501 after that.

The media access information "data3" includes, as illustrated in FIG. 26(c), "URL", "notification 'preparing'", "information_id1", "reference TC=TC2", and "UTC1". The identification information "information_id" in the media access information "data3" is the "information_id1", and is the same as the "information_id1" of each of the pieces of media access information "data1" and "data2". With this arrangement, the CPU 501 grasps that the media access information "data3" is in association with the pieces of media access information "data1" and "data2".

At the point in time when the media access information "data3" is received, as illustrated in FIG. 25(c), a rectangular message field 803 is further provided onto the screen of the display panel 519. For example, a display of 'preparing' is performed so that the user is notified that media access is being prepared.

After that, media access information "data4" is inserted into one audio frame in the audio stream so as to be sent. Due to reception of the one audio frame, the entire media access information "data4" is imported into the buffer inside the audio decoder 520 so as to be sent to the CPU 501 after that.

The media access information "data4" includes, as illustrated in FIG. 26(d), "action command 'autostart'", "notification 'access ready'", "information_id1", and "offset time=oft2". The identification information "information_id" in the media access information "data4" is the "information_id1", and is the same as the "information_id1" of each of the pieces of media access information "data1", "data2", and "data3". With this arrangement, the CPU 501 grasps that the media access information "data4" is in association with the pieces of media access information "data1", "data2", and "data3".

The action command "autostart" indicated with the "action command 'autostart'" boots at the point in time when the offset time indicated with the "offset time=oft2" in the media access information "data4", has passed from the reference time indicated with the reference time code of the "reference TC=TC2" in the media access information "data3".

At this time, the server on the net is accessed with the "URL" in the media access information "data3". Then, at this time, the information on each of the "ID tables" and the "period1" in the media access information "data1", furthermore, an ID "select ID" indicating a selected result of the user, associated with the media access information "data2", are sent to the server.

The information on the "ID tables" is sent in this manner so that the access is indicated, as an access that has been authorized, to the server. In addition, the information on each of the "select ID" and the "period1" is sent so that the media data portion of the reproduced medium of the user selection, corresponding to the scene indicated with the "period1" in the audio stream, is reproduced in the server so as to be sent to the television receiver 500.

At the point in time when the action command "autostart" in the media access information "data4" boots in this manner, as illustrated in FIG. 25(d), for example, a display of 'access ready' is performed onto the rectangular message field 803 on the screen of the display panel 519 so that the user is notified that media access is ready. In addition, a rectangular display field 804 is newly provided onto the screen of the display panel 519, and the media data sent from the server, here, the image based on the video data is displayed on the display field 804. After that, the rectangular message field 803 is deleted with predetermined timing.

Note that, here, in a case where the current time (UTC) corresponding to the point in time when the offset time has passed from the reference time, is after the time indicated with the "UTC1" in the media access information "data3", the action command "autostart" does not boot as expiration.

In the exemplary media access control of FIGS. 25 and 26 described above, the pieces of media access information "data2" and "data4" each including the action command, include the pieces of offset time information "offset time=oft1" and "offset time=oft2", respectively. However, with the information on the "target segment_id" indicating the "segment_id" of the media access information of the destination to which the offset time is specified, the pieces of media access information "data1" and "data3" can include the pieces of offset time information "offset time=oft1" and "offset time=oft2", respectively.

[Exemplary Provider Checking of Media Data]

As described above, the universal_metadata_frame (refer to FIG. 6) includes the 32-bit field of the "oganization id" present. The field indicates the identification value uniquely allocated to the individual service transmitted in the user data region or the provider or standard organization of the service (e.g., "ATSC" or "DVB"). The "oganization id" is considered to be used as checking information for checking the provider of the media data acquired with the media access information.

Figure 27:
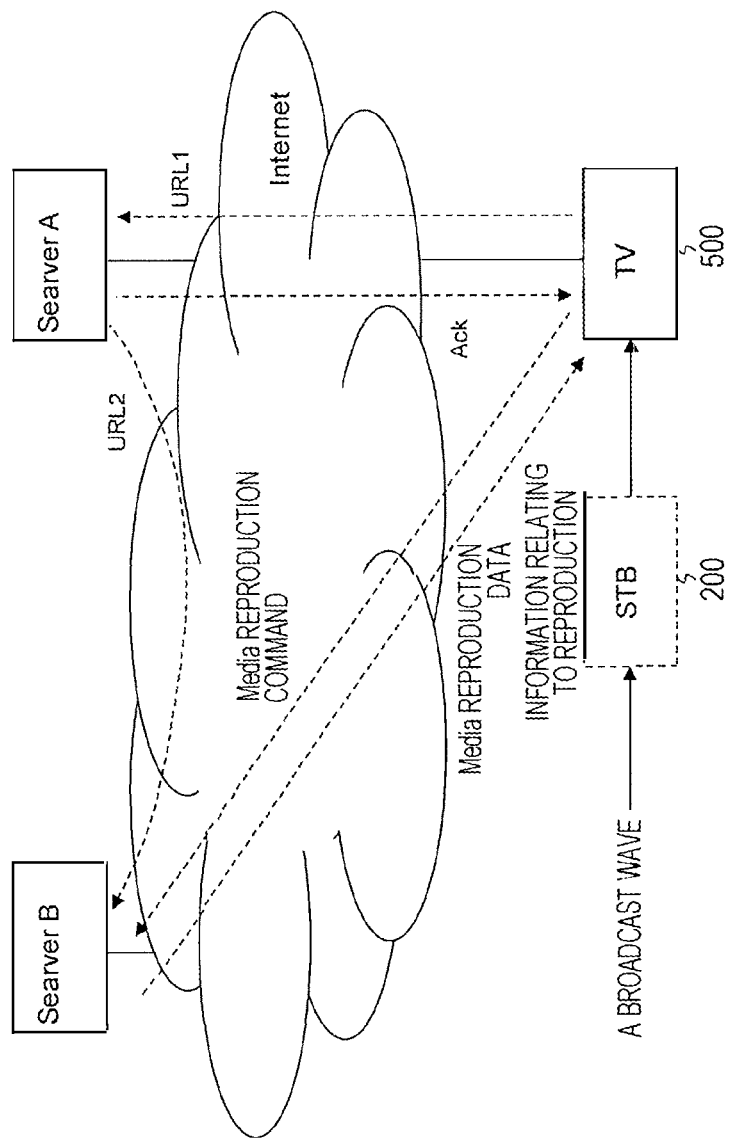
FIG. 27 is a diagram for describing exemplary checking of the provider of media data acquired with the media access information.

Exemplary provider checking of the media data with the "oganization_id" will be described with a service system of FIG. 27. In FIG. 27, the television receiver 500 is connected to the Internet. In addition, a server A (Searver A) and a server B (Searver B) are connected to the Internet. The example indicates a case where the television receiver 500 accesses the server A with a URL1 supplied, directly or through the set top box 200, by a broadcast service from an A broadcast wave, so as to receive the application (the media data) net-linked with the A broadcasting.

The A broadcast wave supplies the URL1 to the television receiver 500. The URL1 includes the "oganization_id" added. The television receiver 500 accesses the server A with the URL1. The server A performs authentication processing to the access from the television receiver 500 so as to return an Ack response to the television receiver 500. Additionally, the server A notifies the server B of a URL2 by an inter-server access, of the IP address of the television receiver 500, and then operates together so as to transfer the access from the television receiver 500, to the server B.

The server B transmits media reproduction associated information to the television receiver 500. The media reproduction associated information is, for example, image information on a plurality of thumbnails for the user to select a reproduced medium. The television receiver 500 performs the provider checking of whether the media reproduction associated information is based on a service organization the same as that of the "organization_id" received from the A broadcast wave, and then sends a media reproduction command to the server B.

The television receiver 500 performs the provider checking, for example, as follows: That is, the television receiver 500 recognizes characters associated with the identification value indicated with the "organization_id" received from the A broadcast wave, here, "ATSC_ch5_net_sports" from, for example, a table. Note that, the characters of the "ATSC_ch5_net_sports" may be associated with the URL1 received together with the "organization_id" from the A broadcast wave.

The television receiver 500 performs the provider checking on the basis of whether the characters of the "ATSC_ch5_net_sports" are described in the media reproduction associated information sent from the server B to the television receiver 500 or whether the characters of the "ATSC_ch5_net_sports" are described in information acquired by access with the URL (e.g., http://service.organization.information) included in the media reproduction associated information.

After confirming that the provider is correct, by the provider checking, the television receiver 500 sends the media reproduction command to the server B as described above. The server B performs media reproduction in accordance with the media reproduction command so as to transmit media reproduction data (the media data) to the television receiver 500. The television receiver 500 performs output based on the media reproduction data, for example, an image display and an audio output.

Note that, the example in which the "oganization_id" is used as the checking information for checking the provider of the media data acquired with the media access information, has been given above. However, the checking information is not limited to the "oganization_id", and thus the provider checking may be performed with the media access information added with different checking information.

As described above, in the transmission and reception system 10 illustrated in FIG. 1, the broadcast output device 100 sequentially inserts the predetermined number of pieces of media access information associated for the set of media access control, into the audio stream (the audio compressed data stream) and performs the transmission. Therefore, the set of media access control can be favorably performed on the reception side.

In addition, in the transmission and reception system 10 illustrated in FIG. 1, the broadcast output device 100 can divide and insert the media access information into the predetermined number of audio frames in the audio stream (the audio compressed data stream). Therefore, even if the entire size of the media access information is large, the information size to be inserted into each of the audio frames can be restrained so that no influence is exerted on the transmission of the audio compression data and the predetermined information can be favorably transmitted.

In addition, in the transmission and reception system 10 illustrated in FIG. 1, the television receiver 500 acquires the predetermined number of pieces of media access information for the set of media access control, sequentially inserted into the audio stream, together with the video data and the audio data as first media data, and then acquires second media data on the basis of the media access information. Therefore, presentation based on the second media data can be favorably performed in response to media presentation based on the first media data.

In addition, in the transmission and reception system 10 illustrated in FIG. 1, the broadcast output device 100 inserts the information indicating that the encoded stream is prioritized as the transmission format of the audio data, into the layer of the transport stream as the container. Therefore, the format of the encoded stream can be prioritized as the transmission format of the audio data in each of the set top box 200 and the audio amplifier 300. With this arrangement, the media access information can be securely supplied to the television receiver 500, the media access information being inserted into the audio stream.

In addition, in the transmission and reception system 10 illustrated in FIG. 1, the broadcast output device 100 adds the checking information for checking the provider of the media data acquired with the media access information (e.g., the "oganization_id"), to the media access information to be inserted into the audio stream (the audio compressed data stream) or the transport stream as the container. Therefore, on the basis of the checking information, the provider of the media data acquired with the media access information, can be simply and easily checked on the reception side.

<2. Modification>

Note that, according to the embodiment described above, the broadcast output device 100 sequentially inserts the predetermined number of pieces of media access information associated for the set of media access control, into the audio stream (the audio compressed data stream) so as to perform the transmission. However, the broadcast output device 100 is considered to sequentially insert the predetermined number of pieces of media access information, into a different media stream, such as the video stream, so as to perform the transmission. In addition, the broadcast output device 100 is considered to sequentially insert the predetermined number of pieces of media access information, into the layer of the transport stream TS as the container so as to perform the transmission.

Figure 28:
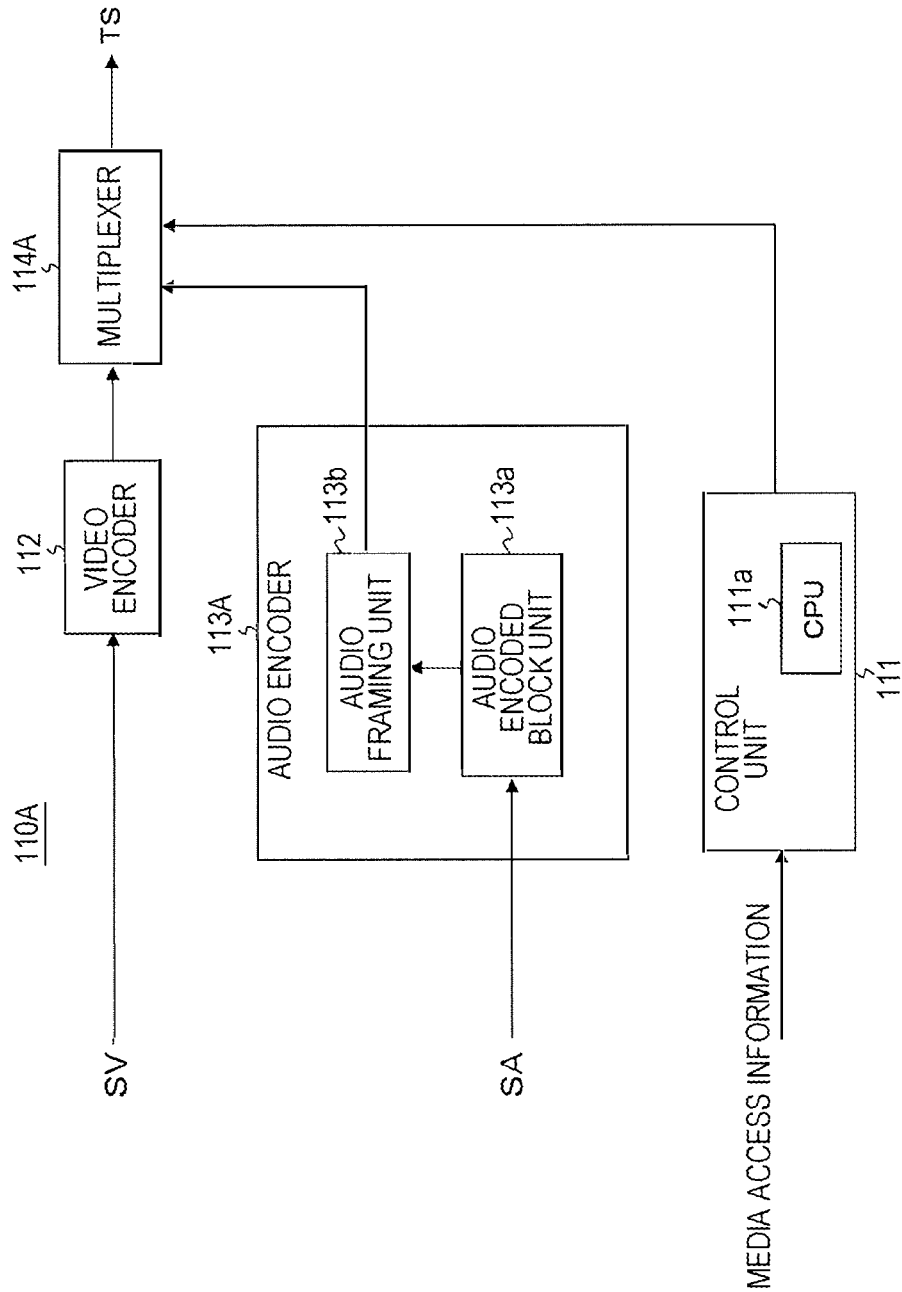
FIG. 28 is a block diagram of a different exemplary configuration of the stream generation unit included in the broadcast output device.

FIG. 28 illustrates an exemplary configuration of a stream generation unit 110A included in the broadcast output device 100 in that case. In FIG. 27, units corresponding to those of FIG. 3 are denoted with the same reference signs, and thus the detailed descriptions thereof will be appropriately omitted. The stream generation unit 110A includes the control unit 111, the video encoder 112, an audio encoder 113A, and a multiplexer 114A.

The audio encoder 113A performs the encoding in the compression format of MPEG-H 3D Audio to the audio data SA so as to generate the audio stream (the audio compressed data stream). The audio encoder 113A does not insert the media access information into the audio stream, differently from the audio encoder 113 in the stream generation unit 110 of FIG. 3.

The video stream generated by the video encoder 112 is supplied to the multiplexer 114A. In addition, the audio stream generated by the audio encoder 113A is supplied to the multiplexer 114A. Then, the multiplexer 114A packetizes and multiplexes the respective streams supplied from the encoders so as to acquire the transport stream TS as the transmission data.

On this occasion, under the control of the control unit 111, the multiplexer 114A sequentially inserts, as the container current data, the predetermined number of pieces of media access information associated for the set of media access control, into the layer of the transport stream TS as the container. For example, the multiplexer 114A inserts, under an application information table (AIT), an application descriptor (Application descriptor) to be newly defined, having the media access information.

FIG. 29 illustrates an exemplary structure (Syntax) of the application descriptor. The 8-bit field of "descriptor tag" indicates a descriptor type. Here, the application descriptor is represented. The 8-bit field of "descriptor length" indicates the length (size) of the descriptor, and indicates the byte length of the subsequent as the length of the descriptor.

The 8-bit field of "data id" indicates the ID of the media accessinformation. The information is the same as that of the field of the "data id" in the universal metadata frame described above (refer to FIG. 6). The field of access information data (Access_information_data( )) (refer to FIGS. 7 to 9), having the media access information, is present following the field of the "data id".

Figure 30:
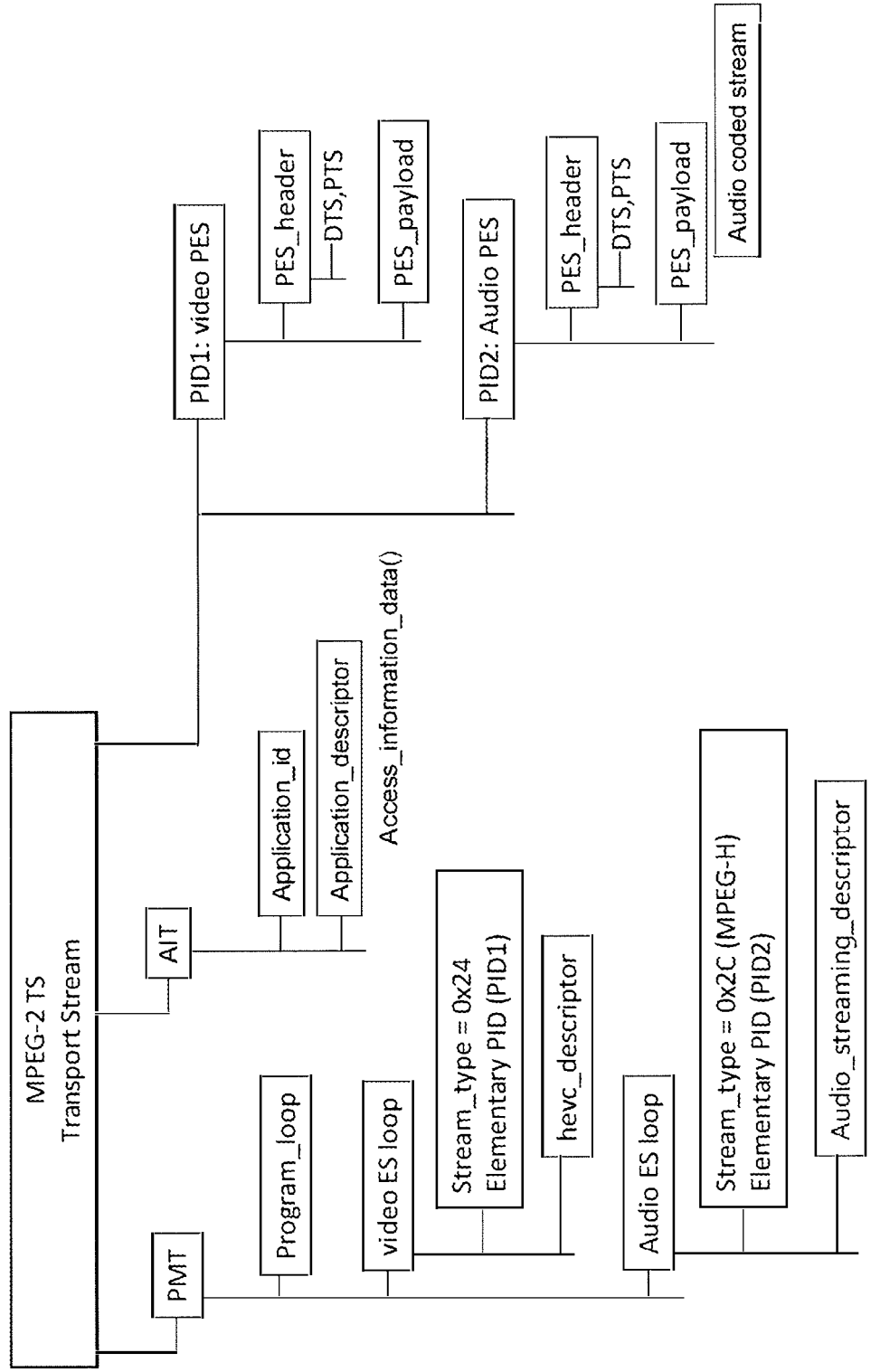
FIG. 30 is a diagram of an exemplary structure of the transport stream TS in a case where the media access information (the container current data) is inserted into a container so as to be sent.

FIG. 30 illustrates an exemplary structure of the transport stream TS in a case where the application descriptor (Application_descriptor) is inserted under the AIT. In the exemplary structure, the audio stream (Audio coded stream) is inserted into the PES payload of the PES packet of the audio stream. However, the access information data (Access_information_data ( )) including the media access information (the container current data) is not inserted into the audio stream.

In addition, the transport stream TS includes the application information table (AIT) in addition to the program map table (PMT). The application descriptor (refer to FIG. 29) is arranged together with an application identifier (Application id) under the AIT.

Figure 31:
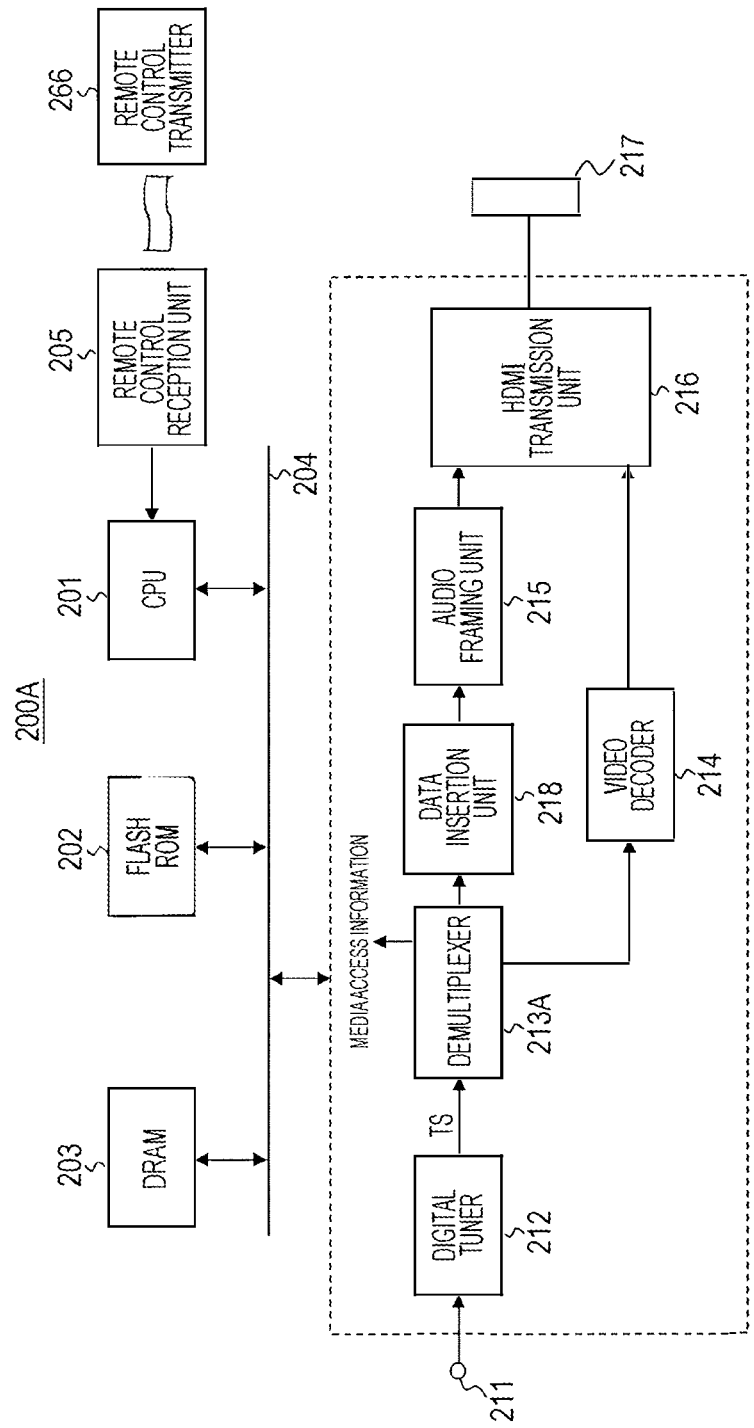
FIG. 31 is a block diagram of a different exemplary configuration of the set top box.

FIG. 31 illustrates an exemplary configuration of a set top box 200A in a case where, for example, the media access information is, as described above, inserted into the layer of the transport stream TS as the container so as to be sent. In FIG. 31, units corresponding to those of FIG. 17 are denoted with the same reference signs, and thus the detailed descriptions thereof will be appropriately omitted. The set top box 200A includes the CPU 201, the flash ROM 202, the DRAM 203, the internal bus 204, the remote control reception unit 205, and the remote control transmitter 206. In addition, the set top box 200A includes the antenna terminal 211, the digital tuner 212, a demultiplexer 213A, the video decoder 214, a data insertion unit 218, the audio framing unit 215, the HDMI transmission unit 216, and the HDMI terminal 217.

The demultiplexer 213 extracts the packet of the audio stream from the transport stream TS so as to reconfigure the audio stream (the audio compressed data stream). In addition, the demultiplexer 213A extracts, for example, various descriptors from the transport stream TS so as to send the various descriptors to the CPU 201. The descriptors include the application descriptor having the media access information (refer to FIG. 29).

The audio stream extracted by the demultiplexer 213A is supplied to the data insertion unit 218. The CPU 201 supplies predetermined information to the data insertion unit 218. The data insertion unit 218 inserts the media access information into the audio stream under the control of the CPU 201.

In this case, the media access information is divided and inserted into the predetermined number (including one) of audio frames in the audio stream (refer to FIGS. 13 to 15), similarly to the audio encoder 113 in the stream generation unit 110 of FIG. 3. At this time, the first piece of divided information is added with the information indicating the entire size of the media access information. In addition, each piece of divided information is added with the information indicating whether each is the first piece of divided information and the number of counts in descending order as the information indicating the divided position.

Note that, in this case, the number of divisions is determined to make the bit rate of the audio stream into which the media access information has been inserted, within the transmission band capacity range of HDMI. With this arrangement, depending on the entire size of the media access information, no division is performed and the entirety of the media access information may be inserted into one audio frame.

After the audio framing unit 215 performs the framing to the audio stream into which the media access information has been inserted, from the data insertion unit 218, the audio stream is supplied to the HDMI transmission unit 216. The others are included in the set top box 200A illustrated in FIG. 31, similarly to those in the set top box 200 illustrated in FIG. 17.

Note that, in a case where, as described above, for example, the media access information is inserted into the layer of the transport stream TS as the container so as to be sent, the demultiplexer 513 extracts the application descriptor having the media access information (refer to FIG. 29) in the television receiver 500 illustrated in FIG. 19 so that the media access information can be used.

In addition, according to the embodiment described above, the set top box 200 is configured to receive the video stream and the audio stream from the broadcast signal of the broadcast output device 100. However, the set top box 200 is considered to be configured to receive the video stream and the audio stream from a distribution server (a streaming server) through the network.

In addition, according to the embodiment described above, the example in which the container is the transport stream (MPEG-2 TS), has been given. However, the present technology can be similarly applied to a system in which distribution is performed with a container in MP4 or a different format. Examples of the system include an MPEG-DASH-based stream distribution system and a transmission and reception system that handles an MPEG media transport (MMT) structure transmission stream.

Figure 32:
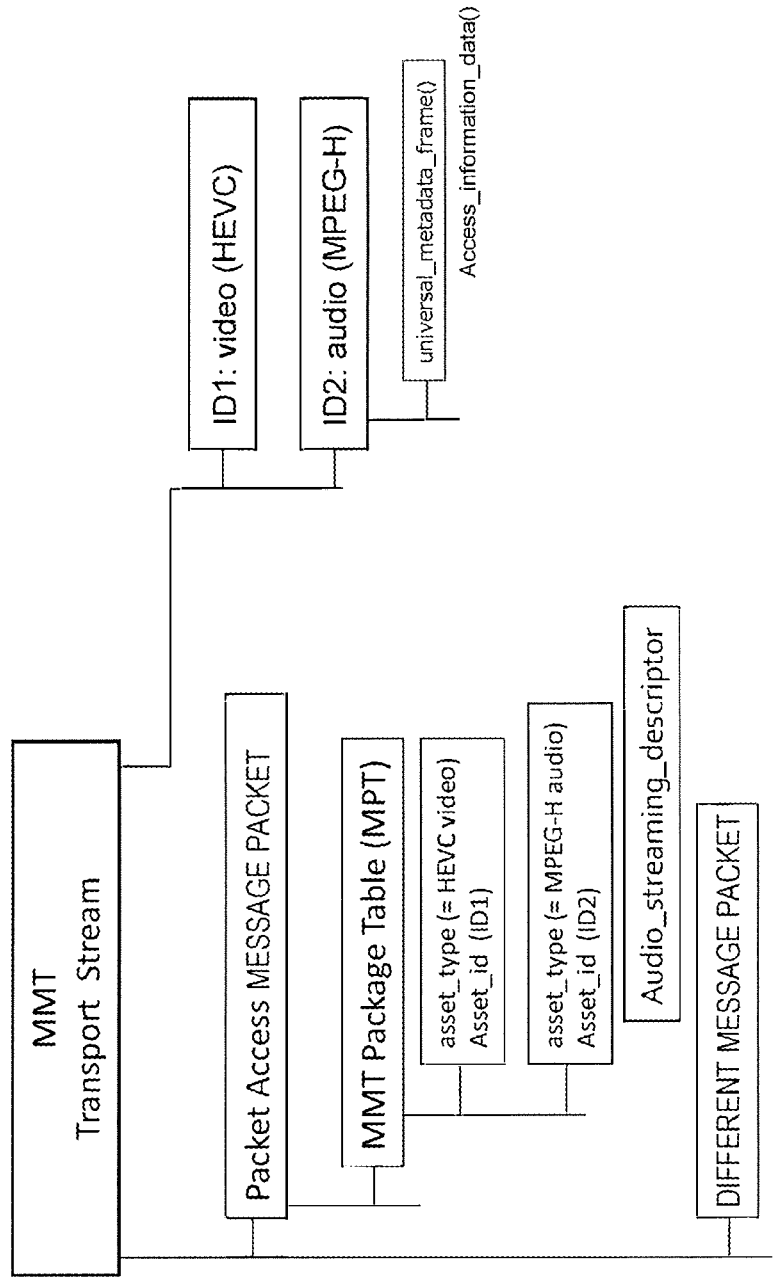
FIG. 32 is a diagram of an exemplary structure of an MMT stream in a case where the media access information (the container current data) is inserted into the audio stream so as to be sent.

FIG. 32 illustrates an exemplary structure of an MMT stream in a case where the media access information (the container current data) is inserted into the audio stream so as to be sent. The MMT stream includes an MMT packet of each asset, such as video and audio, present. The exemplary structure includes the MMT packet of the asset of the audio identified with ID2 present together with the MMT packet of the asset of the video identified with ID1.

The access information data (Access_information_data( )) including the media access information, has been inserted into the universal metadata frame (universal_metadata_frame( )) in the predetermined number (including one) of audio frames of the asset of the audio (the audio stream).

In addition, the MMT stream includes a message packet, such as a packet access (PA) message packet, present. The PA message packet includes a table, such as an MMT packet table (MMT Package Table). The MP table includes information per asset. In this case, the audio streaming descriptor (refer to FIG. 12(*a*)) is also included as the information on the asset of the audio.

Figure 33:
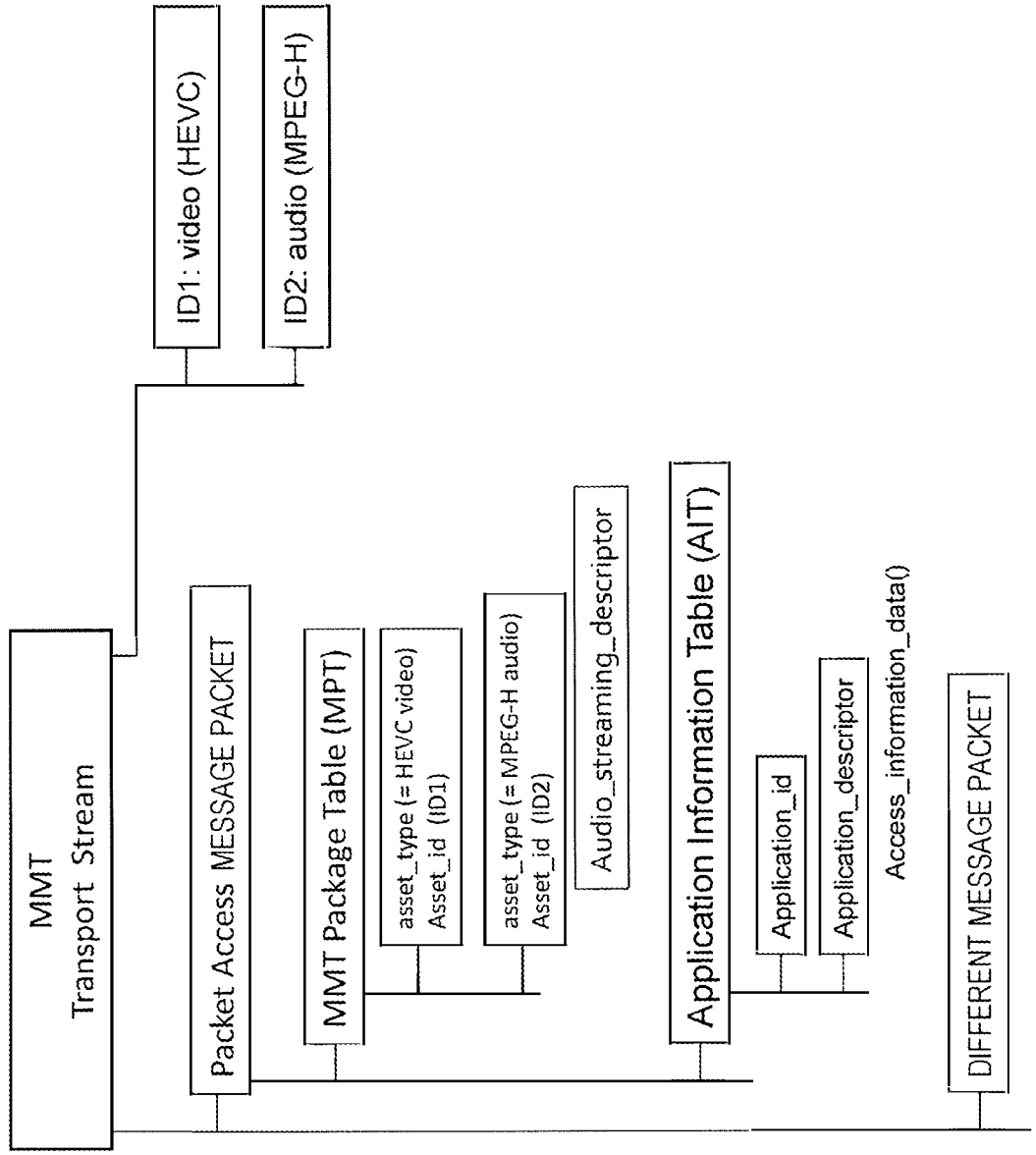
FIG. 33 is a diagram of an exemplary structure of the MMT stream in a case where the media access information (the container current data) is inserted into the container so as to be sent.

FIG. 33 illustrates an exemplary structure of the MMT stream in a case where the media access information (the container current data) is inserted into the container so as to be sent. The MMT stream includes the MMT packet of each asset, such as the video and the audio, present. The exemplary structure includes the MMT packet of the asset of the audio identified with the ID2 present together with the MMT packet of the asset of the video identified with the ID1. In the exemplary structure, the asset of the audio (the audio stream) includes no media access information, differently from the exemplary structure of FIG. 31.

In addition, the MMT stream includes the message packet, such as the packet access (PA) message packet, present. The PA message packet includes, for example, the MMT packet table (MPT: MMT Package Table). The MPT includes the information per asset. In addition, the PA message packet includes the application information table (AIT). The application descriptor (Application descriptor) having the access information data (Access_information_data( )) is inserted under the AIT.

In addition, according to the embodiment described above, the example in which the audio compressed format is MPEG-H 3D Audio, has been given. However, the present technology can be similarly applied to even a case where the audio compressed format is a different audio compressed format, such as AAC, AC3, or AC4.

Figure 34:
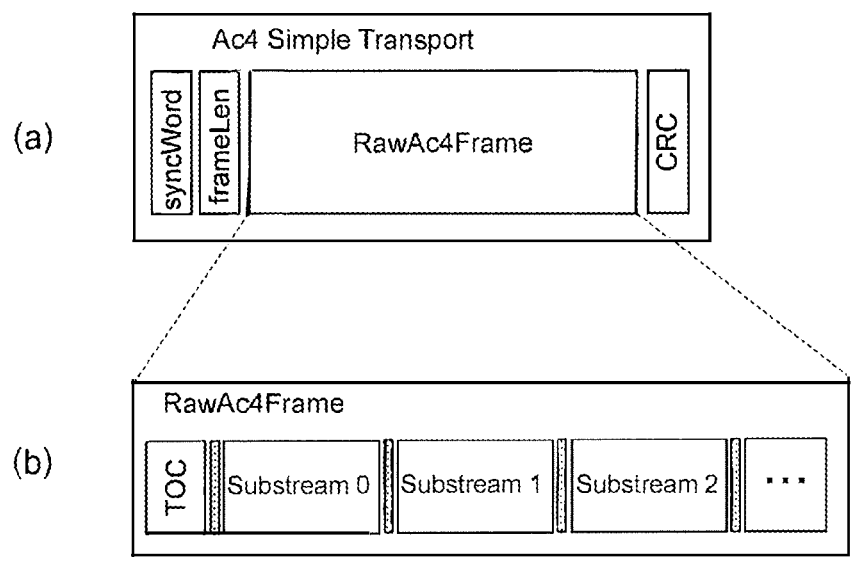
FIG. 34 is a diagram of a structure of a layer of a simple transport of AC4.

FIG. 34(*a*) illustrates a structure of a layer of a simple transport of AC4. The field of a sync word (syncWord), the field of a frame length (frame Length), the field of "RawAc4Frame" as the field of encoded data, and a CRC field are present. The field of the "RawAc4Frame" includes, as illustrated in FIG. 34 (*b*), the field of table of content (TOC) present at the head and subsequently the fields of a predetermined number of substreams present.

Figure 35:
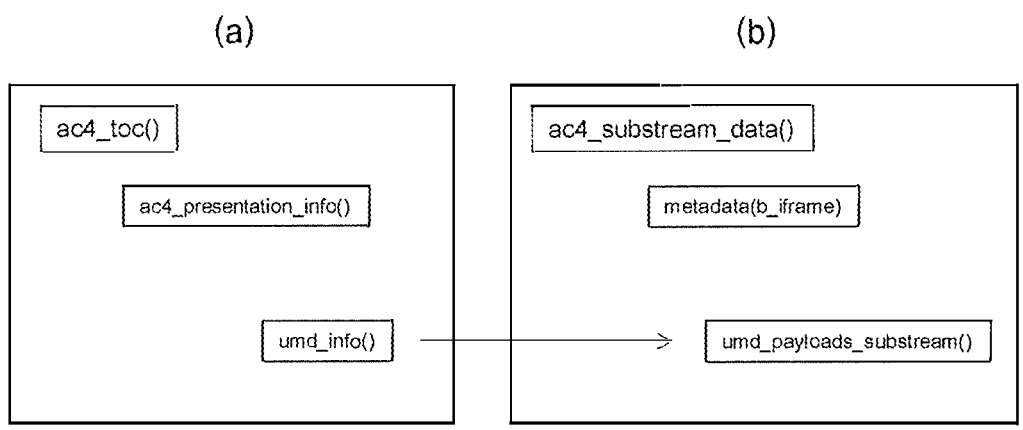
FIG. 35 is a diagram of schematic configurations of TOC (ac4_toc( )) and a substream (ac4_substream data( )).

As illustrated in FIG. 35(*b*), a metadata region (metadata) is present in the substream (ac4_substream_data( )) and the field of "umd_payloads_substream( ))" is provided therein. Universal data (universal_data( )) is provided in the field of "umd_payload_byte" in the field of the "umd_payloads_substream( )".

FIG. 36 illustrates an exemplary structure (syntax) of the universal data, and FIG. 37 illustrates the content (semantics) of main information in the exemplary structure. The 1-bit field of "start flag" indicates whether the container current data starts. "1" indicates that the start is made from the present packet, and "0" indicates that no start is made from the present packet. The 7-bit field of "fcounter" indicates the divided position of the container current data that has been divided, with the number of counts in descending order. "0" indicates the last divided portion. A case where the "start flag" is "1" and the "fcounter" is "0", indicates that no division has been performed.

When the "start_flag" is "1", the 32-bit field of "organization_id" and the 16-bit field of "target data size" are present. The field of the "organization_id" indicates an identification value uniquely allocated to an individual service transmitted in a user data region or the provider or standard organization of the service (e.g., "ATSC" or "DVB"). The field of the "target_data_size" indicates, in byte length, the data size of the container current data before the division. The entirety of the access information data (Access_information_data( )) (refer to FIG. 7) or part thereof (the divided information) is inserted into the field of "data payload byte".

In addition, in a case where the audio compressed format is AC4, an AC4 data container descriptor (AC4_datacontainer_desucriptor) is inserted into the layer of the container.

FIG. 38 illustrates an exemplary structure (syntax) of the AC4 data container descriptor, and FIG. 39 illustrates the content (semantics) of main information in the exemplary structure. The 8-bit field of "descriptor tag" indicates a descriptor type. Here, the application descriptor is represented. The 8-bit field of "descriptor length" indicates the length (size) of the descriptor, and indicates the byte length of the subsequent as the length of the descriptor.

The 1-bit field of "umd_payload_embedded" indicates whether an UMD payload has been inserted. "1" indicates that the UMD payload has been inserted, and "0" indicates that no UMD payload has been inserted. When the "umd_payload_embedded" is "1", the 5-bit field of "umd_payload_id" and the 11-bits of "audio stream rate" are present.

The field of the "umd_payload_id" indicates the identification value of the UMD payload. A specific value is defined as the identification value. For example, "7" represents the format of a universal data container. The field of the "audio stream rate" indicates the distribution bit rate of the audio stream.

Figure 40:
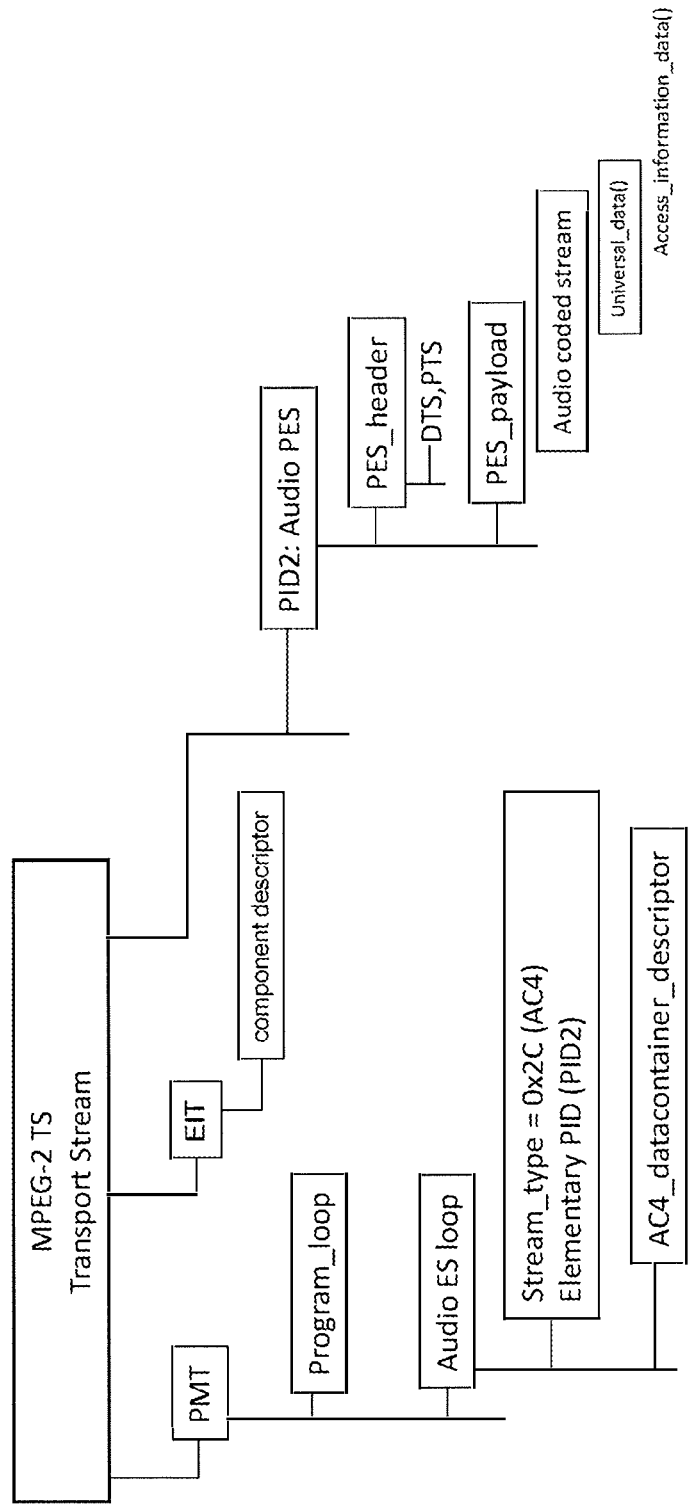
FIG. 40 is a diagram of an exemplary structure of the transport stream of MPEG-2 TS in a case where an audio compressed format is AC4.

FIG. 40 illustrates an exemplary structure of the transport stream of MPEG-2 TS in a case where the audio compressed format is AC4. In the exemplary structure, a portion according to the video stream has been omitted. The exemplary structure includes the PES packet of the audio stream "audio PES" identified with the PID2, present. The PES packet includes the PES header (PES_header) and the PES payload (PES_payload). The time stamps of the DTS and the PTS are inserted into the PES header.

The audio stream (Audio coded stream) is inserted into the PES payload of the PES packet of the audio stream. The access information data (Access_information_data( )) including the media access information (the container current data) (refer to FIGS. 7 to 9), is inserted into the universal metadata (universal_metadata( )) in the predetermined number (including one) of substreams in the audio stream.

In addition, the transport stream of MPEG-2 TS includes the program map table (PMT) as the program specific information (PSI). The PSI is the information describing to which program each elementary stream included in the transport stream belongs. The PMT includes the program loop (Program loop) describing the information relating to the entire programs, present.

In addition, the PMT includes the elementary stream loop having the information relating to each elementary stream, present. The exemplary configuration includes the audio elementary stream loop (audio ES loop) corresponding to the audio stream, present.

The audio elementary stream loop includes the information, such as the stream type and the PID (the packet identifier), arranged in response to the audio stream, and additionally includes the descriptor describing the information relating to the audio stream, arranged. The value of the stream type "Stream type" is set to "0x2C" and the PID information indicates the PID1 added to the PES packet of the audio stream "audio PES", as described above. As one exemplary descriptor, the AC4 data container descriptor described above (refer to FIG. 38) is arranged.

In addition, the transport stream of MPEG-2 TS includes an event information table (EIT) present. A component descriptor (component descriptor) is arranged under the EIT. The component descriptor includes that meta-information for the net connection is included in the service, described.

Figure 41:
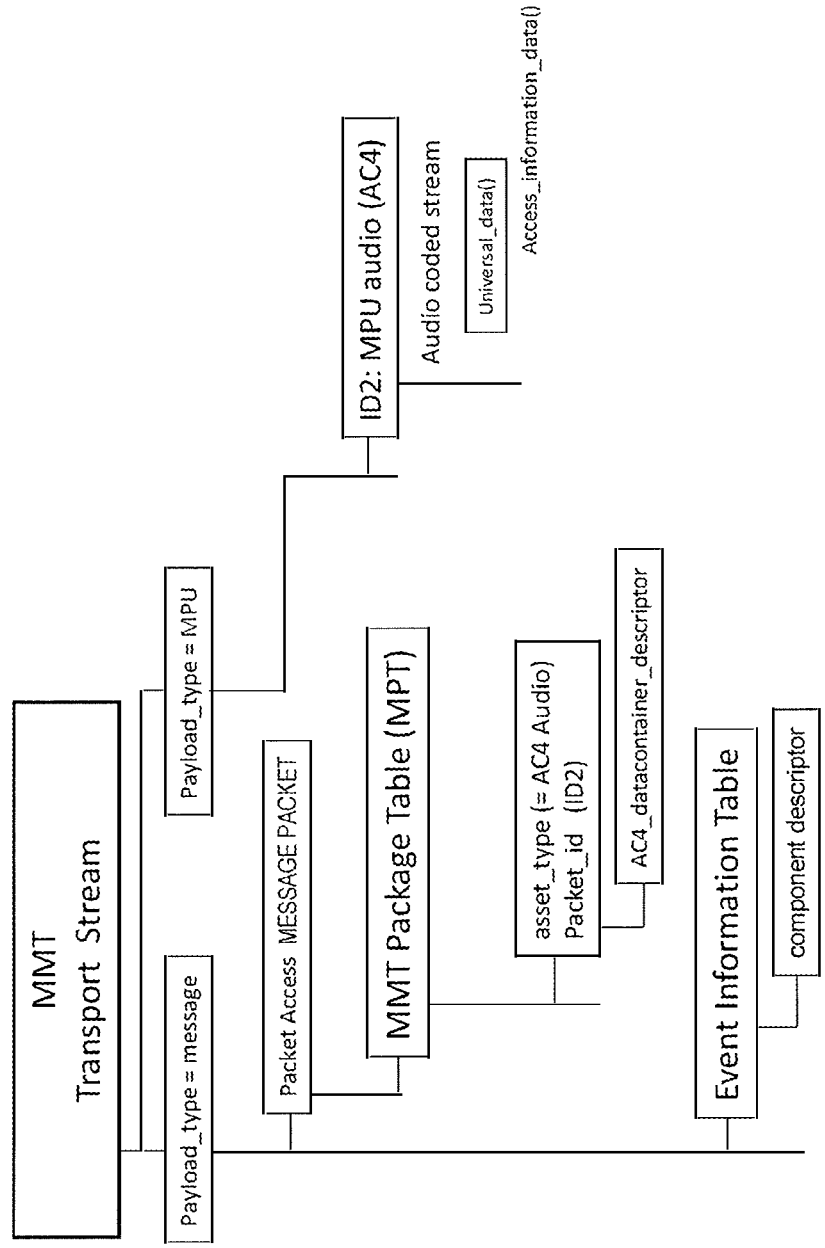
FIG. 41 is a diagram of an exemplary structure of the transport stream of MMT in a case where the audio compressed format is AC4.

FIG. 41 illustrates an exemplary structure of the transport stream of MMT in a case where the audio compressed format is AC4. In the exemplary structure, a portion according to the video asset (the video stream) has been omitted. The exemplary structure includes the MMT packet of the asset of the audio (the audio stream) identified with the ID2, present.

The access information data (Access_information_data( )) including the media access information (the container current data) (refer to FIGS. 7 to 9) is inserted into the universal metadata (universal metadata( )) in the predetermined number (including one) of substreams in the asset of the audio (the audio stream).

In addition, the transport stream of MMT includes the message packet, such as the packet access (PA) message packet, present. The PA message packet includes a table, such as the MP table (MPT: MMT Package Table). The MPT includes information, such as an asset type (Asset type) and a packet ID (Packet_id), arranged in response to the asset of the audio, and additionally includes a descriptor describing information relating to the asset of the audio, arranged. As one exemplary descriptor, the AC4 data container descriptor described above (refer to FIG. 38) is arranged.

In addition, the transport stream of MMT includes the event information table (EIT) present. The component descriptor (component descriptor) is arranged under the EIT. The component descriptor includes that the meta-information for the net connection is included in the service, described.

Figure 42:
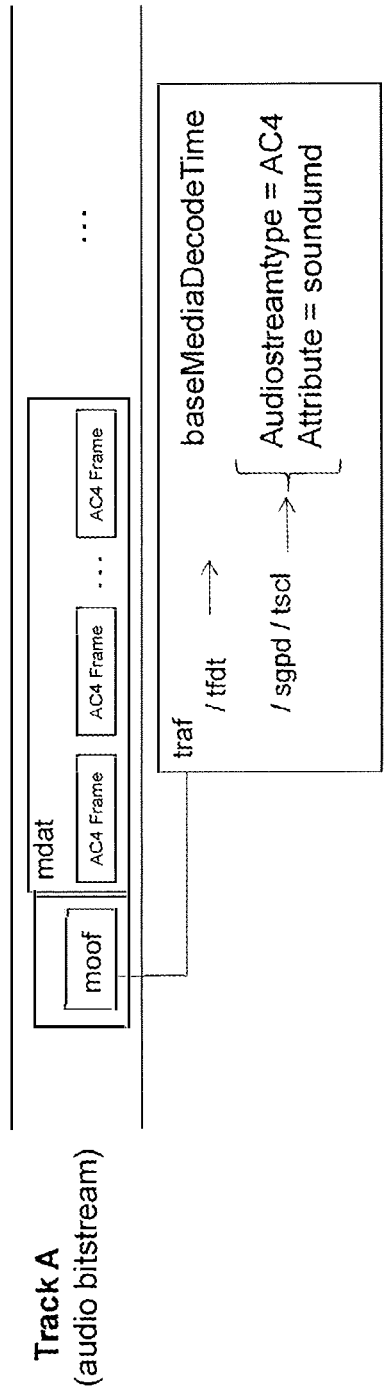
FIG. 42 is a diagram of an exemplary configuration of an MP4 stream (file) including data of an audio track in a case where the audio compressed format is AC4.

FIG. 42 illustrates an exemplary configuration of an MP4 stream (file) including data of an audio track (track A) in a case where the audio compressed format is AC4. The illustrated example is for fragmented MP4. A predetermined number of movie fragments are arranged in the MP4 stream, each including an "moof" box including control information stored and an "mdat" box including the media data body stored. Fragments acquired by fragmenting track data are stored in the "mdat" box so that the control information stored in the "moof" box is control information relating to the fragments.

In the MP4 stream "audio bitstream" corresponding to the audio track, a predetermined number of AC4 frames are arranged in the "mdat" box in each movie fragment. In addition, in the MP4 stream "audio bitstream", a "traf" box is present in the "moof" box in each movie fragment and a "tfdt" box is present in the box. A decode time "baseMediaDecodeTime" of the subsequent first access unit of the "moof" box, is described in the "tfdt" box.

In addition, the "tfdt" box is present in the "moof" box, and a "sgpd" box is present therein. Furthermore, a "tscl" box is present therein. The parameters of "Audiostreamtype" and "Attribute" are described in the "tscl" box. "Audiostreamtype=AC4" indicates that the audio compressed format is AC4. "Attribute=soundumd" indicates that the metadata (e.g., the media access information) has been inserted into the track of AC4. Specifically, the contents of the AC4 data container descriptor illustrated in FIG. 38 described above, are described as "soundumd".

FIG. 43 illustrates an exemplary MPD file description. In addition, FIG. 44 illustrates the content of main information in the exemplary description. In the MPEG-DASH based stream distribution system as conventionally well-known, the media stream (the MP4 stream) and the MPD file as a meta-file are transmitted to the reception side through a communication network transmission line.

The description of "<AdaptationSet mimeType="audio/mp4" group="1">" indicates that an adaptation set (AdaptationSet) to the audio stream is present, the audio stream in an MP4 file structure is supplied, and group 1 has been allocated. In addition, the description of "<SupplementaryDescriptor schemeIdUri="urn:brdcst:codecType" value="AC4"/>" indicates that the codec of the audio stream is AC4. "schemeIdUri="urn:brdcst:codecType" indicates the type of the codec. For example, "value" is set to, for example, "mpegh", "AAC", "AC3", or "AC4".

In addition, the description of "<SupplementaryDescriptor schemeIdUri="urn:brdcst:coordinatedControl" value="false"/>" indicates that net connection information is supplied with only the stream of the present adaptation set. "schemeIdUri="urn:brdcst:coordinatedControl"" indicates whether the information necessary for the net connection is emphasized so as to be supplied between a plurality of the media streams. For example, when the "value" is "true", the net connection information is indicated to be supplied in cooperation with the stream of a different adaptation set. When the "value" is "false", the net connection information is indicated to be supplied with only the stream of the present adaptation set.

In addition, the description of "<SupplementaryDescriptor schemeIdUri="urn:brdcst:UMDContained" value="true"/>" indicates that the audio stream includes the metadata.

"schemeIdUri="urn:brdcst:UMDContained"" indicates whether the audio stream includes the metadata. For example, when the "value" is "true", the audio meta-information is indicated to be included. When the "value" is "false", the audio meta-information is indicated not to be included.

In addition, the description of "<SupplementaryDescriptor schemeIdUri="urn:brdcst:metaInsertionFrequency" value="1"/>" indicates that the meta-information is supplied per access unit. "schemeIdUri="urn:brdcst:metaInsertionFrequency"" indicates the frequency of supplying the meta-information per access unit. For example, "1" indicates that one user data entry occurs in one access unit. "2" indicates that a plurality of user data entries occurs in one access unit. "3" indicates that at least one user data entry occurs during a period sectioned by random access points.

In addition, the description of "<SupplementaryDescriptor schemeIdUri="urn:brdcst:type"value="netlink"/>" indicates that the type of the service with the meta is the net connection. "schemeIdUri="urn:brdcst:type"" indicates the type of the service with the meta. For example, for example, when the "value" is "netlink", the type of the service with the meta is indicated to be the net connection.

Figure 45:
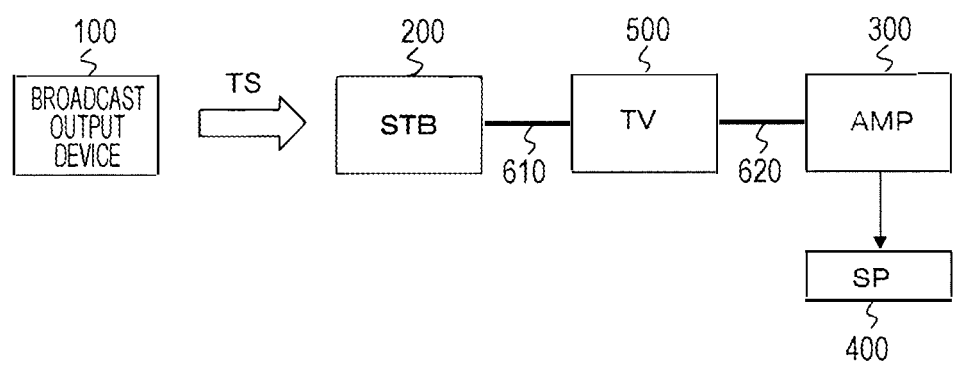
FIG. 45 is a block diagram of a different exemplary configuration of the transmission and reception system.

In addition, according to the embodiment described above, the example in which the audio amplifier 300 is interposed between the set top box 200 and the television receiver 500, has been given. However, a transmission and reception system 10A including the set top box 200 directly connected to the television receiver 500, is also considered as illustrated in FIG. 45.

In the transmission and reception system 10A, the set top box 200 and the television receiver 500 are connected through the HDMI cable 610. In this case, the set top box 200 is the source and the television receiver 500 is the destination. The audio amplifier 300 and the television receiver 500 are connected through the HDMI cable 620. In this case, the audio amplifier 300 is the source and the television receiver 500 is the destination.

In this case, the uncompressed video data and the audio stream including the media access information (the container current data) inserted, are transmitted from the set top box 200 to the television receiver 500 through a digital interface of HDMI. In addition, the audio stream remaining intact or the audio data that has been decoded, is transmitted from the television receiver 500 to the audio amplifier 300 with the audio return channel of HDMI.

In addition, according to the embodiment described above, the transmission and reception system 10 including the set top box 200 and the television receiver 500, has been described. However, a configuration in which, for example, a monitor device or a projector is arranged instead of the television receiver 500, is considered. In addition, a configuration in which, for example, a recorder having a reception function or a personal computer is arranged instead of the set top box 200, is considered.

In addition, according to the embodiment described above, each device on the reception side is wired-connected through the digital interface of HDMI. However, in a case where each device is wired-connected through a digital interface similar to that of HDMI, furthermore, even in a case where each device is wirelessly connected, needless to say, the present invention can be applied similarly.

Figure 46:
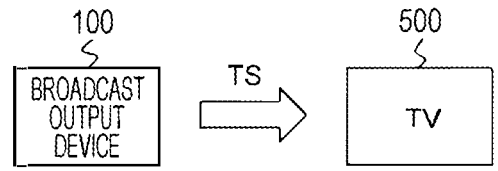
FIG. 46 is a block diagram of another different exemplary configuration of the transmission and reception system.

In addition, according to the embodiment described above, the transmission and reception system 10 in which the set top box 200 receives the transport stream TS transmitted through the broadcast wave from the broadcast output device 100, has been described. However, as illustrated in FIG. 46, a transmission and reception system 10B in which the television receiver 500 directly receives the transport stream TS transmitted through the broadcast wave from the broadcast output device 100, is also considered.

Note that the present technology can have the following configurations.

(1) A transmission device includes: a transmission unit configured to transmit a container having a predetermined format, the container including a media stream; and an information insertion unit configured to sequentially insert a predetermined number of pieces of media access information associated for a set of media access control, into a layer of the media stream or a layer of the container.

(2) According to the transmission device described in (1) above, the media access information includes identification information for making a distinction from different media access information.

(3) According to the transmission device described in (1) or (2) above, the media access information includes identification information for making an association with different media access information.

(4) According to the transmission device described in any of (1) to (3) above, the media access information includes period information indicating a corresponding scene in the media stream.

(5) According to the transmission device described in any of (1) to (3) above, the media access information includes user interface information for a user to select a reproduced medium.

(6) According to the transmission device described in any of (1) to (3) above, the media access information includes time information for managing a boot of an action command.

(7) According to the transmission device described in any of (1) to (3) above, the media access information includes absolute time information indicating a deadline of media reproduction.

(8) According to the transmission device described in any of (1) to (3) above, the media access information includes notification information for notifying a user of a state.

(9) According to the transmission device described in any of (1) to (8) above, the information insertion unit allows each piece of divided information acquired by dividing the media access portion, to be individually inserted into a predetermined number of unit portions in the media stream.

(10) According to the transmission device described in (9) above, the media stream includes an audio compressed data stream, and the information insertion unit inserts the divided information into a user data region of an audio frame as each of the unit portions.

(11) A transmission method includes: a transmission step of transmitting, by a transmission unit, a container having a predetermined format, the container including a media stream; and an information insertion step of sequentially inserting a predetermined number of pieces of media access information associated for a set of media access control, into a layer of the media stream or a layer of the container.

(12) A media processing device includes: a first acquisition unit configured to acquire first media data, and configured to sequentially acquire a predetermined number of pieces of media access information for a set of media access control; a second acquisition unit configured to acquire second media data associated with the first media data on the basis of the media access information; and a presentation processing unit configured to perform media presentation processing based on the first media data and the second media data.

(13) According to the media processing device described in (12) above, the first acquisition unit includes: a reception unit configured to receive a container having a predetermined format, the container including a media stream, the media access information being inserted into a layer of the media stream or a layer of the container; a decode processing unit configured to perform decode processing to the media stream to acquire the first media data; and an information extraction unit configured to extract the media access information from the layer of the media stream or the layer of the container.

(14) According to the media processing device described in (12) above, the first acquisition unit includes: a reception unit configured to receive video data as the first media data and an audio compressed data stream into which the media access information has been inserted, from an external device through a digital interface; a decode processing unit configured to perform decode processing to the audio compressed data stream to acquire audio data as the first media data; and an information extraction unit configured to extract the media access information from the audio compressed data stream.

(15) A media processing method includes: a first acquisition step of acquiring first media data and sequentially acquiring a predetermined number of pieces of media access information associated for a set of media access control corresponding to the first media data, by a first acquisition unit; a second acquisition step of acquiring second media data associated with the first media data on the basis of the media access information, by a second acquisition unit; and a presentation processing step of performing media presentation processing based on the first media data and the second media data.

(16) A reception device includes: a reception unit configured to receive a container having a predetermined format, the container including a media stream, a predetermined number of pieces of media access information associated for a set of media access control being sequentially inserted into a layer of the media stream or a layer of the container; a decode processing unit configured to perform decode processing to the media stream to acquire first media data; an information extraction unit configured to extract the media access information from the layer of the media stream or the layer of the container; a media data acquisition unit configured to acquire second media data on the basis of the media access information; and a presentation processing unit configured to perform media presentation processing based on the first media data and the second data.

(17) A reception device includes: a reception unit configured to receive video data as first media data and an audio compressed data stream into which a predetermined number of pieces of media access information for a set of media access control have been sequentially inserted, from an external device through a digital interface; a decode processing unit configured to perform decode processing to the audio compressed data stream to acquire audio data as the first media data; an information extraction unit configured to extract the media access information from the audio compressed data stream; a media data acquisition unit configured to acquire second media data on the basis of the media access information; and a presentation processing unit configured to perform media presentation processing based on the first media data and the second media data.

(18) A transmission device includes: a transmission unit configured to transmit a container having a predetermined format, the container including an audio encoded stream into which predetermined information has been inserted; and an information insertion unit configured to insert, into a layer of the container, information indicating that an encoded stream is prioritized as a transmission format of audio data.

(19) According to the transmission device described in (18) above, the predetermined information includes a predetermined number of pieces of media access information associated for a set of media access control.

(20) A transmission method includes: a transmission step of transmitting, by a transmission unit, a container having a predetermined format, the container including an audio encoded stream in which predetermined information has been inserted into a user data region; and an information insertion step of inserting, into a layer of the container, information indicating that an encoded stream is prioritized as a transmission format of audio data.

(20) A transmission device includes: a transmission unit configured to transmit a container having a predetermined format, the container including a media stream; and an information insertion unit configured to add, to media access information, checking information for checking a provider of media data acquired with the media access information, to insert the media access information into a layer of the media stream or a layer of the container.

(21) According to the transmission device described in (21) above, the checking information includes an identification value uniquely allocated to an individual service based on the media access information or a provider or standard organization of the service.

(23) A transmission method includes: a transmission step of transmitting, by a transmission unit, a container having a predetermined format, the container including a media stream; and an information insertion step of adding, to media access information, checking information for checking a provider of media data acquired with the media access information, to insert the media access information into a layer of the media stream or a layer of the container.

(24) A media processing device includes: a media access information acquisition unit configured to acquire media access information, the media access information being added with checking information for checking a provider of media data acquired with the media access information; a media data acquisition unit configured to acquire the media data on the basis of the media access information; and a provider checking unit configured to check the provider of the media data that has been acquired, on the basis of the checking information.

(25) A media processing method includes: a media access information acquisition step of acquiring, by a media access information acquisition unit, media access information, the media access information being added with checking information for checking a provider of media data acquired with the media access information; a media data acquisition step of acquiring the media data on the basis of the media access information; and a provider checking step of checking the provider of the media data that has been acquired, on the basis of the checking information.

As a main feature of the present technology, the predetermined number of pieces of media access information associated for the set of media access control, are sequentially inserted into the layer of the media stream or the layer of the container so as to be transmitted, to enable the set of media access control to be favorably performed on the reception side (refer to FIGS. 6 to 11 and FIG. 16).

REFERENCE SINGS LIST 10, 10A, 10B Transmission and reception system
21 Active pixel period
22 Horizontal blanking period
23 Vertical blanking period
24 Video data period
25 Data island period
26 Control period
31 HDMI transmitter
32 HDMI receiver
33 DDC
34 CEC line
35 HPD line
36 Power source line
37 Reserve line
100 Broadcast output device
110, 110A Stream generation unit
111 Control unit
111a CPU
112 Video encoder
113, 113A Audio encoder
113a Audio encoded block unit
113b Audio framing unit
114, 114A Multiplexer
200, 200A Set top box (STB)
201 CPU
202 Flash ROM
203 DRAM
204 Internal bus
205 Remote control reception unit
206 Remote control transmitter
211 Antenna terminal
212 Digital tuner
213, 213A Demultiplexer
214 Video decoder
215 Audio framing unit
216 HDMI transmission unit
217 HDMI terminal
218 Data insertion unit
300 Audio amplifier (AMP)
301 CPU
302 Flash ROM
303 DRAM
304 Internal bus
305 Remote control reception unit
306 Remote control transmitter
311 HDMI terminal
312 HDMI reception unit
313 Audio decoder
314 Audio processing circuit
315 Audio amplifier circuit
316 Audio output terminal
317 HDMI transmission unit
318 HDMI terminal
400 Speaker system (SP)
500 Television receiver (TV)
501 CPU
502 Flash ROM
503 DRAM
504 Internal bus
505 Remote control reception unit
506 Remote control transmitter
507 Communication interface
511 Antenna terminal
512 Digital tuner
513 Demultiplexer
514 Video decoder
515 HDMI terminal
516 HDMI reception unit
517 Video processing circuit
518 Panel drive circuit
519 Display panel
520 Audio decoder
521 Audio processing circuit
522 Audio amplifier circuit
523 Speaker
610, 620 HDMI cable

The invention claimed is:

1. A transmission device comprising:
   transmission circuitry configured to transmit a broadcast stream, the broadcast stream including an MPEG-H audio stream; and
   processing circuitry configured to insert metadata into MPEG-H Audio Stream (MHAS) packets of a predetermined type in the MPEG-H audio stream,
   wherein the metadata includes:
      user interface information that is displayed in a graphical user interface (GUI) that is configured to change an aspect of playback of content to a user according to a user interaction with the GUI, and
      information on user selection with respect to the content, and
   wherein the predetermined type in the MPEG-H audio stream is a type of packet that includes object encoded data in a payload of the packet.

2. The transmission device according to claim 1, wherein the playback of the content included in the broadcast stream is based on user interactivity in the GUI.

3. The transmission device according to claim 1, wherein the metadata includes textual labels that are displayed in the GUI.

4. The transmission device according to claim 1, wherein the metadata includes scene information.

5. The transmission device according to claim 1, wherein the processing circuitry is configured to divide the metadata into a plurality of pieces of the metadata, and insert the plurality of pieces of the metadata into the MHAS packets.

6. The transmission device according to claim 5, wherein the processing circuitry is configured to:
   insert the divided information into a user data region of an audio frame.

7. A reception device comprising:
   reception circuitry configured to receive a broadcast stream, the broadcast stream including an MPEG-H audio stream;
   processing circuitry configured to
   acquire metadata from MPEG-H Audio Stream (MHAS) packets of a predetermined type in the MPEG-H audio stream; and
   display a graphical user interface (GUI) that is configured to change an aspect of playback of content to a user according to a user interaction with the GUI based on user interface information and information on user selection with respect to the content included in the metadata acquired from the MHAS packets,
   wherein the predetermined type in the MPEG-H audio stream is a type of packet that includes object encoded data in a payload of the packet.

8. The reception device according to claim 7, wherein the processing circuitry is configured to:
   play back the content included in the broadcast stream based on user interactivity in the GUI.

9. The reception device according to claim 7, wherein the metadata includes textual labels that are displayed in the GUI.

10. The reception device according to claim 7, wherein the metadata includes scene information.

11. The reception device according to claim 7, wherein the processing circuitry is configured to:
    acquire a plurality of pieces of the metadata from the MHAS packets.

12. The reception device according to claim 11, wherein the processing circuitry is configured to:
    acquire the plurality of pieces of the metadata from a user data region of an audio frame.

13. The reception device according to claim 7, further comprising:
    a display,
    wherein the reception circuitry includes tuner circuitry.

14. A reception method comprising:
    receiving a broadcast stream, the broadcast stream including an MPEG-H audio stream;
    acquiring metadata from MPEG-H Audio Stream (MHAS) packets of a predetermined type in the MPEG-H audio stream; and
    displaying a graphical user interface (GUI) that is configured to change an aspect of playback of content to a user according to a user interaction with the GUI based on user interface information and information on user selection with respect to the content included in the metadata acquired from the MHAS packets,
    wherein the predetermined type in the MPEG-H audio stream is a type of packet that includes object encoded data in a payload of the packet.

15. The reception method according to claim 14, further comprising:
    playing back the content included in the broadcast stream based on user interactivity in the GUI.

16. The reception method according to claim 14, wherein the metadata includes textual labels that are displayed in the GUI.

17. The reception method according to claim 14, wherein the metadata includes scene information.

18. The reception method according to claim 14, wherein the acquiring comprises:
    acquiring a plurality of pieces of the metadata from the MHAS packets.

19. The reception method according to claim 18, wherein the acquiring comprises:
    acquiring the plurality of pieces of the metadata from a user data region of an audio frame.

* * * * *